United States Patent
Chall et al.

(10) Patent No.: US 9,429,983 B1
(45) Date of Patent: Aug. 30, 2016

(54) SYSTEM CLOCK DISTRIBUTION IN A DISTRIBUTED COMPUTING ENVIRONMENT

(71) Applicant: Advanced Processor Architectures, LLC, Costa Mesa, CA (US)

(72) Inventors: Louis Edmund Chall, Costa Mesa, CA (US); John Bradley Serson, Irvine, CA (US); Philip Arnold Roberts, Clayton, OH (US); Cecil Eugene Hutchins, Costa Mesa, CA (US)

(73) Assignee: Advanced Processor Architectures, LLC, Costa Mesa, CA (US)

( * ) Notice: Subject to any disclaimer, the term of this patent is extended or adjusted under 35 U.S.C. 154(b) by 0 days.

(21) Appl. No.: 14/823,232

(22) Filed: Aug. 11, 2015

Related U.S. Application Data

(63) Continuation-in-part of application No. 14/483,528, filed on Sep. 11, 2014.

(60) Provisional application No. 61/877,204, filed on Sep. 12, 2013.

(51) Int. Cl.
| | | |
|---|---|---|
| *G06F 1/04* | (2006.01) | |
| *G06F 1/10* | (2006.01) | |
| *G06F 13/42* | (2006.01) | |
| *G06F 1/06* | (2006.01) | |

(52) U.S. Cl.
CPC . *G06F 1/10* (2013.01); *G06F 1/06* (2013.01); *G06F 13/4291* (2013.01)

(58) Field of Classification Search
CPC ..................... G06F 1/10; G06F 1/06
USPC .......................................................... 713/600
See application file for complete search history.

(56) References Cited

U.S. PATENT DOCUMENTS

| | | |
|---|---|---|
| 3,611,317 A | 10/1971 | Bonfeld |
| 3,623,127 A | 11/1971 | Glenn |
| 3,698,082 A | 10/1972 | Hyltin et al. |
| 3,715,629 A | 2/1973 | Swengel, Sr. |
| 3,716,759 A | 2/1973 | Scace et al. |
| 4,107,760 A | 8/1978 | Zimmer |
| 4,214,292 A | 7/1980 | Johnson |
| 4,246,597 A | 1/1981 | Cole et al. |
| 4,254,446 A | 3/1981 | Peoples |

(Continued)

FOREIGN PATENT DOCUMENTS

WO    WO 2011/017676 A1    2/2011

OTHER PUBLICATIONS

U.S. Appl. No. 14/483,528, filed Sep. 11, 2014, Chall et al.

(Continued)

*Primary Examiner* — Vincent Tran
(74) *Attorney, Agent, or Firm* — Knobbe, Martens, Olson & Bear, LLP

(57) ABSTRACT

A system clock signal distributed to electronic configurable and reconfigurable computing devices within a distributed computing system. The distributed computing devices, which may be dual-die chip carriers (DDCC), include input addressable data/clock ports on which system clock signals are accepted and may be propagated on one or more data/clock output ports. The input and/or output ports of various distributed computing devices may be configured and reconfigured according to system preferences or requirements.

30 Claims, 44 Drawing Sheets

(56) References Cited

U.S. PATENT DOCUMENTS

| | | |
|---|---|---|
| 4,296,456 A | 10/1981 | Reid |
| 4,321,654 A | 3/1982 | Nakajo et al. |
| 4,337,499 A | 6/1982 | Cronin et al. |
| 4,398,208 A | 8/1983 | Murano et al. |
| 4,437,141 A | 3/1984 | Prokop |
| 4,484,215 A | 11/1984 | Pappas |
| 4,489,363 A | 12/1984 | Goldberg |
| 4,493,048 A | 1/1985 | Kung et al. |
| 4,519,078 A | 5/1985 | Komonytsky |
| 4,549,200 A | 10/1985 | Ecker et al. |
| 4,551,746 A | 11/1985 | Gilbert et al. |
| 4,551,747 A | 11/1985 | Gilbert et al. |
| 4,564,900 A | 1/1986 | Smitt |
| 4,578,697 A | 3/1986 | Takemae |
| 4,582,953 A | 4/1986 | Nagase et al. |
| 4,591,976 A | 5/1986 | Webber et al. |
| 4,594,711 A | 6/1986 | Thatte |
| 4,600,970 A | 7/1986 | Bauer |
| 4,635,093 A | 1/1987 | Ross |
| 4,638,348 A | 1/1987 | Brown et al. |
| 4,679,121 A | 7/1987 | Schomers et al. |
| 4,685,032 A | 8/1987 | Blomstedt et al. |
| 4,687,697 A | 8/1987 | Cambo et al. |
| 4,697,204 A | 9/1987 | Mita et al. |
| 4,701,916 A | 10/1987 | Naven et al. |
| 4,704,599 A | 11/1987 | Kimmel et al. |
| 4,754,316 A | 6/1988 | Reid |
| 4,755,866 A | 7/1988 | Marshall et al. |
| 4,770,640 A | 9/1988 | Walter |
| 4,771,366 A | 9/1988 | Blake et al. |
| 4,779,273 A | 10/1988 | Beucler et al. |
| 4,817,093 A | 3/1989 | Jacobs et al. |
| 4,858,072 A | 8/1989 | Chall, Jr. |
| 4,918,335 A | 4/1990 | Chall, Jr. |
| 4,918,691 A | 4/1990 | Chall, Jr. |
| 4,937,658 A | 6/1990 | Chall, Jr. |
| 4,937,659 A | 6/1990 | Chall, Jr. |
| 4,955,131 A | 9/1990 | Chall, Jr. |
| 5,142,629 A | 8/1992 | Byers et al. |
| 5,166,674 A | 11/1992 | Baum et al. |
| 5,261,105 A | 11/1993 | Potter et al. |
| 5,355,037 A | 10/1994 | Andresen et al. |
| 5,396,613 A | 3/1995 | Hollaar |
| 5,475,830 A * | 12/1995 | Chen ............ A21B 1/245 716/108 |
| 5,544,203 A | 8/1996 | Casasanta et al. |
| 5,677,849 A | 10/1997 | Smith |
| 5,786,979 A | 7/1998 | Douglass |
| 5,797,027 A | 8/1998 | Kajiura |
| 5,859,448 A * | 1/1999 | Brassington ...... H01L 27/11898 257/203 |
| 5,903,559 A | 5/1999 | Acharya et al. |
| 5,933,435 A | 8/1999 | Shah et al. |
| 6,037,820 A | 3/2000 | Ishizaka |
| 6,133,634 A | 10/2000 | Joshi |
| 6,219,559 B1 | 4/2001 | Hill et al. |
| 6,353,616 B1 | 3/2002 | Elwalid et al. |
| 6,388,333 B1 | 5/2002 | Taniguchi et al. |
| 6,539,027 B1 | 3/2003 | Cambron |
| 6,556,582 B1 | 4/2003 | Redi |
| 6,625,740 B1 | 9/2003 | Datar et al. |
| 7,020,145 B1 | 3/2006 | Symons et al. |
| 7,033,857 B2 | 4/2006 | Munakata et al. |
| 7,076,716 B1 | 7/2006 | Hauk et al. |
| 7,171,484 B1 | 1/2007 | Krause et al. |
| 7,257,093 B1 | 8/2007 | Witzke et al. |
| 7,285,848 B2 | 10/2007 | Onodera et al. |
| 7,295,036 B1 | 11/2007 | Zaveri et al. |
| 7,335,985 B2 | 2/2008 | Murphy et al. |
| 7,336,953 B2 | 2/2008 | Kim et al. |
| 7,357,017 B2 | 4/2008 | Felton et al. |
| 7,379,959 B2 | 5/2008 | Hinni et al. |
| 7,382,747 B2 | 6/2008 | Hu et al. |
| 7,444,424 B1 | 10/2008 | Tourancheau |
| 7,480,748 B2 * | 1/2009 | Sim ............ H05K 1/181 361/760 |
| 7,499,436 B2 | 3/2009 | Ikeda et al. |
| 7,567,100 B2 | 7/2009 | Jing |
| 7,574,629 B2 | 8/2009 | Douady et al. |
| 7,580,359 B2 | 8/2009 | Pirbhai |
| 7,728,383 B2 | 6/2010 | Kusumoto et al. |
| 7,777,311 B2 | 8/2010 | Utsumi et al. |
| 7,787,364 B2 | 8/2010 | Maeda et al. |
| 7,797,449 B2 | 9/2010 | Hipp et al. |
| 7,802,046 B2 | 9/2010 | Kowalski et al. |
| 7,822,897 B2 | 10/2010 | Mitra et al. |
| 7,860,059 B2 | 12/2010 | Lee et al. |
| 7,864,961 B2 | 1/2011 | Yoon et al. |
| 7,934,122 B2 | 4/2011 | Candelaria et al. |
| 7,958,341 B1 | 6/2011 | Cismas et al. |
| 8,000,248 B2 | 8/2011 | Abondo |
| 8,014,285 B2 | 9/2011 | Yoon et al. |
| 8,014,380 B2 | 9/2011 | Lewis |
| 8,022,526 B2 | 9/2011 | Chall et al. |
| 8,031,603 B1 | 10/2011 | Polk et al. |
| 8,069,365 B2 | 11/2011 | Gu |
| 8,089,905 B2 | 1/2012 | Umeshima |
| 8,381,031 B2 | 2/2013 | Chall et al. |
| 8,554,506 B2 | 10/2013 | Chall et al. |
| 8,555,096 B2 | 10/2013 | Chall et al. |
| 8,675,371 B2 | 3/2014 | Chall et al. |
| 2001/0021984 A1 | 9/2001 | Kim |
| 2002/0046379 A1 | 4/2002 | Miki et al. |
| 2002/0087699 A1 | 7/2002 | Karagiannis et al. |
| 2002/0184547 A1 | 12/2002 | Francis et al. |
| 2003/0055980 A1 | 3/2003 | Liu et al. |
| 2003/0122212 A1 | 7/2003 | Herzum et al. |
| 2004/0133692 A1 | 7/2004 | Blanchet et al. |
| 2005/0002363 A1 | 1/2005 | Cheng et al. |
| 2005/0131670 A1 * | 6/2005 | Wang ............ G06F 17/5027 703/23 |
| 2005/0151248 A1 * | 7/2005 | Shau ............ G01R 31/2856 257/734 |
| 2005/0192022 A1 | 9/2005 | Minnick et al. |
| 2005/0210325 A1 | 9/2005 | Douady et al. |
| 2006/0049504 A1 | 3/2006 | Corisis et al. |
| 2006/0179267 A1 | 8/2006 | Chatterjee et al. |
| 2006/0224912 A1 * | 10/2006 | Denham ............ G06F 7/00 713/600 |
| 2006/0282739 A1 | 12/2006 | Meyer et al. |
| 2007/0070611 A1 | 3/2007 | Koh et al. |
| 2007/0083791 A1 | 4/2007 | Panesar et al. |
| 2007/0189170 A1 | 8/2007 | Pirbhai |
| 2007/0290320 A1 | 12/2007 | Onodera et al. |
| 2008/0013557 A1 | 1/2008 | Siemens et al. |
| 2008/0054488 A1 | 3/2008 | Leddige et al. |
| 2008/0195912 A1 | 8/2008 | Mende et al. |
| 2008/0197469 A1 | 8/2008 | Yang et al. |
| 2009/0006635 A1 | 1/2009 | Siegmund |
| 2009/0037756 A1 | 2/2009 | Lundquist et al. |
| 2009/0119561 A1 | 5/2009 | Yokota et al. |
| 2009/0172191 A1 | 7/2009 | Dumitriu et al. |
| 2010/0157854 A1 | 6/2010 | Anderson et al. |
| 2010/0246478 A1 | 9/2010 | Liu et al. |
| 2010/0318661 A1 | 12/2010 | Heurguier |
| 2012/0218265 A1 | 8/2012 | Wakayama |
| 2013/0021739 A1 | 1/2013 | Kim et al. |
| 2013/0207698 A1 * | 8/2013 | Chae ............ G06F 1/10 327/144 |
| 2013/0314888 A1 | 11/2013 | Chall et al. |
| 2014/0359200 A1 * | 12/2014 | Tam ............ G11C 7/1006 711/103 |
| 2014/0376569 A1 * | 12/2014 | Philip ............ H04J 3/0658 370/503 |
| 2015/0134870 A1 * | 5/2015 | Galloway ............ G06F 1/10 710/306 |
| 2015/0178197 A1 * | 6/2015 | Tam ............ G06F 12/08 711/1 |
| 2015/0280710 A1 * | 10/2015 | Tsukuda ............ G06F 1/04 326/98 |

(56) References Cited

OTHER PUBLICATIONS

R.R. Johnson, Discrete Wafer Scale Integration, Water Scale Integration, Proc of the IFIP WG 10.5 Workshop, 1986, pp. 345-352, Elsevier Science Publishers B.V. (North-Holland), ed by G. Sancier et al.

Lou Chall, Aeronutronic Division, Advanced Processor Technology, exponent—The Ford Aerospace Technical Journal, Winter 1989/1990, pp. 10-18, Ford Aerospace.

J. Alves Marques, Mosaic: A Modular Architecture for VLSI System Circuits, Conference: VLSI81, Very Large Scale Integration, Proceedings, Aug. 18-21, 1981, pp. 53-61.

Jerry Lyman, Silicon-on-Silicon Hybrids are Coming Into Their Own, Electronics, May 28, 1987, pp. 47-48.

C. C. Perkins Sr. et al., The Impact of Silicon Interconnect Technology on the Design Engineer, IEEE Conf. 1987, Electro /87 & Mini/Micro Northeast, No. 36/2, pp. 1-4.

International Search Report and Written Opinion dated Dec. 2, 2010, PCT Application No. US 2010/044800.

\* cited by examiner

4x2x2

3x3x2

TAPE AUTOMATED BONDING (TAB)
(Conductive Tray)

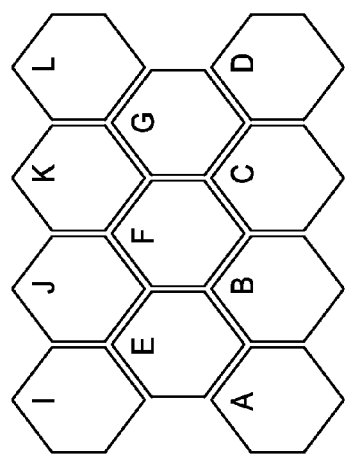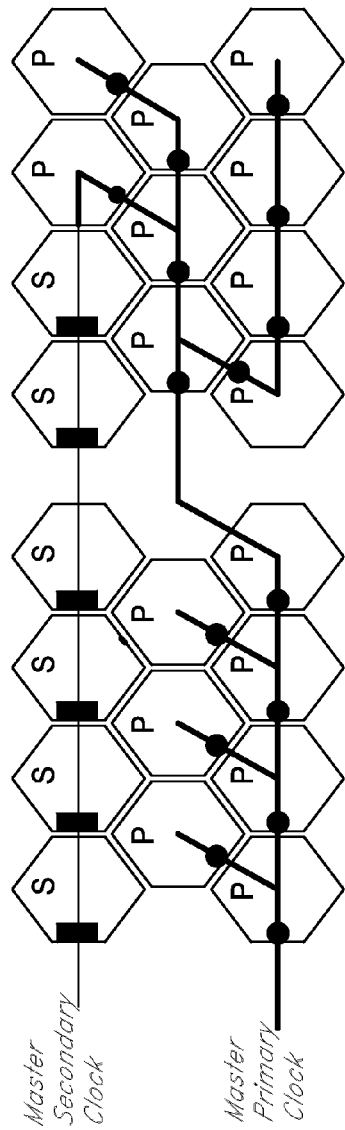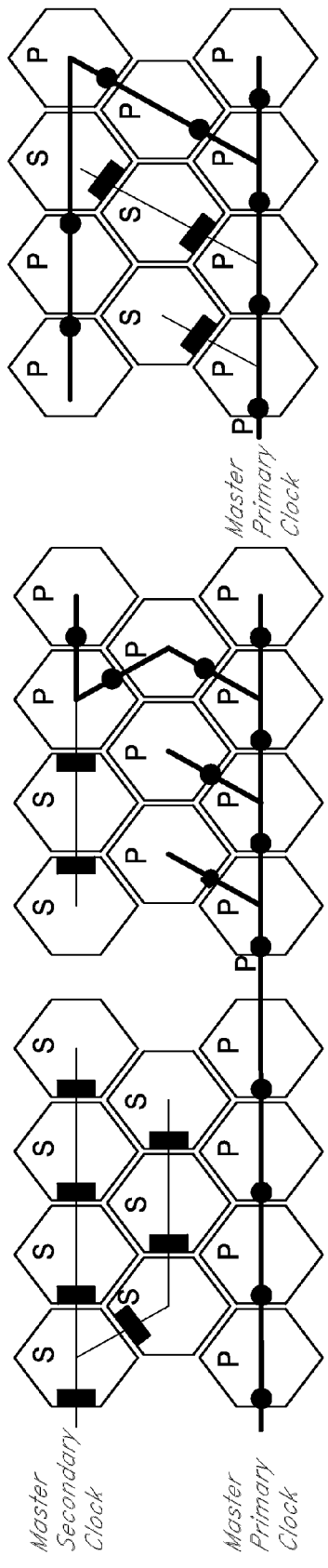
FIG. 29A
FIG. 29B
FIG. 29C
FIG. 29D
FIG. 29E
FIG. 29F

SYSTEM CLOCK DISTRIBUTION IN A DISTRIBUTED COMPUTING ENVIRONMENT

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

1. Field

The present application relates to distributed computing, and in particular, to systems and methods that are related to a configurable and reconfigurable communication interface fabric, including reconfigurable system clock routing configured to enable distributed computing and distributed memory.

2. Background

The architecture of a typical modern computer is based on the von Neumann architecture. The von Neumann architecture is a basic design for a stored-program digital computer that includes a processor that is separated from a memory, which is used to store computer program instructions and data. Even though typical modern computer architectures are more complex than the original von Neumann architecture, typical modern computers retain the separation between the processor and the bulk memory.

Specifically, along with a number of other components, the processor and memory are provided on a printed circuit board, referred to as a motherboard (or "main board", "system board" or "logic board"). On a typical motherboard, the processor and memory communicate via printed circuit data bus. Throughput, or data transfer rate, on the data bus is much lower than the rate at which a modern processor can operate. The difference between the data bus throughput and the processor speed significantly limits the effective processing speed of the computer when the processor is instructed to process large amounts of data stored in the memory. The processor is forced to wait for data to be transferred to or from the memory, leaving the processor under-utilized.

The performance limitation caused by separating the processor and the memory on a motherboard is referred to as the von Neumann bottleneck. The severity of the bottleneck tends to increase because over time processor speeds and memory sizes tend to increase at a faster rate than the improvements in throughput over the data bus connecting new processors to bigger memories. Previous attempts to alleviate the problem have only been partially successful. For example, previous hardware solutions that address the von Neumann bottleneck include providing a cache between the processor and the bulk memory, and/or providing separate caches with separate access paths for data and instructions; and, previous software solutions include branch predictor algorithms. However, none of the previous solutions fully address the problem.

Additionally, the performance degradations caused by the von Neumann bottleneck are exacerbated in a traditional distributed computing environment in which computer processing of data is carried out by a number of processors operating simultaneously on smaller portions of a larger task. In a conventional distributed computing environment, such as a data center, multiple computers, each with a respective processor and memory, are coupled to one another. Typically, in an effort to reduce overhead, multiple motherboards are connected to one another within one cabinet. Each motherboard is subject to performance degradation caused by the von Neumann bottleneck even if some of the measures discussed above have been taken to alleviate the full impact of the problem. As such, delays in the processing of data caused by the respective data buses on the various motherboards are compounded, as processing service requests between processors are subject to delays on each motherboard that a service request is processed. Accordingly, there lies a challenge to alleviate delays so that memory access bottlenecks are not compounded within distributed computing systems.

SUMMARY

Various embodiments of systems, methods, and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description," one will understand how the features of various embodiments are used to enable distributed and dynamically reconfigurable computing systems and devices.

Certain embodiments disclosed herein provide a process of distributing a single-frequency clock signal within a distributed computing system, which includes distributed memory and distributed processors. The process may include generating and/or receiving a system clock signal of a first frequency and providing the system clock signal to a first integrated circuit dual die chip carrier (DDCC) of a plurality of interconnected DDCCs via a first input of a first chip of a DDCC. The process may further include providing a copy of the system clock signal, which can serve as a master clock signal, from the first DDCC of the system to a second DDCC of the plurality of DDCCs over an address configurable input port of the second DDCC. In certain embodiments, each of the plurality of interconnected DDCCs receives a master clock signal of the first frequency according to a reconfigurable system clock distribution network.

While certain embodiments are described with reference to a DDCC, one of ordinary skill would understand that at least certain features described herein can be used as part of or in combination with chip carriers that hold more than two die, such as for example, four die, six die, or more. Embodiments of chip carriers with one or more than two die are part of this disclosure. Thus, references herein to a DDCC may also encompass embodiments with a chip carrier that holds a number of die other than two.

The process may further include reconfiguring the system clock distribution network. In certain embodiments, the system clock distribution network includes a primary clock distribution path and one or more secondary clock paths branching therefrom. The process may further include superimposing a data signal on the copy of the system clock signal. In certain embodiments, the process further includes providing a clock signal to a third DDCC of the plurality of DDCCs, wherein the third DDCC is remotely disposed with respect to the first DDCC.

In certain embodiments, the second integrated circuit DDCC is one of a processing chip and/or a memory chip. The process may further include grouping the plurality of DDCCs into clusters or nodes, and may further include reconfiguring the clusters or node groupings. In certain embodiments, the system clock signal may include a substantially symmetrical square wave signal of a fixed frequency. This frequency may be approximately 8 GHz, greater than or equal to about 8 GHz, greater than or equal to about 4 GHz, greater than or equal to about 2 GHz, less than or equal to about 40 GHz, another suitable frequency selected to enable a sufficiently high data rate for communications between nodes, and/or a frequency between any of the preceding values.

Certain embodiments disclosed herein provide a computing system, which can generate and/or receive a system master clock signal, which can be a square wave signal and can include a master primary clock signal and/or a master secondary clock signal. Further, the system can provide the system master primary clock and/or master secondary clock signal over a first output line and a plurality of interconnected DDCCs. The plurality of interconnected DDCCs may include a first integrated circuit DDCC having a plurality of independently-configurable first input lines and independently-configurable first output lines. The plurality of first input lines may include a master primary clock input signal and/or master secondary clock input signal line in electrical communication with the first output line for receiving the system clock signal, the plurality of first output lines including a primary clock output line configured to output a copy of the system master clock square wave signal. The plurality of interconnected DDCCs may further include a second integrated circuit DDCC having a plurality of independently-configurable second input lines and independently-configurable second output lines. The second DDCC being configured to receive the copy of the system master clock square wave signal, the master primary clock signal and/or master secondary clock signal on one of the second input signal lines. In certain embodiments, the master primary clock signal output line and/or master secondary clock signal output line of the first DDCC remains active during system operation. The first integrated circuit DDCC may be configured to not shut off, or to maintain, the copy of the system master primary clock signal on the primary clock output line. In certain embodiments, the first integrated circuit DDCC is also configured to not shut off, or to maintain the master secondary clock signal.

The interconnected DDCCs may be substantially hexagonally-shaped DDCCs for accommodating non-orthogonal inter-device communication. Furthermore, the interconnected DDCCs may each include a first die and a second die disposed above the first die.

In some embodiments, receiving the master clock signal may further include providing the first clock signal directly to at least one additional DDCC over a second output line. In certain embodiments, the plurality of interconnected DDCCs can include any number of DDCCs including, for example, 2, 10, 100, or more DDCCs. The master clock signal may be received from, for example, a system clock generator connected to one or more than one die of a DDCC, and/or another suitable source. The plurality of interconnected DDCCs may be grouped into one or more independent clusters, nodes, sub-nodes, nodes-of-nodes, or super-nodes. In certain embodiments, the plurality of first output lines includes a master secondary clock output signal line, wherein the first integrated circuit DDCC is configured to deactivate the master secondary clock output signal line during system operation. The plurality of interconnected DDCCs may further include a second integrated circuit DDCC having a plurality of independently configurable second input lines and independently-configurable second output lines, the second DDCC being configured to receive the copy of the master primary clock signal and/or master secondary clock signal on one of the independently configurable second input lines. In certain embodiments, the master primary clock output line remains active during system operation. The first integrated circuit DDCC may not be configured to shut off the copy of the master primary clock signal of the primary clock output line.

BRIEF DESCRIPTION OF THE DRAWINGS

FIGS. 29A-F illustrate several diagrams of master primary clock and master secondary clock signal distribution and reconfiguration.

Figure 1:
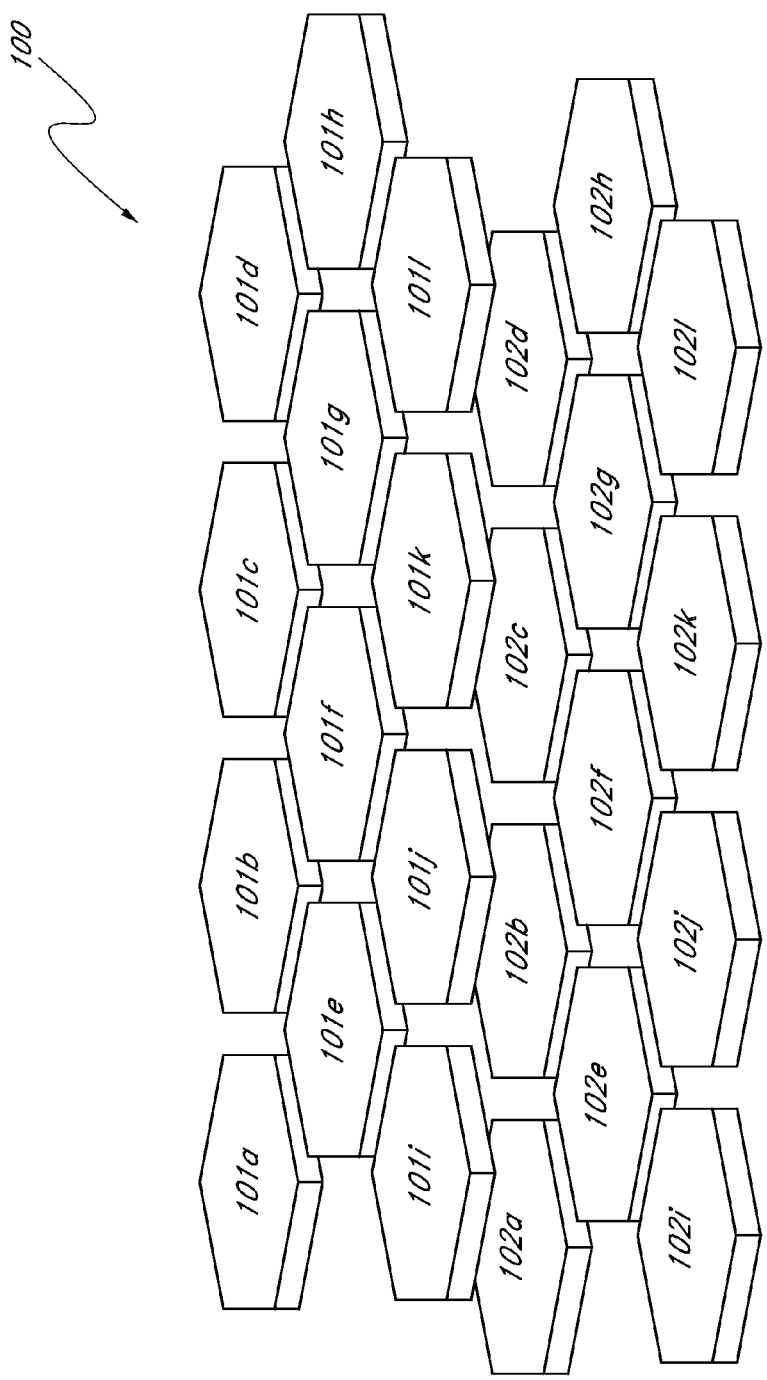
FIG. 1 is a simplified perspective view of one embodiment of a reconfigurable distributed computing and distributed memory architecture including an arrangement of a number of hexagon-shaped integrated circuit dies on two planes.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or apparatus. Finally, like reference numerals may be used to denote like features throughout the specification and figures.

DETAILED DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

FIG. 1 is a simplified perspective view of one embodiment of a reconfigurable architecture for a distributed computing and/or distributed memory system 100 including an arrangement of a number of hexagon-shaped integrated circuit dies on two planes. For the sake of clarity, the packaging around individual pairs of dies and connections between dies are not shown. However, those skilled in the art will appreciate from the present disclosure, and especially with reference to FIGS. 8 and 10, that in one embodiment, individual pairs of dies can be packaged within a dual-die chip carrier (DDCC) also disclosed herein. The system 100 includes a first layer of integrated circuit dies arranged over a second layer of integrated circuit dies. As illustrated in FIG. 1, the first layer of integrated circuit dies includes, for example, twelve dies 101a, 101b, 101c, 101d, 101e, 101f, 101g, 101h, 101i, 101j, 101k, 101l, arranged in a 3×4 matrix. Similarly, the second layer of integrated circuit dies includes twelve corresponding dies 102a, 102b, 102c, 102d, 102e, 102f, 102g, 102h, 102i, 102j, 102k, 102l, arranged in a 3×4 matrix disposed facing the first layer. While FIG. 1 shows twenty-four dies arranged in two layers each having three rows and four columns, those skilled in the art will appreciate from the present disclosure that various embodiments of the architecture include any number integrated circuit dies arranged in two layers each having any number of rows and any number of columns. In particular, in one embodiment, the first and second layers include a different number of integrated circuit dies as compared to one another.

Figure 2:
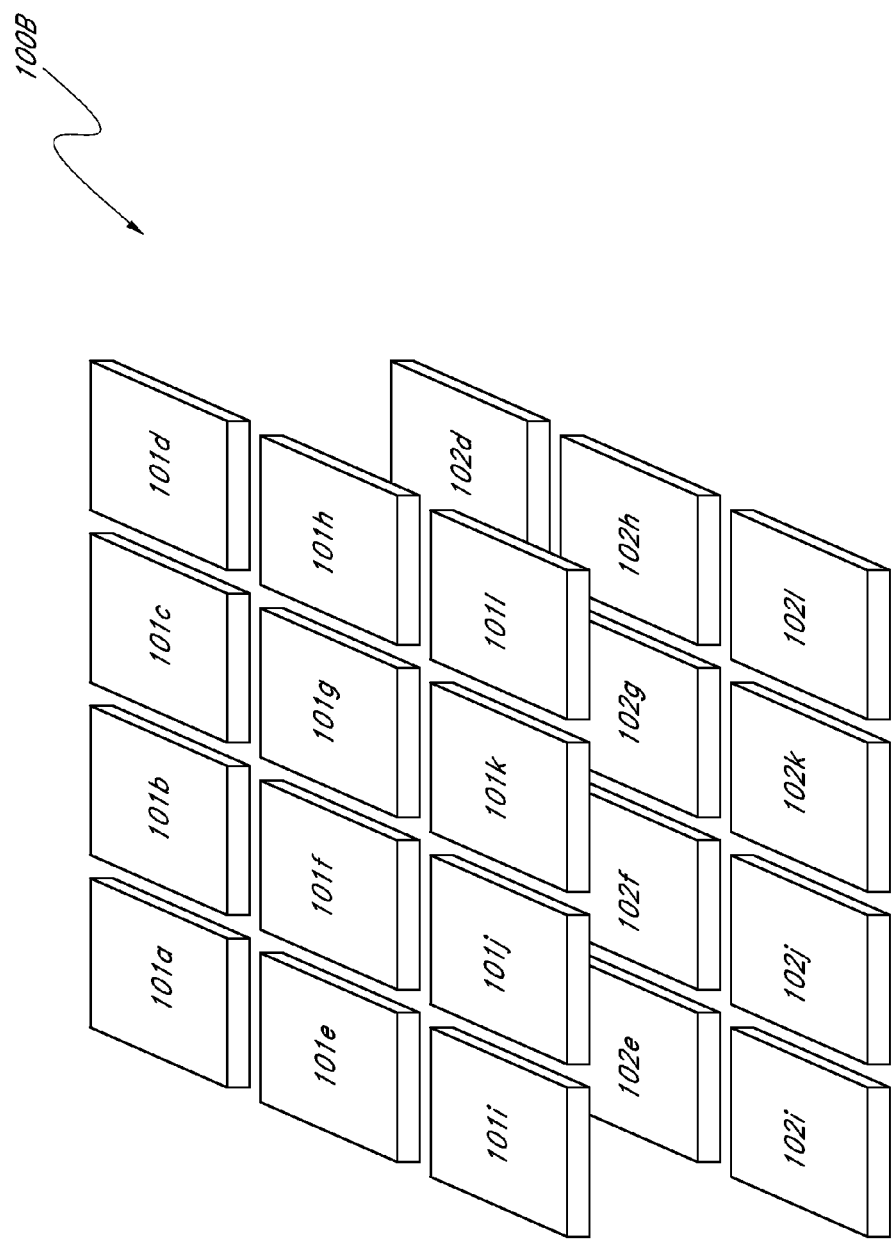
FIG. 2 is a simplified perspective view of one embodiment of a reconfigurable distributed computing and distributed memory architecture including an arrangement of a number of square-shaped integrated circuit die on two planes.

FIG. 2 is a simplified perspective view of one embodiment of a reconfigurable distributed computing and distributed memory architecture 100B including an arrangement of a number of square shaped integrated circuit die on two planes. The system 100B includes the same number of integrated circuit die as illustrated in FIG. 1. However, the hexagon shaped die are replaced with rectangular die. To show the correspondence between the die of FIG. 1 and the die of FIG. 2, the reference numerals for the die of the system 100 are repeated for the die of system 100B.

Figure 3:
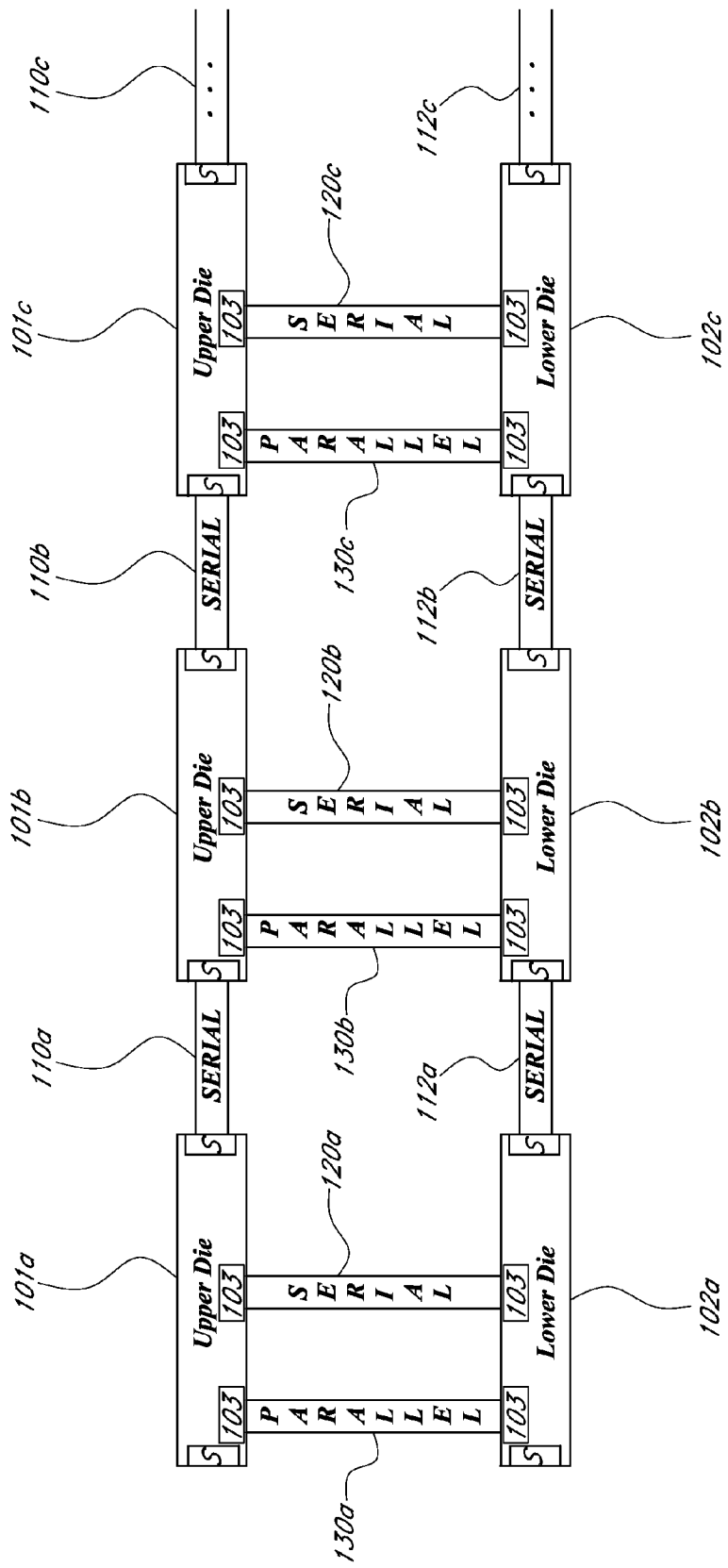
FIG. 3 is a simplified side view of one embodiment of the distributed computing and distributed memory architecture shown in FIG. 1 that includes three dual die chip carriers (DDCC) connected using flying leads and configured to communicate using serial communication.

FIG. 3 is a simplified side view of a portion of the system 100 illustrated in FIG. 1. More specifically, FIG. 3 illustrates three dual die chip carriers (DDCC) connected with serial communications using flying leads. FIG. 3 further illustrates a large parallel bus and six communication independent line pairs between the upper and lower die of each DDCC. Specifically, six of the twenty-four integrated circuit dies of FIG. 1 are illustrated in FIG. 3, including integrated circuit dies 101a, 101b, 101c included in the first layer and integrated circuit dies 102a, 102b, 102c included in the second layer and disposed facing the corresponding dies of the first layer. The portion of the system 100 illustrated in FIG. 3 also includes example data connections between the respective pairs of integrated circuit dies located on different layers. For example, die 101a and die 102a share six serial pair connections 120a and a parallel connection 130a. Similarly, die 101b and die 102b share six serial pair connections 120b and a parallel connection 130b. Similarly, die 101c and die 102c share six serial pair connections 120c and a parallel connection 130c. Moreover, while each pair of dies discussed above share both serial and parallel connections, alternatively, a given pair of dies can be configured to share at least one of serial connectivity, parallel connectivity or a combination thereof. Moreover, the respective serial and parallel connections discussed above may be implemented via a number of forms including one or more solder balls and/or one or more wire leads.

The portion of the system 100 illustrated in FIG. 3 also includes example data connections between the respective integrated circuit dies located on the same layer. For example, die 101a and die 101b share a flying lead independent serial pair connection 110a. Similarly, die 101b and die 101c share a serial connection 110b. Similarly, die 102a and die 102b share flying lead independent a serial pair connection 112a. Similarly, die 102b and die 102c share a flying lead independent serial pair connection 112b. Moreover, while all the data connections between dies in the same layer are shown to be serial data connections, those skilled in the art will appreciate that each connection may be an independent pair serial connection, a parallel connection or a combination operable as serial data connection and a parallel data connection. Moreover, the respective serial connections discussed above may be implemented in a number of forms including one or more wire leads or flying leads between DDCCs each housing two dies arranged facing one another within a particular DDCC.

Figure 4A:
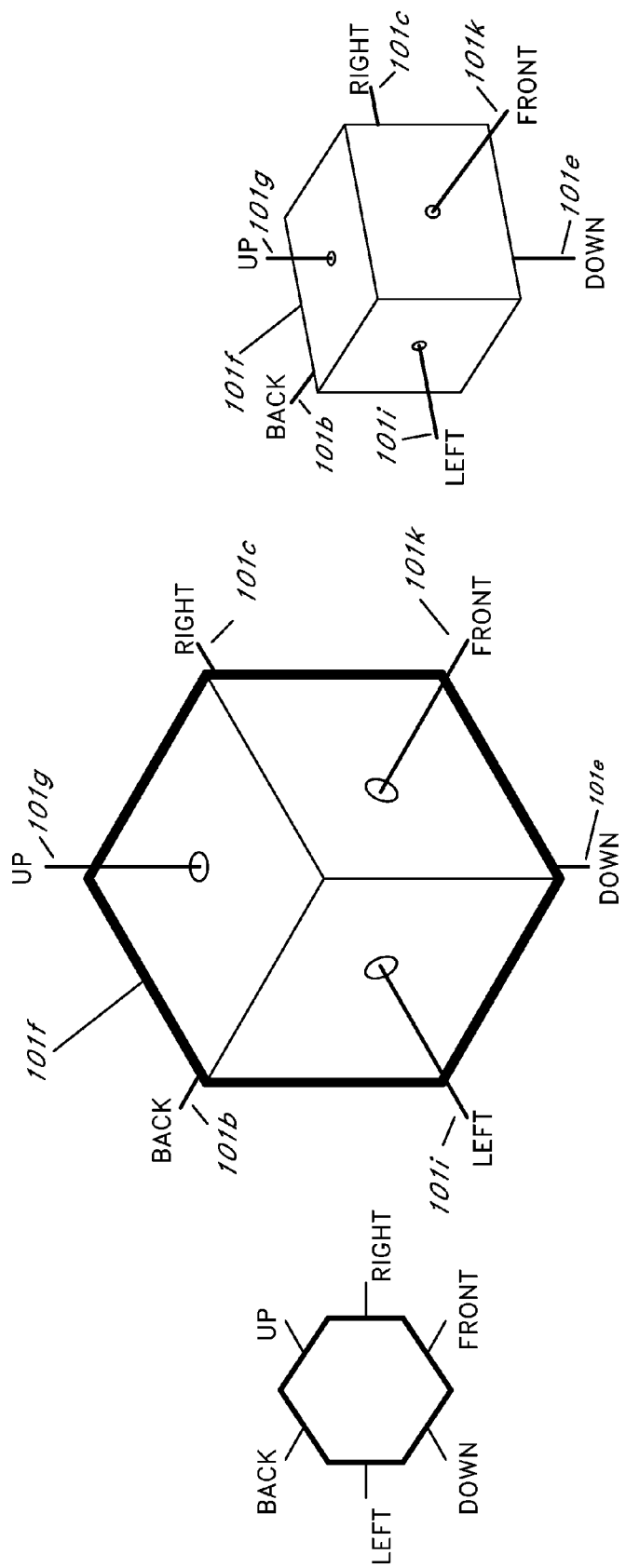
FIG. 4A is a simplified perspective view of one embodiment illustrating the relationship between the hexagonal format of a DDCC and a view of a cube superimposed on the hexagonal view.

FIG. 4A is a simplified perspective view of one embodiment illustrating the relationship between the hexagonal format of a DDCC 101f and a view of a cube superimposed on the hexagonal view shown in FIG. 1. On the left of FIG. 4A is illustrated a hexagonal DDCC and on the right is illustrated a cube with similar markings to the hexagonal DDCC to illustrate the conversion between a hexagonal DDCC and a cube based DDCC. The resulting DDCC is illustrated in the center of FIG. 4A as DDCC 101f. The cube illustrates six scalable and reconfigurable dimensions (e.g., up, down, left, right, front, and back) that can be used three-dimensional processing. The integrated circuit die 101f illustrates six independent serial pair 110 connections to surrounding dies. For example, die 101f shares respective independent serial pair data connections 110 with six additional DDCC die 101b, 101c, 101e, 101g, 101i, and 101k, which are included in a first layer (e.g., an upper layer) of DDCC. Also, for example, the die 102f shown in FIG. 1 shares respective independent pair serial data pair 112 connections with six additional DDCC die 102b, 102c, 102e, 102g, 102i, and 102k, which are included in the second layer of DDCC (e.g., a lower layer). The two layers of die shown in FIG. 1 and FIG. 3 are each connected with a parallel signal bus 130 and six independent serial pair data connections 120 between die 101f, 101e, 101i, 101b, 101g, 101c and 101k in the first layer of die and die 102f, 102e, 102i, 102b, 102g, 102c, and 102k in the second layer of die.

Figure 4B:
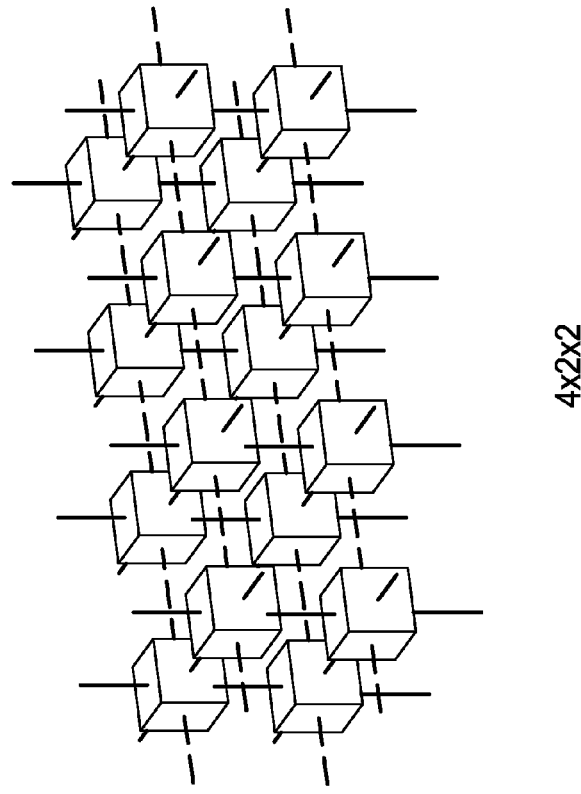
FIGS. 4B and 4C illustrate several three-dimensional structures of a plurality of interconnected DDCCs based on abstraction of a DDCC illustrated in FIG. 3A
Figure 4B:
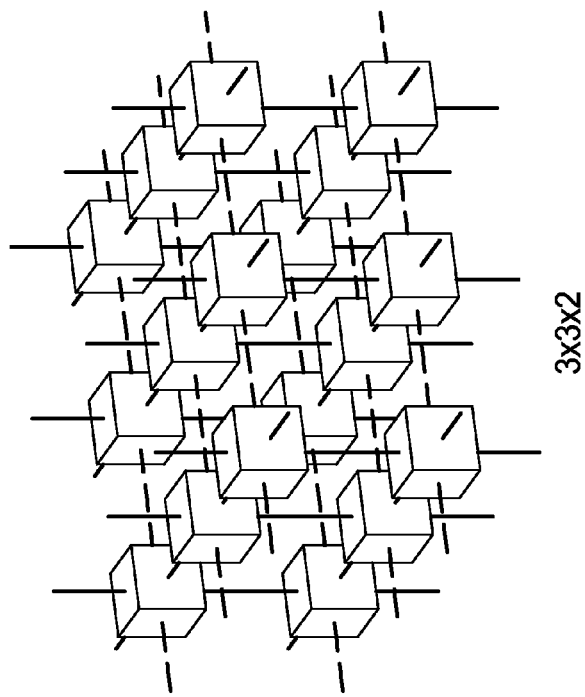
Figure 4C:
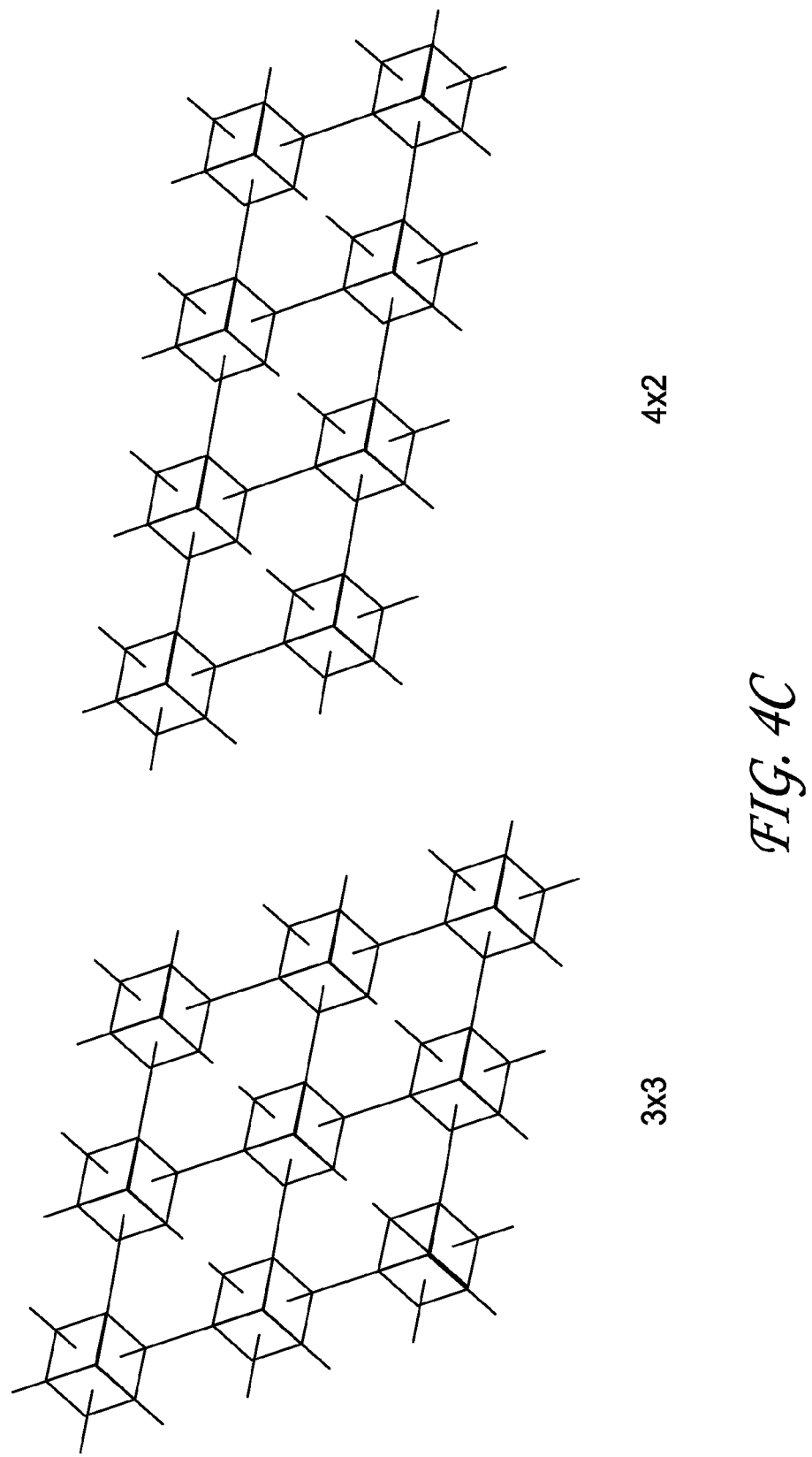

FIG. 4B is a simplified perspective view of DDCC arranged in two different example arrays of DDCCs. The two examples of three dimensional processing capabilities are shown in arrays of 3×3×2 and 4×2×2. DDCC can be arranged in many three dimensional structures of varying in one or more of the x, y, and z direction. FIG. 4C provides additional examples of arrays of DDCCs. In the examples of FIG. 4C, the DDCC are arranged in a single plane illustrating DDCC configurations of 3×3 and 4×2.

Figure 5:
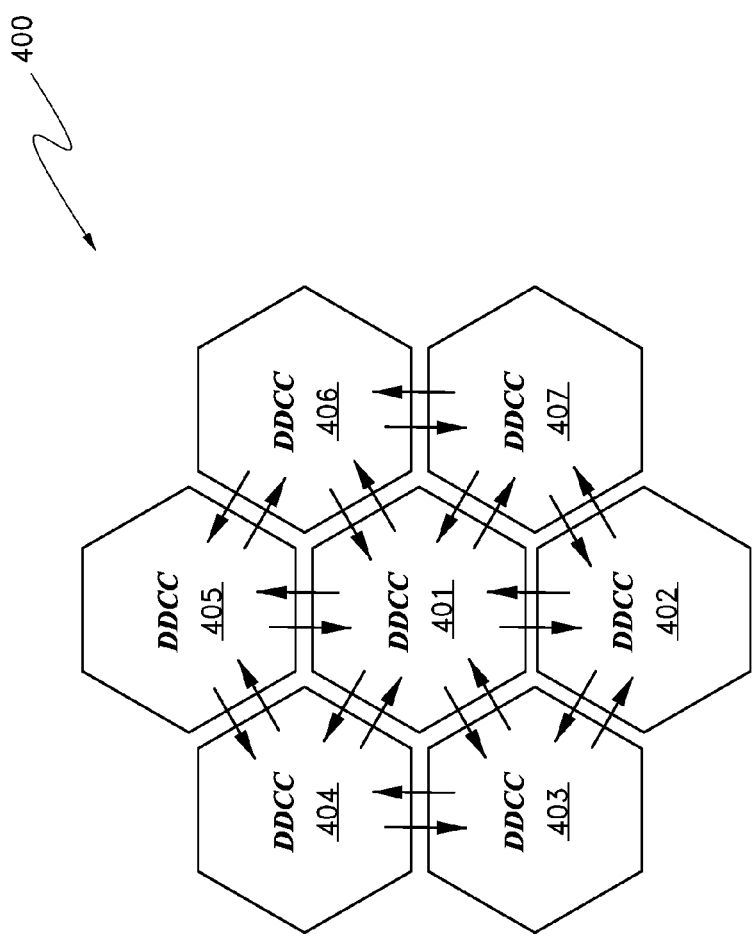
FIG. 5 is a simplified plan view of one embodiment of an arrangement of integrated circuit die DDCC with connections configured to enable communication testing.

FIG. 5 is a simplified plan view of one embodiment of an arrangement 400 of DDCC configured to permit distributed computing systems, methods and apparatus. Distributed computing systems, methods and apparatus may use integrated circuit die to perform a primary test for communications performed between two DDCCs. A primary failure can cause a comprehensive test of the communication lines involved in the communication to be performed. Specifically, as an illustrative example only, the arrangement of FIG. 5 includes seven DDCC 401, 402, 403, 404, 405, 406, 407. Those skilled in the art will appreciate from the present disclosure that any number of DDCC so configured may be nested together. Each of the seven DDCC 401, 402, 403, 404, 405, 406, 407 is configured to house two die, one from each of two layers of die (e.g., as illustrated in FIG. 1). The DDCC 401 is placed at the center of a ring of DDCC including DDCC 402, 403, 404, 405, 406, 407. Accordingly, each of the DDCC 402, 403, 404, 405, 406, 407 is a neighboring DDCC to the DDCC 401. And, in the particular example of FIG. 5, each DDCC, other than the DDCC 401 has three neighboring DDCC including the DDCC 401. For example, the DDCC 403 has the DDCC 401, 402, 404 as neighbors. In one embodiment, a DDCC has direct communication with at least one of the neighboring DDCC. In one embodiment, a DDCC has direct communication with all of the neighboring DDCC. Furthermore, in one embodiment, a DDCC communicates with non-neighboring DDCC through a data path that traverses one or more neighboring DDCC. In various embodiments, the dies included within each DDCC include features to enable more efficient communication with neighbors and non-neighbors. For example, a data path between the DDCC 403 and the DDCC 406 exists through the DDCC 401 and at least another data path exists through DDCC 404 and 405. Either of the aforementioned data paths can be made more efficient by routing data away from or around the primary functional blocks on the dies included in the DDCC 401, 404 and 405. In other words, by preventing transient data from interfering substantially with the primary function of DDCC on the data path, which do not directly contribute to the processing of the data at either end of the data path, delays in many cases are reduced.

FIG. 5 illustrates the non-orthogonal communication of the hexagonal structure and the three dimensional processing capability of the DDCCs. Communication between chips of two DDCC can perform a primary test of the communication. A plurality of chips in a system can simultaneously test for a primary test failure. If failure of the primary test occurs, a comprehensive test of the sending and receiving ports can be run to determine the exact failure. If the result of the comprehensive test determines that the processing of the chip under test is suspect, the comprehensive test may cause the chips surrounding the chip under test to enter into a comprehensive test mode for testing the chip under test.

Figure 6:
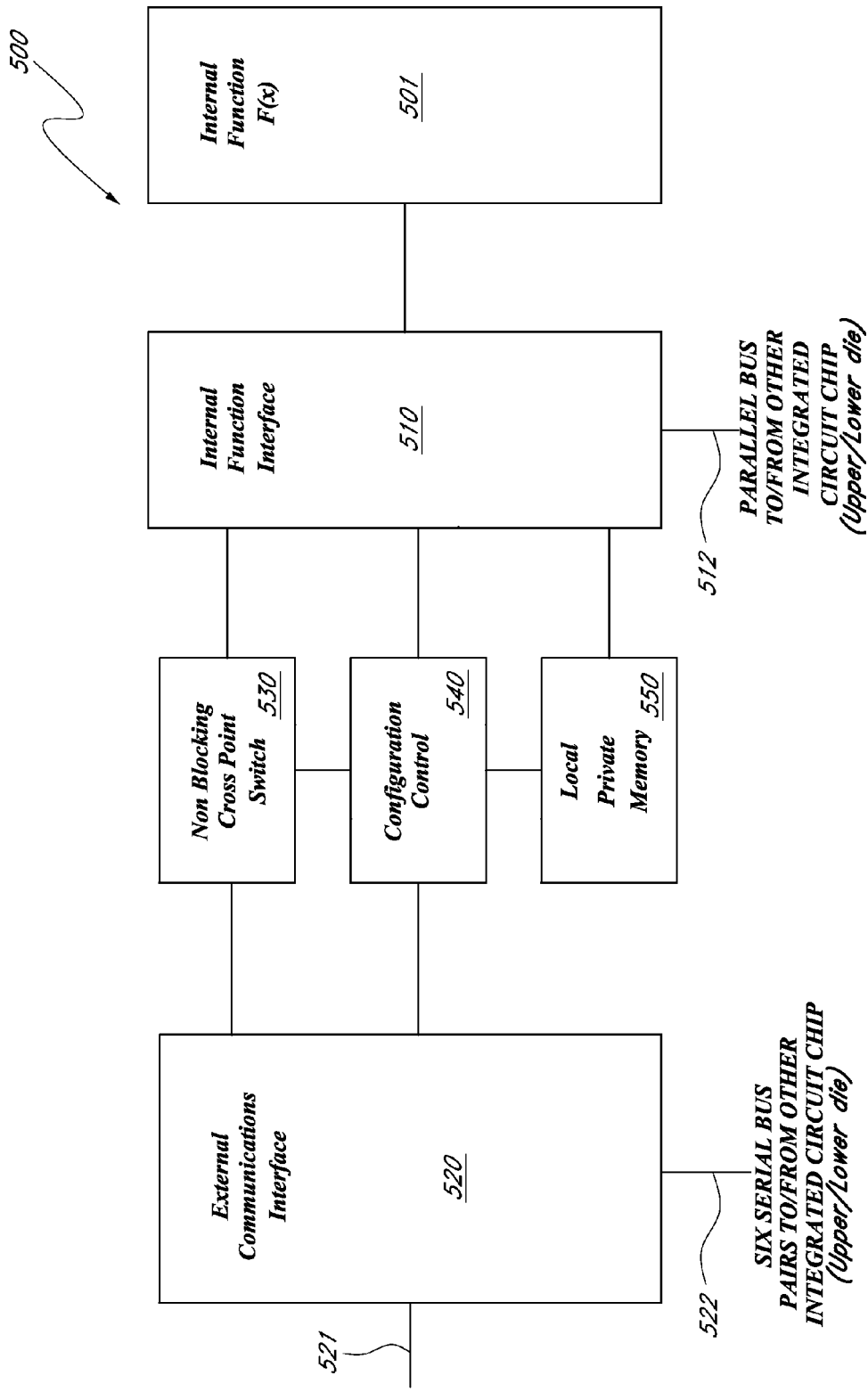
FIG. 6 is a block diagram of one embodiment of an integrated circuit die arranged to enable distributed computing systems and methods.

FIG. 6 is a block diagram of one embodiment of integrated circuit components arranged to enable distributed computing systems, methods and apparatus. Specifically, FIG. 6 illustrates an on-chip system 500 that includes features, in addition to the primary function of the chip, to enable more efficient communication with neighbors and non-neighbors. In particular, the system 500 includes an internal function module F(X) 501 which is the primary functional module of the on-chip system. For example, the internal function is a graphics processor, a general purpose processor, a data storage element or any other type of device that may be embodied as an integrated circuit. That is, the internal function module 501 can be any one of several functions, such as a processor, a memory, a multi-core processor, intelligent memory, a multi-array memory, a field programmable gate array (FPGA), an application specific integrated circuit (ASIC), an array sensor, a motion sensor, or a linear circuit. The internal function of the block is dependent on the ICs packaged within the chip of the DDCC at layout level. Processed data from the internal function block is received in a parallel fashion and formatted into serial data which is output from the IFI building block.

The system 500 also includes an external communications interface module (ECI) 520, a non-blocking cross-point switch 530, a configuration control processor (CCP) 540, a local private memory (LPM) 550, and an internal function interface (IFI) 510. These five components may make up the dual interface of each of the two integrated circuit chips of each DDCC. The ECI 520 is coupled to the non-blocking cross-point switch (CPS) 530, and the CCP 540. The ECI 520 also includes an external connection 521 that is connectable to external devices off-chip either serially or in parallel or a combination of serial and parallel. The non-blocking cross-point switch 530 is also coupled to the CCP 540 and the IFI 510. The LPM 550 is also coupled to the CCP 540 and the IFI 510. The IFI 510 is coupled to the internal function module 501. In one embodiment, the connection between the IFI 510 and the internal function F(x) module is a parallel data interface. In one embodiment, the connection between the IFI 510 and the internal function module is a serial data interface. The internal function F(X) can also be a linear function with the ability of the external communications interface module (ECI) 520, the non-blocking cross-point switch 530, and the internal function interface (IFI) 510 to pass linear signals.

The ECI 520 provides direct unshared and shared communication connection with one or more neighboring DDCC. For example, the ECI 520 provides communication connection with six neighboring devices. Indirect communication with remote (non-neighboring) devices is also provided via pass-through data paths through neighboring devices. A communication connection between devices provides transfer of information such as instructions, data, commands, and status.

In one embodiment, the ECI 520 contains six output signal lines and six input signal lines forming six independent communications signal line pairs for communication outside the die. Thus a hexagonal DDCC can be configured to have six interface sets, one set on each of the six sides of the DDCC. In one embodiment, each of the six communications sets is made up of four signal lines, two independent full-duplex serial communication signal pairs, wherein one pair is connected to a first upper integrated circuit chip and the second pair is connected to a second lower integrated circuit chip. As mentioned above, each interface set can also include two power connections and five ground connections in addition to the four signal lines.

In one embodiment, static and/or dynamic control of the ECI 520 is performed by the CCP 540. For example, the CCP 540 provides re-configuration activation and deactivation of the input signal lines, activation and deactivation of the output signal lines, activation and deactivation of a power-conserving sleep mode, selection of digital or linear transmission mode, configuration to select an orientation of the installed die to its device package, master clock signal port selection for internal clock activation, preamble message disassembly and dissection, and exception handling.

In one embodiment, the CCP 540 also controls other elements of the device. One function of the CCP 540 is to provide assembly information and static and dynamic control of various elements of the device, including the ECI 520, the CPS 530, the LPM 550, and the IFI 510, to which the CCP 540 is connected via one or more buses.

Certain configuration information such as a very small iterative routine and history data can be written into a Write Once Read Many (WORM) element of the LPM 550 during manufacture and test. During various stages of manufacturing, assembly, and test operations, other data can be written into the LPM WORM by the CCP 540, such as the date of die wafer manufacture; various tests, dates, and results; wafer lot number; and other historic information.

Static and dynamic configuration and reconfiguration performed by the CCP 540 and/or combinatorial logic can be conducted at any time, including during program loading and execution. Safeguards can be implemented to prevent interference of executing programs or routines, except at prescribed operating points. For example, in one embodiment, the system can change from operating with one set of operating rules to operating with another set of operating rules. In one embodiment, more than one operating system will reside in a device package to allow the system to quickly change operating functions, on demand, to be able to respond to a different set of operational conditions. The system can respond by changing from one operating system to another, resulting from an external stimulus, to provide dynamic reconfiguration. Dynamic reconfiguration has the potential to expand the capability of a processing system by including multiple operating systems that can be selected to handle different computing needs, problems, or assignments. This can expand the range of work, processing power, and speed in handling complex tasks. It also allows the processing system to address multiple incoming threats, improving overall security. Multiple operating systems can quickly respond to a threat and, if the threat increases, while in a threat operating environment, the operating system can be elevated to a higher threat level by changing to another operating system. In another embodiment, the system, or portions thereof, can load a secondary operating system based on the primary threat. As mentioned above, the CCP 540 can control this configuration and reconfiguration of all the elements of a device die.

In one embodiment, the CCP 540 is configured to operate from firmware and software stored in the LPM 550. The LPM 550 can include, for example, write once read many (WORM) memory, random access memory (RAM), and electrically erasable and programmable read-only memory (EEPROM), which include flash memory. In another embodiment, the CCP 540 is additionally or alternatively configured to operate from firmware and software stored in a bulk memory system of the internal function of one or both of the embedded ICs.

In one embodiment, the CCP 540 of a device can read and write from the memory of the device, including erasing EEPROM of the device. In another embodiment, the CCP 540 can directly address the memory of neighboring devices and indirectly address remote memories, including both bulk memories of the internal functions and the LPM 550 of remote devices. In one embodiment, only the local CCP 540 of a device can write information into the WORM memory of the device; however, at least a portion of the information stored in the WORM memory can be accessible to other devices on a read only basis. In one embodiment, some of the information in the LPM 550 or bulk memory can only be accessed by the local CCP 540.

Certain embodiments described herein can reduce reliance on firmware and software to perform certain tasks and/or can speed up the performance of particular tasks In one embodiment, the LPM WORM memory is used to retain information that is not intended to change, such as information relative to the history of the die, process tracking information that becomes available during the manufacture and assembly process, or a start-up "boot strap" routine. In one embodiment, the "boot strap" firmware routine is a sparingly programmed reiterative loop routing intended to provide communication in a simple form so as to provide only the ability to load another program with a more substantial communication routine. In one embodiment, the routing includes a method whereby the CCP 540 escapes the reiterative loop to execute the second more substantial routine that allows further communication with other memories, registers, and logic of the die.

In one embodiment, the LPM 550 includes random access memory (RAM), accessible by the CCP 540. The RAM can include a volatile RAM scratch pad memory. The RAM can provide, among other things, volatile software program storage and temporary data storage. Because of the RAM memory volatility, any data in RAM memory can be lost in the event of a power failure or a complete power shut down. Thus, in one embodiment, a minimal current or voltage is implemented to prevent data from being lost when the chip is in a sleep mode of operation.

In one embodiment, the LPM 550 includes EEPROM for storage of data that is semi-permanent, such as constants, or storage of firmware. The EEPROM is non-volatile but can be electrically erased and re-written.

Write Once Read Many (WORM), Random Access Memory (RAM) and Electrically Erasable Programmable Read Only Memory (EEPROM) can be addressed as a block, that is, each has an addressable block of addresses within a block of addresses.

In one embodiment, the LPM 550 stores permanent data as well as dynamically changing data. Permanent data includes information such as manufacturing and assembly information and specific bootstrapping information. Dynamic data includes Configuration Control Processor software and firmware program code and parameter data for the setup and control of internal portions of the device, including the local internal function interface 510.

In operation, the CPS 530 generally provides selective connection between lines of the ECI and the IFI. In one embodiment, the CPS is a non-blocking switch which takes, as input, clock/data signals from the ECI and the IFI and provides, as output, at least one of those same signals to the inputs of the ECI and IFI.

In one embodiment, the CPS 530 receives data from twelve ECI inputs and four IFI inputs. In one embodiment, the source and destination of signals are addressed via address registers which can include: source of all sixteen input signals as a group, destination of all sixteen output signals as group, source of all ECI input signals as a group, destination of all ECI output signals as a group, source of all external ECI input signals as a group, destination of all external ECI output signals as a group, source of all internal ECI input signals as a group, destination of all internal ECI input signals as a group, source of all IFI signals as a group, destination of all IFI signals as a group, source and destination of all input and output signals as group, or individually selected source and destination input and output signals as group.

The content of the CPS address registers can be updated by the incoming data address. The content can also be overwritten on at least a temporary basis by the CCP until control is released by the CCP 540. In one embodiment, when the CCP 540 takes control, it shuts down or diverts the effected signals and alerts the effected devises so as to prevent loss of data. Also, in one embodiment, the CCP 540 has the ability to redirect the input to output signal switch selection where data is routed between two devices via this intervening device.

In one embodiment, the CPS 530 is a 16×16×1 switch that steers data between twelve external data connections of a die and/or four internal data connections of the IFI with the die under direction of the CCP 540. In one embodiment, the DDCC die utilizes six of the twelve external connections for communication to a first die within a neighboring DDCC and the remaining connections to a second die within the DDCC. Although in one embodiment, the steering is performed by the CCP 540, in another embodiment, such as can be used during bootstrap/debug operations, firmware can set specific CPS 530 connections to steer data and controls from the ECI 520 to locations within the LPM 550 and to the controls of the CCP 540 via the IFI 510.

The CPS 530 contains connections to the ECI 520 and the IFI 510. The ECI 520 is described in detail above, whereas the IFI 510 is described below. The IFI 510 provides connections (buses) to the internal function module 501 which can include any logic function such as memory, data processor, ASIC, FPLA, sensor, etc. For example, depending on the internal function module 501, the IFI 510 can provide multiple 128-bit buses for connection to the internal function module F(x) 501.

In operation, the IFI 510 controls direct communication access to the internal function module F(x) 501. As such, it receives all or substantially all signals originating from the internal function module F(x) 501. The ECI 520 controls direct communication access with external devices. In one embodiment, the ECI 520 determines whether or not a packet is addressed to be processed by the internal function module F(x) 501 while the packet is being received. For example, the packet can include a header that is decoded by the ECI 520 while the packet is being received. If the packet can be and/or is addressed to be processed by the internal function module F(x) 501, the ECI 520 passes, or allows the packet to continue to the non-blocking CPS 530 where it continues to pass through the CPS 530 to the IFI 510 to the internal function module F(x) 501.

On the other hand, if the packet is addressed for another chip and/or cannot be serviced locally, and is thus merely passing through the system 500, the ECI 520 continues to forward the packet to another chip, thereby preventing the packet from disturbing the primary function of the on-chip system 500 and not requiring storage of the data in memory (store and forward).

In one embodiment, the chip of the DDCC operates internally in serial fashion, with the exception of the IFI 510 which can operate in serial or parallel. In one embodiment, the internal function includes a parallel internal function, P(X). For example, P(X) can be implemented as a parallel processor or as a parallel memory, sensor, scan array, any function that originates as a parallel device that can be contained in the allotted area of the DDCC.

In another embodiment, the internal function includes a serial internal function, SF(x). Serial processing arithmetic logic units (ALUs) provide certain advantages over parallel ALUs. One advantage is that serial processors are generally implemented with fewer logic elements than a parallel processor of equal capability. In some cases, a serial processing unit is much simpler than the parallel equivalent, having less transistors and/or a simpler design layout.

Further, many peripheral devices such as keyboard, mouse, data storage disks, monitors, music, USB, internet, etc., use a serial transmission interface. Using serial communications uses fewer wires, smaller less expensive connectors, and each device does not require a parallel-to-serial data converter to receive data and a serial-to-parallel data converter to send data. Since the above devices are all naturally serial devices, the logical transmission interface can be serial transmission of data.

Embodiments illustrating communication with a serial device are described below. In one embodiment, the system uses the clock signal supplied by the peripheral device to transfer data in both directions. Although the clock signal supplied by the system to the peripheral device can be many, many times faster than the peripheral clock rate, reliable transmission can still occur. When the system wishes to communicate with the peripheral device, the system places its high speed clock signal on the transmit line to the peripheral device. Whether or not the peripheral device can follow the clock signal, it will easily be able to discern the presence of signal on the line and send its slower clock signal back to the system on its transmit line. In response, the system can switch from its normal transmitted clock frequency to the speed of the peripheral clock signal and send the lower speed clock signal back to the peripheral device. Using this lower-speed received clock from the system, the peripheral device can then accept the signal data. In the above embodiment, the system initiated communication with the peripheral device. In another embodiment, communication is initiated by the peripheral device. In one embodiment, a similar method is used.

Described below are various modes of communication operation and cluster and nodal control processing enabled by these various modes. Those of skill in the art will appreciate that alternative embodiments can exclude some of the described modes or include other modes not described in detail herein.

Direct addressing of resources of near neighbor or adjacent devices for passage of instructions, data, commands and status can use the (TRA) address contained in a standard format and protocol, as in all communications between devices. Generally, as used herein, the phrase "near neighbor" refers to adjacent devices.

If the direct path port is busy or reserved, the message can be placed in a port queue for later transmission or sent as an indirect message via another intervening device. If the port is not available for some other reason, such as failure, the message can also be sent indirectly via another intervening device. If the port is reserved it can still be able to transmit messages, stored in queue, during non-busy periods of the reserved transmission port. Reserved ports can be configured to operate in one of at least two ways. In one embodiment, the reserved port is locked to a different device. In another embodiment, the device can share the port, holding priority access to the port for the reserving device.

With indirect addressing, the path to the remote destination terminal device can be selected in several ways. In one embodiment, indirect remote addressing takes place via at least one intervening device.

In one embodiment, particularly useful when there is a great amount of data to be transmitted or if time sensitivity cannot tolerate interruptions, there is provided a pre-dedicated path from the sending device to the remote receiving terminal device. To dedicate paths in intervening devices, an originating device can send a message to a remote receiving terminal device and via this message pre-dedicates the path along the way, even in intervening devices. In one embodiment, this message includes an indication to either lock the dedicated path or to not lock the dedicated path. In one embodiment, the pre-dedicated path remains in effect until instructed by the originating device to sever the path in a similar manner to that used to initiate the path. In another embodiment, the pre-dedicated path is severed after a predetermined amount of time if it is not used, thereby freeing system resources. In one embodiment, if the message indicates that the path is not to be locked, a higher priority transmission can request temporary use of the path on a non-interfering basis.

Reserving a path, in one case, simply means that the reserving device has the highest priority and will bypass the transmission queue and go to the first position of the queue. The reserved port can still be available to transmit messages from the port queue on a First In First Out (FIFO) basis. If the transmission path must always be available to the reserving device, a second case can provide the ability of the CCP 540 to lock out storage of messages to and/or transmissions from the queue.

Another embodiment of remote transmission is to place data in an available port queue for transmission on a first in (come) first out (served) (FIFO) basis when the queue is available.

Yet another embodiment of remote transmission is to pre-assign, by priority, positions in the port queue for transmission. This embodiment can advantageously be used for non-interfering transmission to/from the queue.

Yet another embodiment of remote transmission is a so-called "Hand-Off" of a message destined for a remote terminal device from the originating device to a near neighbor device. The receiving near neighbor device has the option to follow the addressing guideline it receives from the originating device; however, it also has the option to modify the address route because the addressed port has a large built up queue, the port is reserved, there is a better route available, to balance traffic of a transmission port, or for other reasons. The received device will then hand off the message to the next device over the selected port.

Still another embodiment of remote transmission can advantageously be used when a message is to be sent to all or a prescribed set of devices. Thus, the message is broadcast to the devices by spidering out from the originating device to the intended devices. This broadcast will take place in one of at least three ways: i) directly and automatically after an authority device transmits a "Device Reset" to the intended devices; ii) on a demand basis; or iii) on a non-interfering basis. A broadcast can take place via devices that are not a designated broadcast recipient. Broadcasting can be used, for example, to distribute software code and/or data to many carriers in a spider-type fashion to 'bulk load' groups of carriers.

Figure 7:
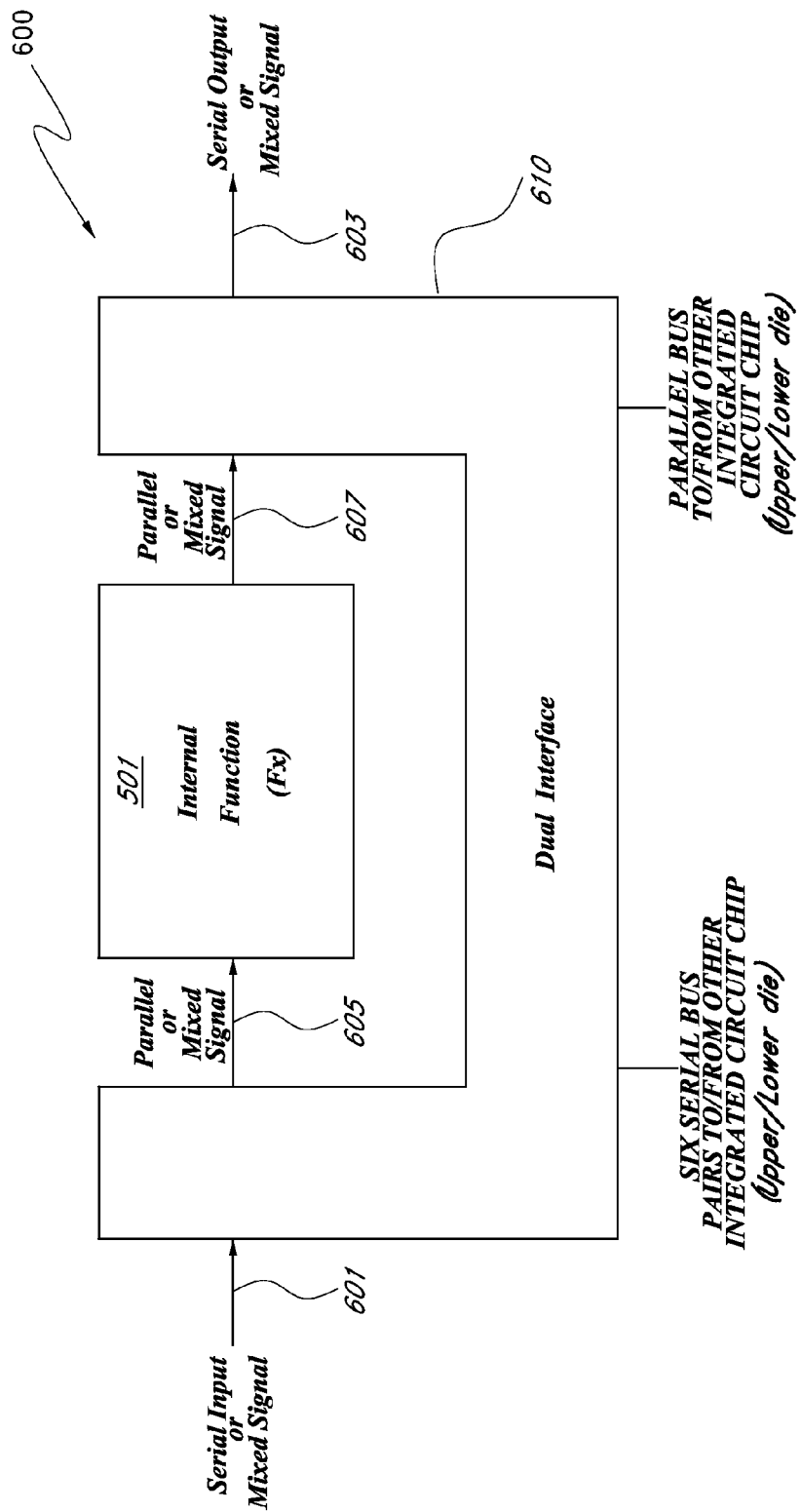
FIG. 7 is a block diagram of one embodiment of a dual interface and an internal function unit F(X) of the integrated circuit die of FIG. 6.

Connection between the IFI 510 and the CPS 530 provide a pathway for instructions, addresses, commands, data, status, and other information between the ECI 520 and the internal function module 501. For test purposes, the CCP 540 can test the internal function or interact with the signals of the ECI 520 to perform tests of the ECI 520 or the internal function. The CCP 540 can, for example, cause the diversion of pre-determined signals to be read from certain locations of LPM 550 and signals to be stored in certain locations of LPM 550. In this way, the CCP 540 can access both local private memories and the internal function memory via the interface registers. Similar to FIG. 6, FIG. 7 illustrates that six serial pairs can connect the dual interface 610, which can include a ECI 520, to a companion chip in the DDCC and can provide access from/to the IFI 510 to the companion chip in the DDCC over the parallel bus.

As shown in FIG. 6, the IFI 510 provides connections between the CCP 540, LPM 550, CPS 530 and the internal function module F(x) 501. In one embodiment, the internal function includes a processor in the lower die position and at least one of a memory, sensor, imager, or second processor in the upper die position. In one embodiment, the internal function includes a processor in the lower die position and a bulk memory in the upper die position. This processor-memory configuration can directly execute software or firmware applications stored in the memory through the use of parallel signal buses. In another particular embodiment, the internal function includes a processor in the lower die position and a sensor or imager in the upper die position, wherein the sensor or imager in the upper die position also includes memory. This memory can, for example, store software or firmware to support the sensor or imager functionalities.

A cluster with or without nodes can be capable of processing operations that standalone elements are incapable of processing. In one embodiment, "lock step execution" is controlled, not on a clock basis, but on an instruction execution basis. A provision to prevent system lockup can also be included.

In one embodiment, a Nodal Control Processor (NCP) provides direct access from the periphery input signal of a DDCC through the ECI 520 and the CPS 530 to the IFI 510 parallel register that services the internal function. Likewise, the internal function data is placed in a parallel output register in the IFI 510, passed directly through the CPS 530 and the ECI 520 to the periphery signal connection. In one embodiment, NCP can disallow port communication access, of unused ports, so as to not allow disruptive requests from other processes external to a node and not used in the node.

Each cluster and/or node of a system can be assigned to specific functions or perform as a general purpose processor. For example, in various embodiments, a node can be used as a single processor, a pre-processor, a data processor, a post processor, an input processor, an output processor, an intelligent memory control, an interface control processor, a memory control processor, an array processor, a wave front processor, or various permutations and combinations of the above. It will be appreciated that other interoperability uses of clusters/nodes is also envisioned. Further, each node can be dynamically and statically reconfigured to control nodal connections (e.g., change cluster/nodal connections).

In one embodiment, all DDCC in a node are similar and/or substantially identical. In other embodiments, multiple different kinds of DDCC are present in a node. While each of the DDCC in a node may or may not be identical, a few of the DDCC (by reason of their unique mounted position on the substrate) can be used as interface controllers. Various interface embodiments are described above. Another functionality of a DDCC is as a NCP, which can provide setup and control of a cluster, node or multiple nodes. Multiple nodes can be combined to work as a super-node.

FIG. 7 is a block diagram of a dual interface 610 and an internal function unit F(x) 501 of the integrated circuit die of FIG. 6 The dual interface and the internal function unit F(x) 501 enable reconfigurable distributed computing and distributed memory systems, methods, and apparatus. Specifically, FIG. 7 illustrates a simplified version of system 500 that includes features, in addition to the primary function of the chip, to enable more efficient communication with neighbors and non-neighbors. The on-chip system 600 can be the same as the on-chip system 500 illustrated in FIG. 6. Accordingly, elements common to both on-chip systems 500 and 600 share common reference indicia, and only differences between the two are described herein for the sake of brevity. Within the system 600, the external communications interface and internal communication interface are combined into a dual external-internal communications interface 610. The dual external-internal communications interface 610 includes a serial input 601 (one of 12) and a serial output 603 (one of 12) that are connectable to external devices off-chip. The dual external-internal communications interface 610 also includes a parallel output 605 and a parallel input 607 that are connectable to the internal function module F(X) 501.

Accordingly, in operation, the one of six serial input 601 receives serial data communications from off-chip devices. The dual external-internal communications interface 610 converts the received serial data communications into a parallel stream which is transmitted to the internal function module F(X) 501 via the parallel output 605. In a reciprocal manner, the parallel input receives data communications from the internal function module F(X) 501. The dual external-internal communications interface 610 converts the received parallel data communications into a serial stream which is transmitted to external devices via the one of six serial output 603.

Figure 8A:
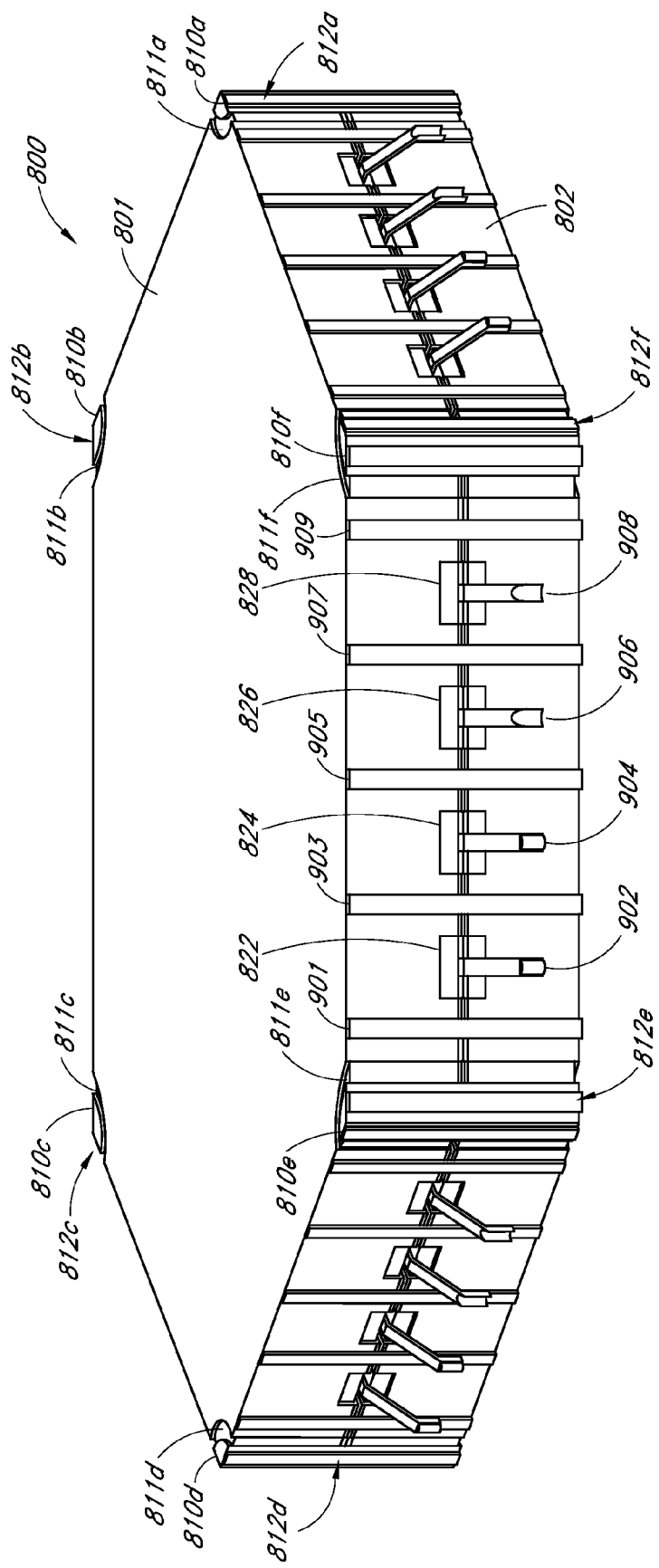
FIG. 8A is a simplified perspective view of one embodiment of a hexagonal shaped dual die chip carrier (DDCC) including two integrated circuit die.

FIG. 8A is a simplified perspective view of one embodiment of a hexagonal DDCC 800 including two integrated circuit die. The DDCC 800 includes sixty six connections that can be uniformly distributed about the six sides of the hexagon. The connections include twelve power connections, thirty ground connections, and twenty-four signal flying lead signal connections. As mentioned above, in one embodiment, the power connections and ground connections are attached directly to the substrate via castellations for power and power return ground distribution. The signal connections are flying lead connections between flying leads of two DDCC. The flying leads exit the DDCC through a dielectric insulator to form a micro strip high impedance communication connection with a flying lead of a neighbor DDCC. The communication between the two DDCCs can be accomplished with three physical connections: 1) a first flying lead to the die of the first DDCC; 2) a second flying lead to the die of the second DDCC; and 3) a mating of the first flying lead to the second flying lead with an in air electrical connection. In certain embodiments, the receive signal flying leads ends are formed to be concave in shape and the send signal flying leads ends are formed to be convex in shape during manufacture when the TAB conductive tray is cut off and trimmed. However, in other embodiments, the receive signal flying lead ends may be convex in shape and the send signal flying lead ends can be concave in shape.

As illustrated in FIG. 8A, the DDCC 800 has a generally hexagonal shape and includes a TAB conductive tray. A generally hexagonal or substantially hexagonal shape can vary from a hexagon by, for example, having rounded edges, squared edges, beveled edges etc. For the sake of example only, the TAB conductive tray is a sandwiched conduction path that passes power and ground from outside the DDCC package to the upper and lower chips of the DDCC, distributes signals to/from outside the DDCC to the upper and lower chips of the DDCC and provides communication between the upper chip and the lower chip of the DDCC. In one embodiment, the cap 801 and the base 802 of the DDCC 800 are approximately 1.25 inches across and are made of aluminum nitride, which is an insulator with a relatively high thermal conductivity and a thermal coefficient of expansion similar to that of silicon (Si), of which the ICs can be made.

The DDCC 800 also includes twelve power supply castellations 810a, 812a, 810b, 812b, 810c, 812c, 810d, 812d, 810e, 812e, 810f, 812f each of which is located at a respective corner of the DDCC 800. The power supply castellations 810a, 812a, 810b, 812b, 810c, 812c, 810d, 812d, 810e, 812e, 810f, 812f, are electrically isolated from the conductive package base 802 and cap 801 by corresponding un-plated conductive material area of the DDCC shown as 811a, 811b, 811c, 811d, 811e, 811f. As understood by one or skill in the art, a castellation can include a type of plating that can be used, in some cases, to transfer signals or power.

Each side of the DDCC 800 includes five ground castellations coupled to both the package base 802 and the package cap 801. For example, five ground castellations 901, 903, 905, 907, 909 are visible on one side of the DDCC 800. Each side of the DDCC 800 also includes four signal TAB conductive tray flying leads that extend into and out of gaps in the sides of the DDCC 800. For example, signal pins 902, 904, 906, 908 are visible on one side of the DDCC 800. The signal flying leads 902, 904, 906, 908 extend through corresponding gaps 822, 824, 826, 828, respectively, which may be insulated from the cap 801 and the base by 802. In one embodiment, each signal pin is jacketed by a respective dielectric insulating sleeve to form a micro transmission path at least within the respective gap through which the signal pin extends. Moreover, while the DDCC 800 shown has two power castellations, four signal flying leads and five ground castellations on each side, those skilled in the art will appreciate that each side of a DDCC of any shape can be configured to include any number of signal flying leads, any number of grounds castellations, and any number of power castellations.

Moreover, the DDCC 800 can be made in a variety of shapes, including triangular, square, rectangular, and hexagonal as shown in FIG. 8. In one embodiment, the DDCC 800 includes flying lead electrical signal connections between one or more connected DDCCs. Castellation connections may be used for physical support and to distribute and transfer power and ground to each DDCC 800 from its mounting substrate. Castellations may be connected to plated through-hole components called vias. In some cases, the flying leads can flex to compensate for thermal coefficient of expansion (TCE).

Figure 8B:
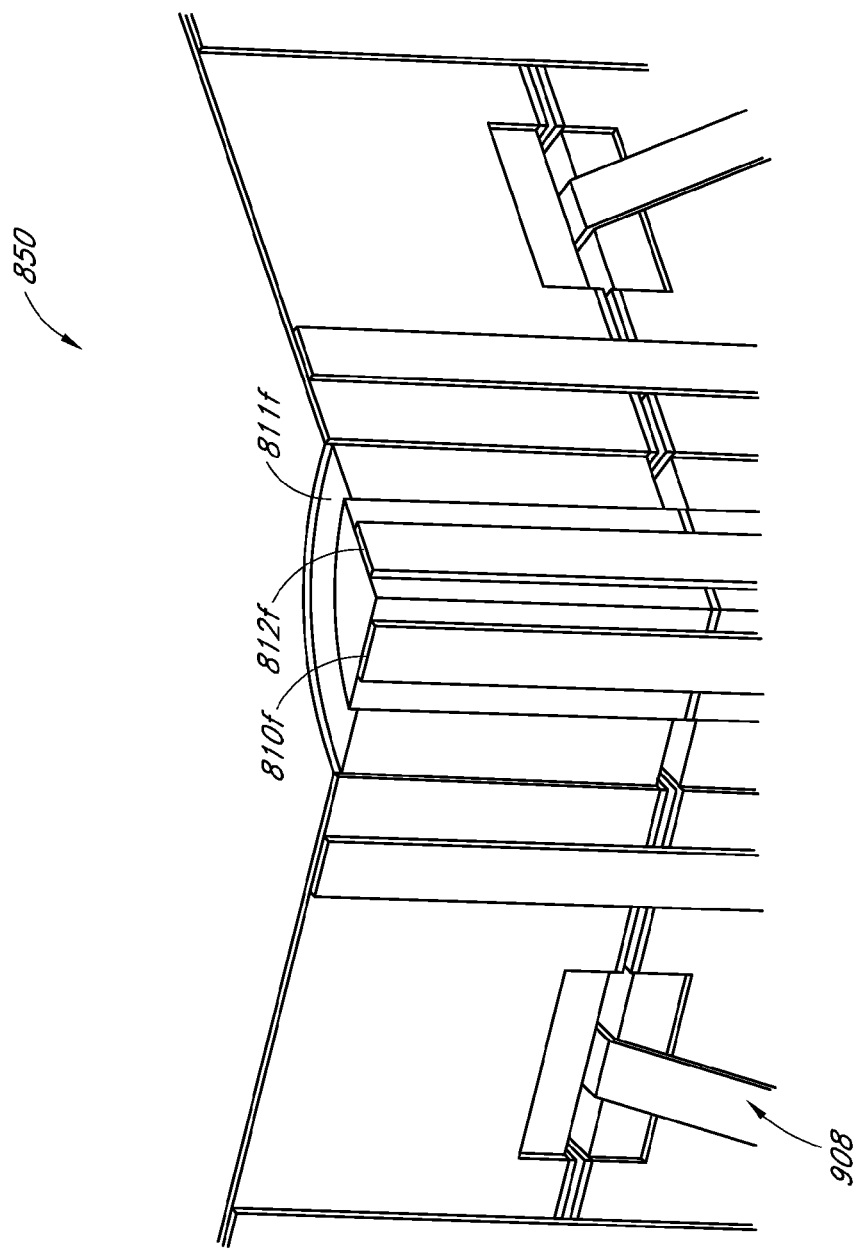
FIG. 8B illustrates an exploded corner view of one corner of the DDCC illustrated in FIG. 8A.

FIG. 8B illustrates an exploded corner view of one corner 850 of the DDCC 800 illustrated in FIG. 8A. As previously described, each corner of the DDCC 800 can include two power castellations. In the example corner 850 of FIG. 8B, the power castellations 810f and 812f are illustrated. These power castellations 810f and 812f may be isolated from the cap 801 and base 802 by the unplated area 811f. In some cases, the unplated area 811f also separated the power castellations from the ground of the DDCC.

Figure 9A:
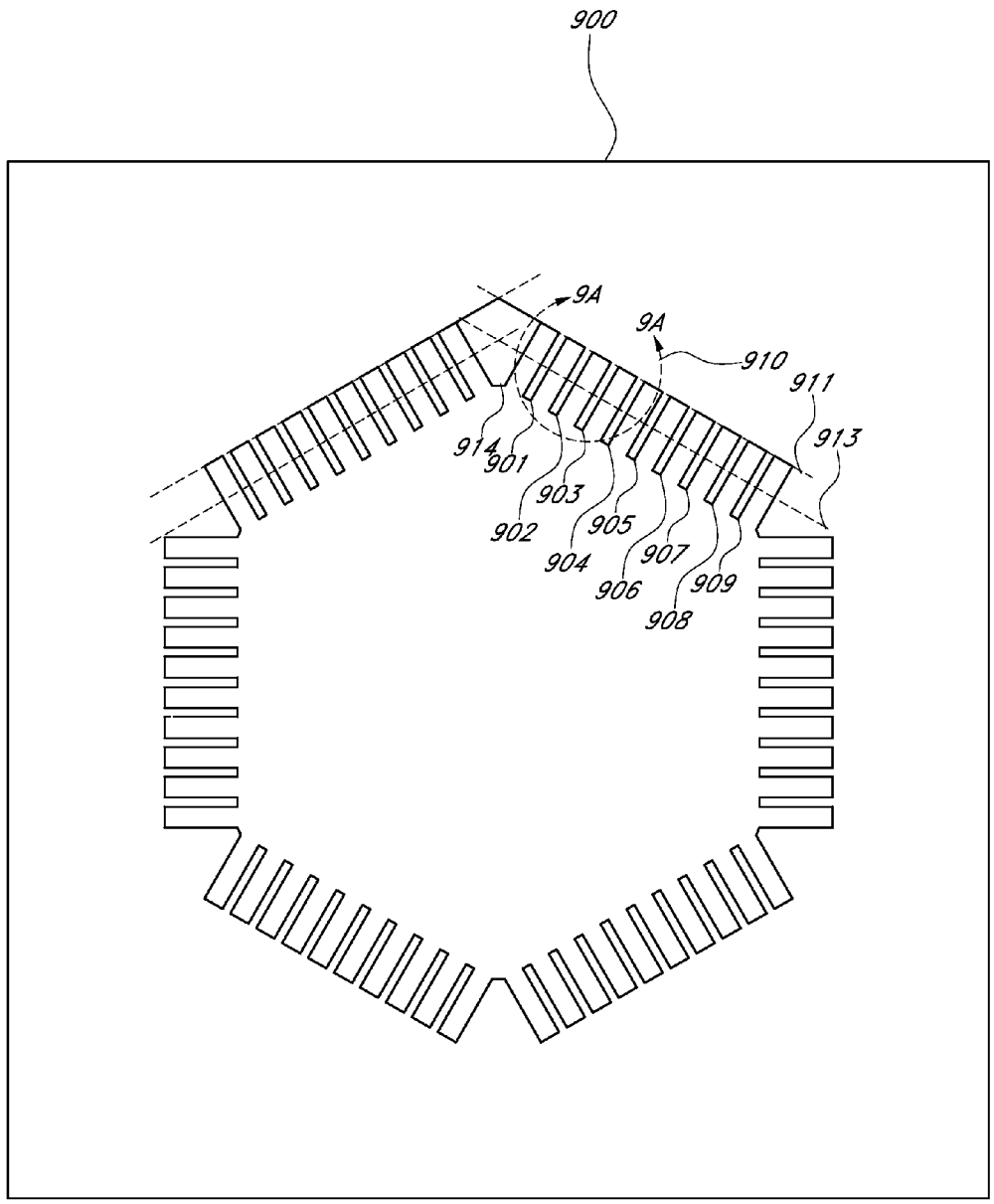
FIG. 9A is a top view of one embodiment of a tape automated bonding (TAB) conductive tray that can be sandwiched between the base and the cap of a DDCC.
Figure 9B:
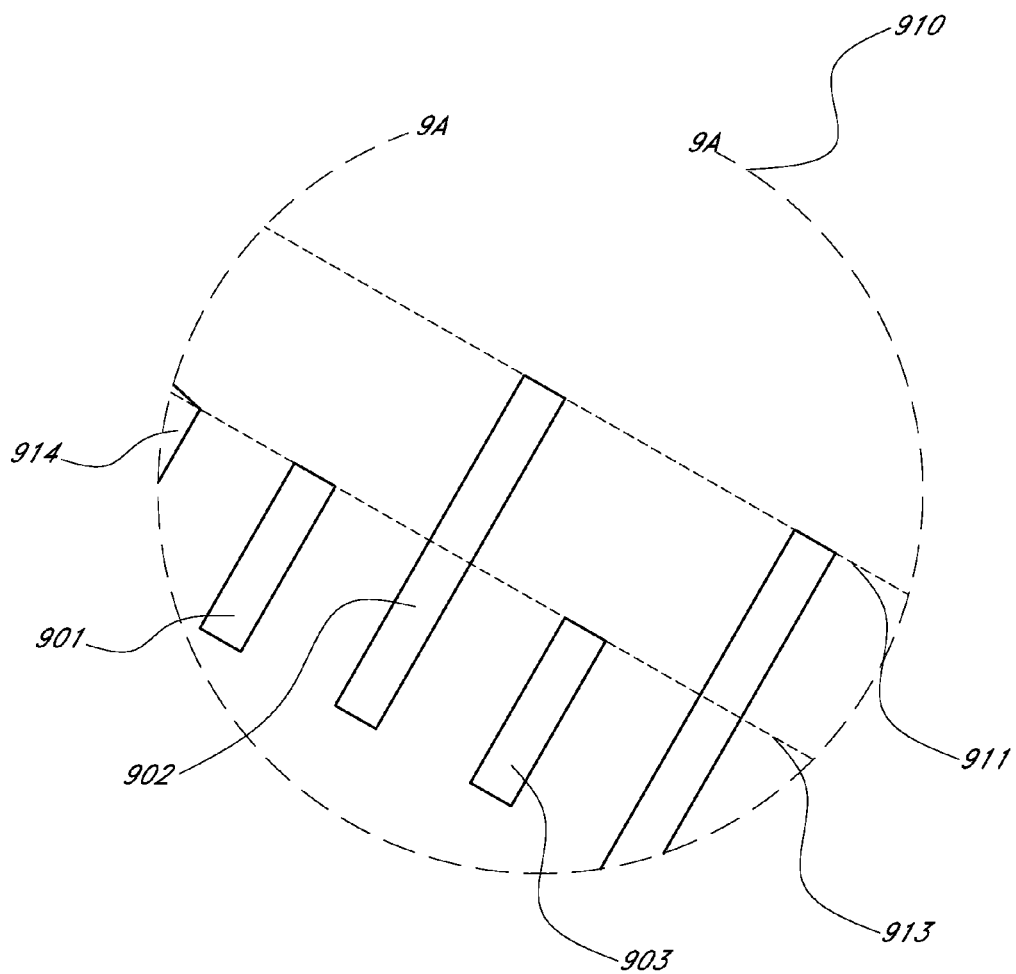
FIG. 9B is an enlarged plan view of one side of the tape automated bonding (TAB) conductive tray of FIG. 9A illustrating the ground and power assembly cutoff points and the signal cutoff and form points of the TAB conductive tray.
Figure 9C:
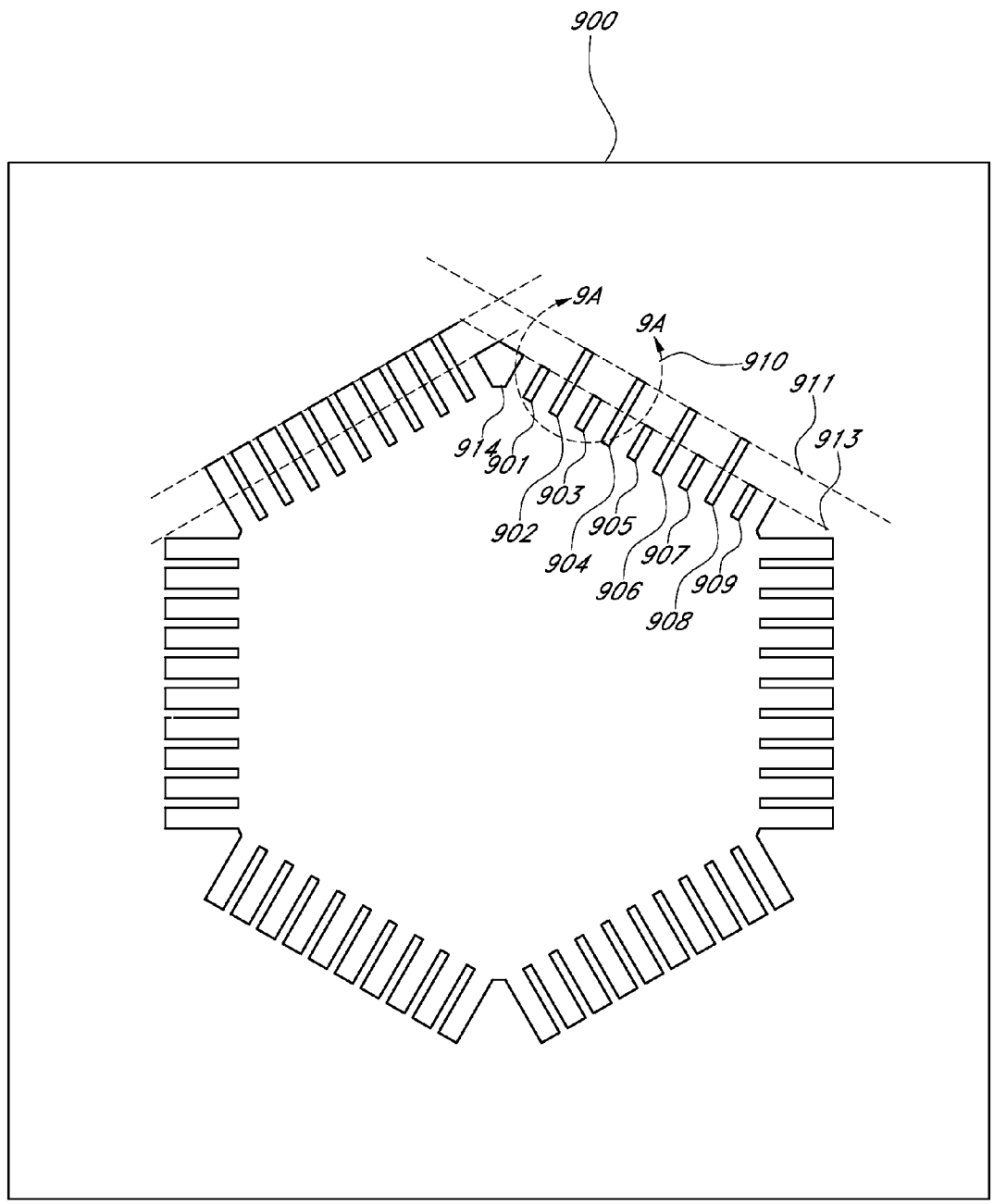
FIG. 9C is a top view of the TAB conductive tray of FIG. 9A showing the trim lines for power, ground, and signal leads.

FIG. 9A is a top view of a tape automated bonding (TAB) conductive tray 900 that can be sandwiched between the base and the cap of a DDCC 800. The TAB sheet 900 provides one method of providing signal, power, and ground tabs to one or more integrated circuit dies included in the DDCC package 800 described above with reference to FIG. 8A. Accordingly, as a continuation of the example of FIG. 8A, the signal pins 902, 904, 906, 908 and ground pins 901, 903, 905, 907, 909 illustrated in FIG. 8A are also shown in FIG. 9A. FIG. 9B is an enlarged plan view of a portion of the TAB sheet 900 of FIG. 9A, which specifically shows enlarged illustrations of the ground pins 901, 903, as well as the signal pin 902. Further, FIG. 9B illustrates the ground and power assembly cut off points and the assembly signal cut off and form points of the TAB conductive tray 900. FIG. 9C is a top view of the TAB conductive tray of FIG. 9A with trimmed power lead 914, trimmed ground leads 901, 903, 905, 907, and 909, and signal leads 902, 904, 906, and 908.

With further reference to FIG. 9A, the signal flying leads 902, 904, 906, 908 are cut to length and formed when the TAB assembly supporting TAB excess material of sheet 900 is cut away along line 911. Similarly, ground pins 901, 903, 905, 907, 909 and power pins 914 are cut to length when the excess material of the TAB sheet 900 is cut away along line 913. In some embodiments, the ground and power pins are sheared away from the TAB sheet 900 due to the use of castellations for the ground and power pins. However, the signal pins may, in some such cases, remain unsheared and can form the flying leads. In certain embodiments, the power and/or ground castellations may be heavy plated traces formed along the side of the base and the cap of the DDCC. The TAB may be soldered to the castellation during formation or assembly of the package. The signal flying leads, power and ground tabs for all other sides of the TAB conductive layer of the DDCC 800 may be trimmed and formed in a similar manner using the unmarked tabs shown in FIG. 9A. In one embodiment, all of the pins are formed simultaneously by shearing away the excess material after the TAB sheet 900 is placed over the combination of the package base 82 and at least one die. In one embodiment, the TAB sheet 900 is made of relatively thin beryllium copper, on the order of two to three thousandths of an inch. In one embodiment the TAB sheet 900 is made of a thin material so as to provide flexure of the signal tabs between two adjacent DDCC (see e.g., FIG. 10A) to compensate for thermal expansion and contraction (TCE). FIG. 9C illustrates one method of manufacturing the TAB conductive layer by etching away the center area, leaving a patterned periphery to support the TAB to be sheared or other method of trimming the power ground and signal leads to the proper length and forming the signal leads during assembly along lines 911 and 913 for example. The receive signal flying leads ends may be formed to be concave and the send signal flying leads ends may be formed to be convex at the time of manufacture.

Figure 10A:
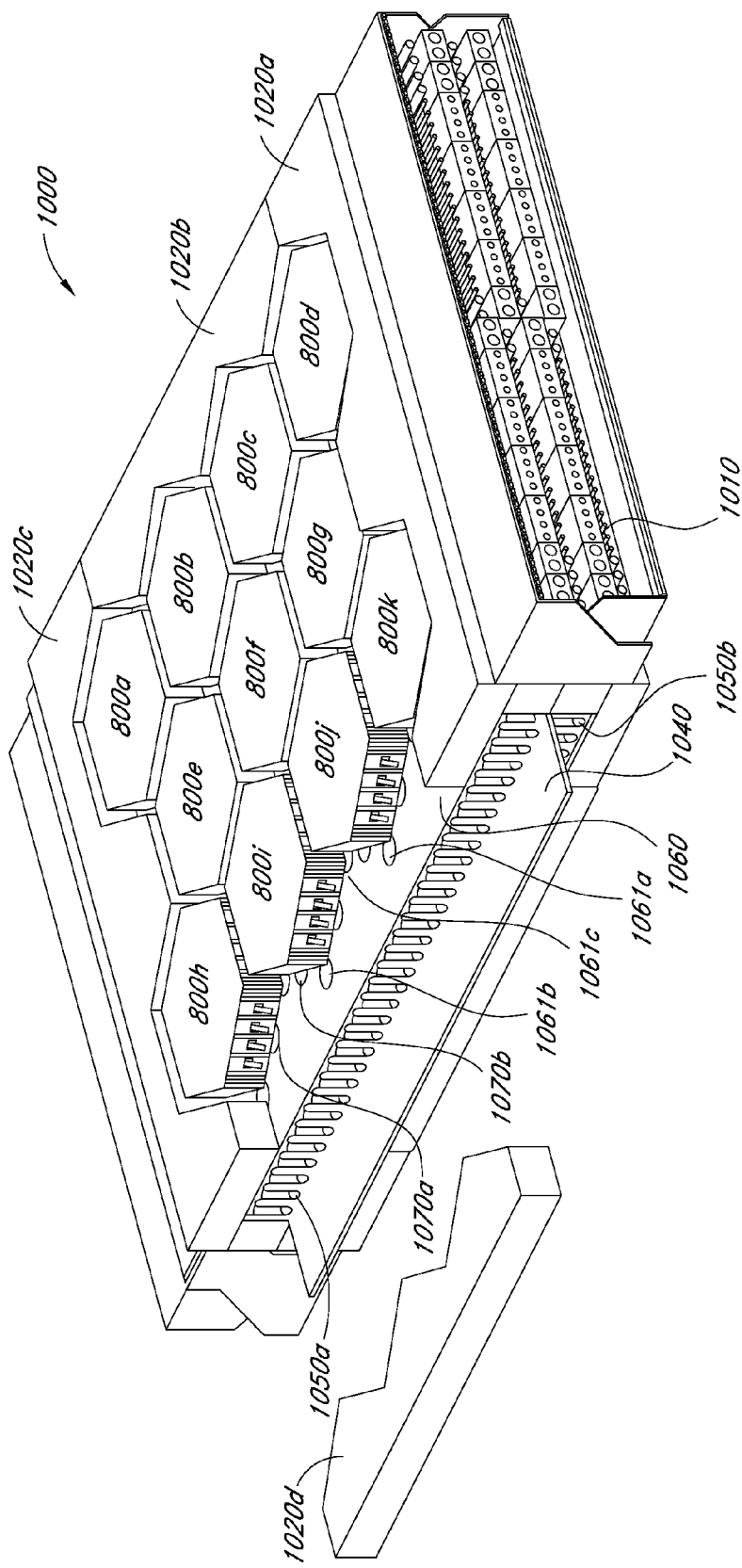
FIG. 10A is a simplified perspective view of one embodiment of a distributed process module element (PME) including a number of hexagonal shaped DDCCs (such as illustrated in FIG. 8A), a number of hermaphrodite connectors, and a number of connector bars.

FIG. 10A is a simplified perspective view of one embodiment of a distributed computing module, referred to herein as a process module element (PME) 1000, which may include a number of the hexagonal DDCCs illustrated in FIG. 8A. A PME 1000 as described herein may include an assembly of multiple substrates with mounted DDCCs and hermaphrodite input/output connectors 1010, including signal and power connections. In one embodiment, the PME is constructed from approximately twenty-five piece parts with a substrate of three layers. Typically, a motherboard is assembled from upwards of six-hundred piece parts and includes a circuit board substrate having between eight and ten layers. As a result, the typical motherboard is generally an assembly-intensive product compared to the PME 1000.

FIG. 10A illustrates one embodiment of a PME 1000 including eleven hexagonal DDCC on each substrate 800*a*, 800*b*, 800*c*, 800*d*, 800*e*, 800*f*, 800*g*, 800*h*, 800*i*, 800*j*, 800*k*, each having substantially the same design as the DDCC 800 shown in FIG. 8A. Although the PME 1000 is illustrated as including eleven DDCC, it should be understood that a PME may include greater or fewer number of DDCC. For example, another PME may include eight, fourteen, seventeen, or fifty DDCC. The PME 1000 includes two DDCC mounting substrates 1060 (only one of which is visible) which is described in further detail below with reference to FIG. 13. However, briefly, the mounting substrate 1060 includes ground vias, such as the first and second vias 1070*a*, and 1070*b* and the power supply vias, such as the first, second and third power supply vias 1061*a*,1061*b*, 1061*c*. The hexagonal DDCCs 800*a*, 800*b*, 800*c*, 800*d*, 800*e*, 800*f*, 800*g*, 800*h*, 800*i*, 800*j*, 800*k* are mounted on one side of the substrate 1060 The PME 1000 also includes sidewalls 1020*a*, 1020*b*, 1020*c*, 1020*d* that can serve the dual function of physically protecting the DDCC flying leads and providing external connections to the hermaphroditic connectors 1010. Sidewalls 1020*a* and 1020*c* may be identical and can serve as the front and rear sidewalls. Sidewall 1020*b* and 1020*d* can be considered top and bottom sidewalls if the PME 1000 stands on the side with the sidewall 1020*b*. The top sidewall 1020*d* is shown displaced from its PME 1000 for clarity to view some of the flying leads of the DDCCs 800*h*, 800*i*, and 800*j*.

Figure 10B:
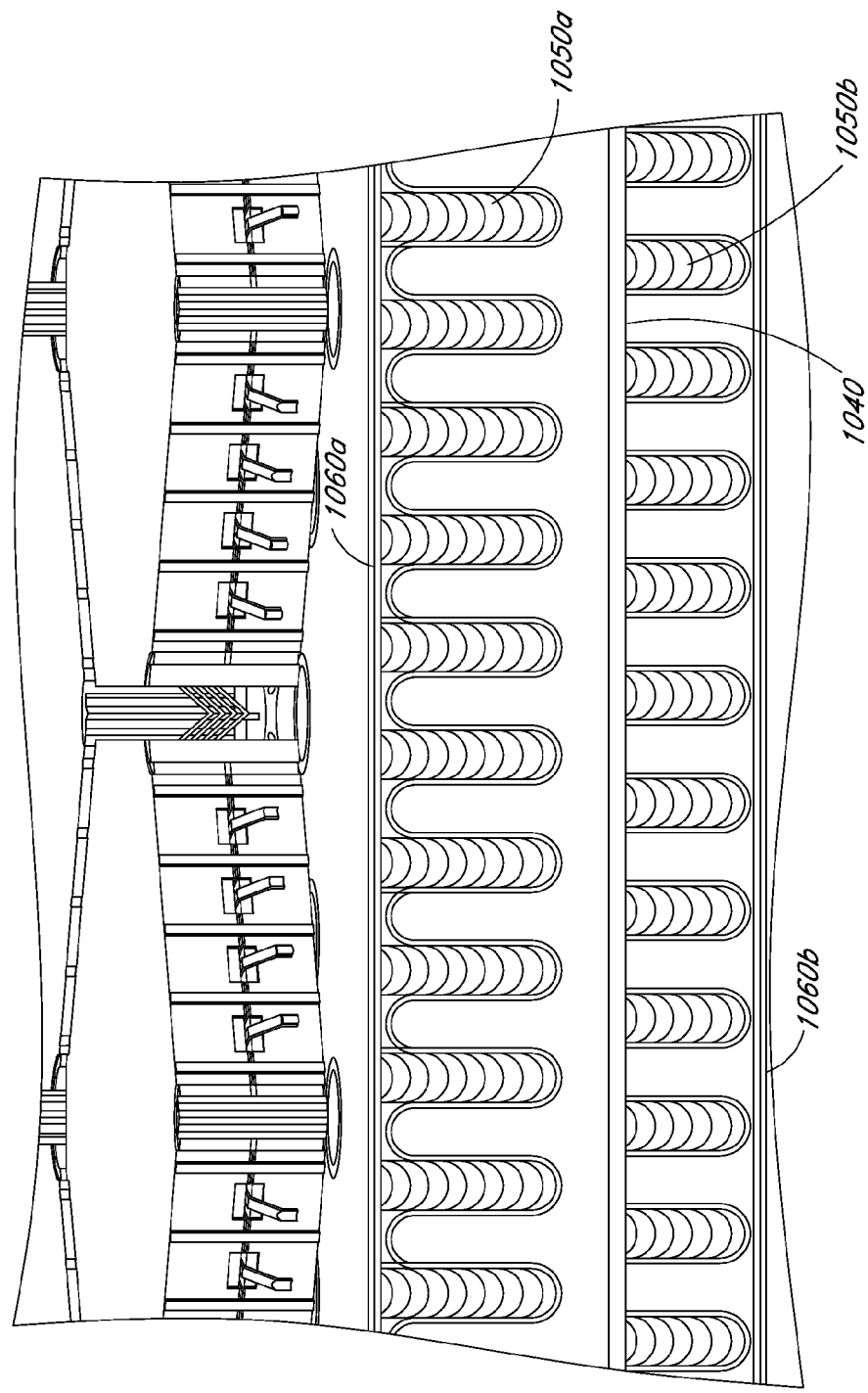
FIG. 10B is an expanded view of the heat sink of the PME illustrated in FIG. 10A.

FIG. 10B is an edge view of a PME showing a ribbon shaped heat sink 1050*a* and 1050*b* located on the opposite surface of the DDCC mounting surface substrates 1060*a* and 1060*b* (referred to collectively as 1060). The ribbon shaped heat sinks 1050*a* and 1050*b* extend across the surface of the substrates 1060*a* and 1060*b* and can include kerfs spaced periodically across the heat sinks 1050*a* and 1050*b* to compensate for TCE across the width of the substrate. The PME 1000 also includes a heat transfer and guide blade 1040 arranged between the heat sinks 1050*a* and 1050*b*.

In the embodiment illustrated in FIG. 10A, the connectors 1010 are approximately five inches high and approximately seven eighths of an inch wide. However, differently-sized connectors are possible. The connectors 1010 may also include a surround shroud shell including an interference fit socket on one half of the connector and a mating plug on the other half of the connector. The surround shroud shell can connect the power return to ground. In one embodiment, the surround shroud shell is longer than the power and signal connections, thus forming an initial electrical connection between two devices as they are mated. The ground pins may be shorter than the surround shroud shell, but longer than the power pins and can therefore form a ground connection before the power connection is established by the power pins, which may be shorter than the ground pins. As the power return ground is the first connection established and the power is subsequently connected, but prior to a signal connection, "hot swapping" of PME modules is made possible. In the illustrated embodiment, the connectors 1010 are hermaphrodite connectors. For example, a connector 1010 can be designed to mate face-to-face to another connector by rotating the other connector 180 degrees compared to the other connector, allowing the pins, sockets, and shroud of the connectors to match. It should be understood that in certain embodiments other connector designs are possible.

In one embodiment, the surrounding sidewalls provide a receiver for a number of input/output modules that contain signal drivers and receivers. The input/output insert modules of the hermaphrodite connectors 1010 can be one of a variety of insert modules, including a one meter drive fiber optic driver and receiver pair, a 30-meter drive fiber optic driver/receiver pair, a single-ended driver/receiver pair, or a double-ended driver/receiver pair. In one embodiment, the connector insert modules include the driver/receiver electronic circuitry as well as the connector pins and sockets.

The hermaphrodite connectors 1010 allows a PME 1000 to be tested by inserting the PME 1000 into an operating PME (separate from PME 1000) having testing functionality. This PME to be tested can be introduced to an operating PME on a "hot swap" basis as described above. In some embodiments, plugging one PME unit into another will not disrupt an ongoing process in either module. In other embodiments, plugging one PME unit into another may trigger one or more special functions, such as a test operation or a joining operation enabling processing of future commands to be distributed across DDCCs in both PMEs. While an operating PME can be structurally similar to a PME unit under test, the operating PME can also be a test module built to test PME devices. In a similar manner, a test PME can be inserted into an operational PME to be tested.

Once a DDCC, a node, a PME, or a combination thereof has been manufactured, a programmer can utilize an external host computer to initially load and control program code into the device, designated the client device. Various software modules and tools can reside in a host computer such as a laptop, desktop, or a previously configured DDCC-based computer running an operating system, such as Linux®. This software can be programmed to assist in the development of software modules, routines, nodal control, software tools, and operating systems that will load and control the program code residing in the client device. Such external software executes in the host computer and not in the client device. The host tools and software can include functionality to support the client device during manufacture, initial programming, testing, integration, application development, and debugging.

In one embodiment, the host provides software development tools for portions of a client device. For example, the client device can include a processor (and/or a memory, sensor, etc.) identified as the internal function F(X). External tools to support the internal function may include editors, compilers, linkers, and loaders that can produce code that can be executed on the client device. Other external tools can include communication and control tools, libraries, and Application Program Interfaces (APIs) stored on the host device to provide software mechanisms for communication with and control of the client device.

In one embodiment, the host operating system includes host driver software to initiate an interface connection between the host hardware and the client device hardware. These drivers can be low-level language routines called through software tools and the host operating system for communication with the client device.

Once the physical communications connections and the software mechanisms are in place, host software tools can use these communications mechanisms to setup and control the client device. These tools can be programmed to formulate message sequences and control bits to access the client device. These tools can include an initial bootstrapping sequence to load more advanced and complex loaders and routines into the client device that can provide functionality beyond the initially configured communication tools. The host can then issue command messages to the client device when the device has logic configured to execute on the device using high-level command messages. A client device with built-in logic for executing high-level command messages can be called a smart device. High-level command messages are configured to cause the execution of a routine resident on the device (e.g., without first transferring the routine to the device). High-level command messages can include messages for the client device to remotely perform setup and configuration processes at the direction of the host. In certain embodiments, high-level messages are messages that include a command that trigger the execution of a routine stored at the device that receives the high-level message. Thus, in some such embodiments, the routine does not need to be transferred to the device to cause its execution as the routine is already stored at the device.

The host and client device can operate in tandem. The host, for example, can execute a user application partially on the host and partially on the client. As described above, the client device can be configured as one or more processing nodes having multiple DDCC per processing node. In one embodiment, the host issues processing tasks, which may be portions of a larger task, to the client device and can receive one or more results corresponding to the processing tasks. In another embodiment, the host delegates the entire larger task to the client device and then retrieves the solution from the client device.

Various software and firmware modules can also be executed by the client device. The client device can, for example, execute software applications designed specifically for the one or more of the internal function processors that resides within the client device. As mentioned above, at least some portions of the client device are externally controllable from the host for initial communication and bootstrap loading. In another embodiment, other portions of the client device are controllable from within the client device itself. For example, portions of the setup, controls, and internal logic are accessible from a configuration control processor through the use of internal software routines and tools. In one embodiment, internal software performs the main setup and configuration of the client hardware to support a user application and to communicate with the host. The user application can, for example, dynamically change hardware settings from within the user application by making calls to library routines which reside in an operating system of the internal function processor.

In one embodiment, operating system library routines executed by one or more internal functions F(x) of the client device support the extensive capabilities of the client device. The routines can communicate to other portions of the hardware either through the CCP or directly. As previously described, each die in a DDCC may have its own CCP and its own internal function unit F(X). Thus, in some cases, some routines, commands, or instructions are specific to a particular die. In other cases, some routines, commands, or instructions may be executed that involve multiple die. In some such cases, the internal function unit F(X) of multiple DDCC die may operate together using multiple processors to perform operations on portions of a routine utilizing data passed to or between multiple DDCC die. In some implementations, the internal function unit F(x) in the lower die of each of the multiple DDCCs may function as a processor and the upper die of each of the multiple DDCCs may function as a memory. Each DDCC lower die processor may process on data supplied by the upper die of each DDCC.

The two die of the DDCC may use parallel connections between the lower and upper die internal function interfaces (IFI) to communicate. Additionally, data and processed results may be transferred from one DDCC to another DDCC, through a memory to memory transfer from the upper die of one DDCC upper die to another DDCC or through another suitable process. Internal software library routines can include routines for configuration and/or reconfiguration of one or more die within a DDCC and the sending and/or receiving of messages across the communications paths of the client device. In one embodiment, messages pass through the input/output portions of the client device without interfering with the operation of the internal function processing. In another embodiment, messages are received by the internal function unit F(x). In yet another embodiment, messages are sent from the internal function unit F(x) or memory of the client device.

In one embodiment, the internal software contains library routines available to a user application executed on a host device for performing control, setup, and data transfer. At the completion of data transfer, a signal can be returned through the library routine to the user application.

In one embodiment, the client device also contains a set of internal status and control routines that respond to queries from the host or other client devices. These queries can provide the hooks for debugging both the user application and client operating system. A programmer, developer, or application tester can use these status and control routines for software debugging. The routine can include routines for controlling the internal function F(X), interrogating specific hardware, and viewing and changing memory. In a similar fashion, the host can include corresponding commands in the host software to determine a status of the client device and to debug the client device through a data connection with the client device.

The internal software can be configured to support several DDCCs configured into a processing cluster or node with a group of local communications paths. When the processing cluster or node is operating, these communications paths, data transfers, and signaling routines facilitate user application coordination across the multiple DDCCs of the processing cluster or node.

As mentioned above with respect to the dynamic and static reconfigurability of the PMEs or client devices, at the completion of the processing of a user application, internal control software can switch to execution of another user application to be executed by the client device. In response to receiving a command to switch active user applications, the operating system can reconfigure the hardware and the communications paths to support execution of the new user application. In another embodiment, the operating system itself can be switched to another operating system, which may be of a different complexity, based on the specific user application to be executed and its processing requirements.

In one embodiment, a client device is configured by software executed on a host device to initially define the interconnections between client devices. After the interconnections are defined, the operating system and user application software of the client device may be loaded into the associated hardware by using software tools executed on a host computer.

Additional software executed on a host device can reconfigure the interconnections and communications paths within the client device while the current user application is executing on the client device. The reconfiguration can also allow the change of the user application and an operating system defined to support the application requirements. In one embodiment, when the first user application completes, the second user application is ready to reconfigure the hardware architecture and communications paths.

Dynamic configuration can be directed from a host computer or it can be directed from within the client device itself through, e.g., library routine calls. These calls can be from the currently configured client devices or it can be from an additional device directing the reconfiguration, such as with the PME Module Control Processor.

Dynamic configuration can, in one embodiment, support a 'failed component' workaround. For example, if the failed component is an input/output, a different input/output path can be selected. If the failed component is the internal function processor of a first DDCC, a second DDCC can be used. In some such cases, the input/output connections may be reassigned and the program and data in the memory of the first DDCC may be reassigned to the second DDCC.

In one embodiment, DDCCs embodied in a client device are determined or identified by one or more of a physical location within the client device, an internal identifier, and/or by software which executes within each DDCC. In one embodiment, the client device itself has similar identification information stored within it. The DDCC software is not limited in type and can include applications for performing 'stand-alone' mathematical routines, gaming applications, office productivity software, operating systems, and the like. The desired configuration of the client device can be changed to support a range of processing capabilities. For example, at one period of time, the DDCC of the PME 1000 may be configured to process a mathematical routine. During another period of time the DDCC of the PME 1000 may be reconfigured to process a different mathematical routine, a physics simulation, or an operating system.

In one embodiment, a user can determine the complexity of support required for the particular application and select the appropriate operating system. In another embodiment, the appropriate operating system is automatically selected based on the support required. A number of operating systems of varying complexity are available for selection. The complexity can, for example, be based on the range of operating system calls that the user software uses. For example, a first operating system can support a few tasks which communicate with near neighbor DDCC (e.g., direct neighbors or neighbors within two DDCC distance) of a processing node and does not support dynamic reconfiguration. A second operating system can support communication between more distant DDCC (e.g., within three or four DDCC distance) or between processing nodes either on the same PME or another PME in communication with the nodes of the PME and also support dynamic reconfiguration of subordinate processing nodes to add or subtract processing power of the user application software.

During the development of the particular application, software tools executed on a host computer can configure the particular client device operating systems and libraries to form the executable code which can execute in the client device or the DDCCs thereof. This executable code, including operating systems and user applications, can be transferred to the client device hardware to form a configured system. After this configuration is set, the software tools executed on the host computer can download changes, as part of a background process, to the initial configuration concurrently while the client device is executing other software. In one embodiment, these changes are coordinated with the client device hardware and software so as to not interfere with the current client device processing.

FIG. 10A above illustrates one embodiment of a PME which can be used as a client device. From the figure, it is evident that certain of the DDCC (e.g., DDCC 800*d*, 800*g*, and 800*k*) are proximal to the input/output interfaces, which may be adjacent to one or both of the sidewalls 1020*a* and 1020*c* and can include the connectors 1010. These DDCC, or others, can be designated Module Control Processors (MCPs) and loaded with MCP Software to control the interaction of the PME 1000 with other devices. The MCP can also be configured to handle the configuration/reconfiguration of the other DDCCs on the PME. The MCP can also be configured to set up the communications paths between DDCCs and to initialize the user application software in the DDCC. While, in one embodiment described above, the DDCC configuration/reconfiguration tasks and communication path configuration tasks are handled by a host computer, in another embodiment, they are instead 'off-loaded' to the MCP for additional flexibility. With this flexibility, the MCP(s) of the client device can direct their own reconfiguration by calling appropriate software reconfiguration routines enabling self-reconfiguration.

Data passed to/from the PME communications paths may be routed through the input/output portion of the MCPs. In one embodiment, the data is passed directly to other DDCC on the PME bypassing the internal function and memory of the MCP. In another embodiment, the MCP captures the data, interprets the data, and then directs the data to the appropriate processing node or DDCC. These capture, interpretation, and direction tasks form an intermediate level of task control within the client device. In some embodiments, multiple PMEs operate together as a processing node. The Module Control Processors within the multi-PME node can be configured to handle intermediate data transfer and reconfiguration control for the processing node.

As mentioned above, the messages can be transmitted in a broadcasting fashion. Broadcasting can be used, for example, to distribute software code and/or data to many DDCCs in a spider-type fashion to load software onto groups of DDCCs in parallel or substantially in parallel, which can be faster than individually, serially loading the software. Broadcasting, as described above, can be used to load software into many client devices without the need for the host to individually load the software onto each client device. Thus, in certain implementations, code and/or data that is common to multiple DDCCs may be broadcast from DDCC to DDCC instead of specifically being transmitted to each particular DDCC individually. Using the broadcast communication method can enable a reduction in communication time and resources.

In one embodiment, software for individual client devices is broadcast to all devices and each individual client device may discard information not intended for the device. The broadcast software can address individual client devices using a unique identification number stored within each client device (or DDCC thereof) during manufacture or testing.

In one embodiment, bootstrapping is used to set up the communications paths to and through multiple client devices. After the communication pathways are created or setup, data and commands may be broadcast to a number of devices and the client devices can begin processing. Broadcasting can be used in the initial setup of devices or for upgrading portions of the devices. These broadcast techniques allow the host to transmit information or data to specifically identified client devices.

As described above, processor nodes may support distributed processing with additional features such as pre-processing, instruction processing, and post-processing. In one embodiment, a processor node is dynamically configurable to operate as a distributed processing system. In another embodiment, a processor node is dynamically configured to operate in a traditional processing method as utilized by contemporary systems.

Distributed processing can be used to provide greater process transaction throughput by using more than one DDCC of a processor node (or more than one processor node) to operate on data in a pipeline fashion. For example, by using five DDCCs to form a node, the node can operate on five or more different instructions simultaneously. In one embodiment, during a first time period, an instruction is fetched by one DDCC operating as an Instruction Fetch Processor (IFP); during a second time period, the instruction is interpreted by the IFP and other DDCCs operating as Operand Fetch Processors (OFPs) are directed where to fetch operands; during a third time period, the OFPs fetch various operands; during a fourth time period, a DDCC acting as an Instruction Processor (IP) performs the instruction directed by the IFP; and during a fifth time period, a chip carrier acting as an Instruction Result Processor (IRP) stores the data, from the IP, in the location directed by the IFP. In some embodiments, the DDCC of the PME 1000 of FIG. 10A may be configured to operate as in the above example. The Instruction Fetch Processor (IFP), in one embodiment, works in a look-ahead program timing mode and thus, out of sequence jumps (branch) to other locations can be anticipated in many cases, and therefore processing time can be reduced.

Figure 11A:
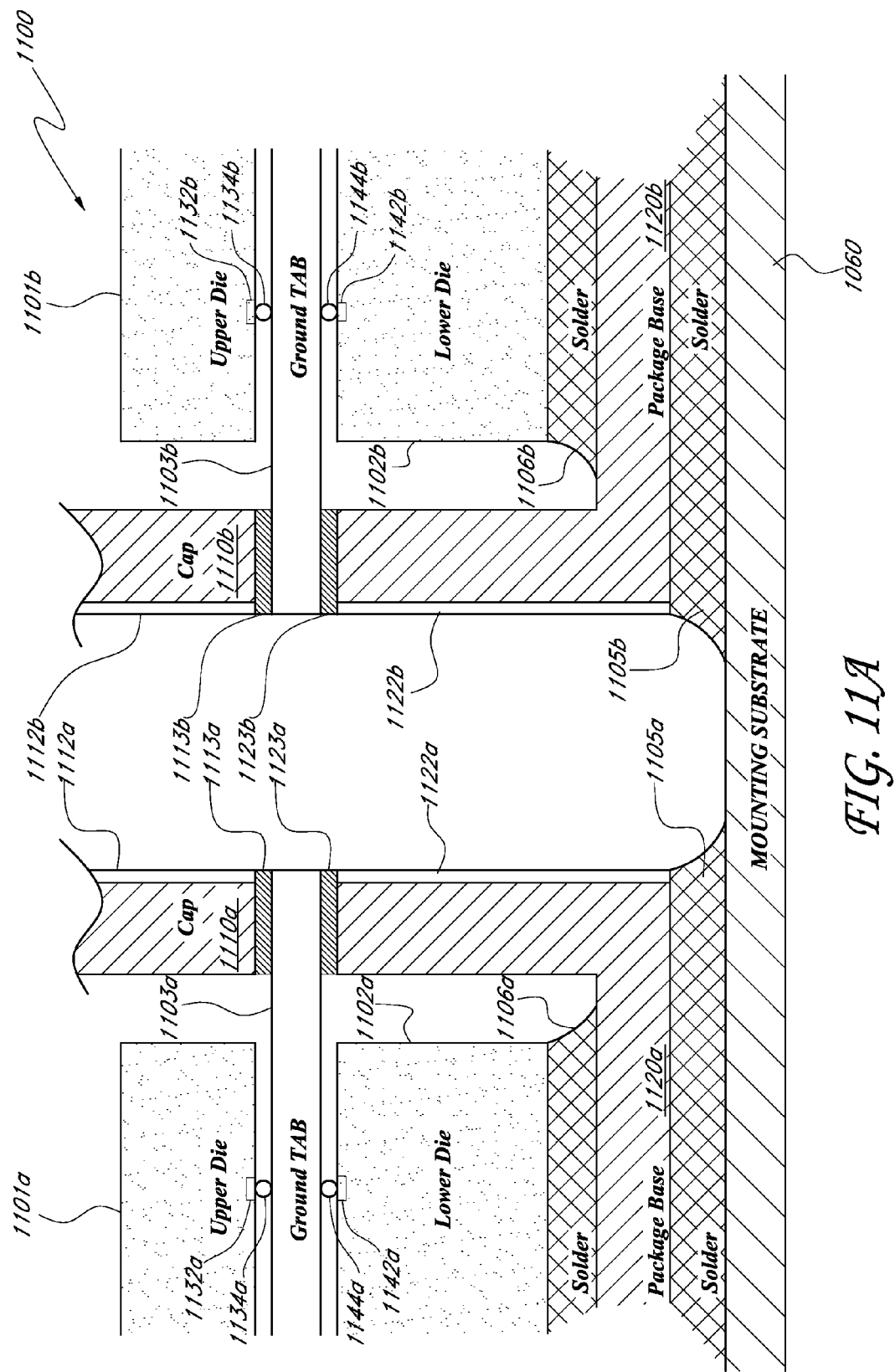
FIG. 11A is a cross sectional view of one embodiment of two DDCCs illustrating ground castellations and ground connections to the upper and lower die via the TAB conductive tray.

FIG. 11A is a cross sectional view of one embodiment of two DDCCs 1100 mounted on a substrate 1060 to distribute power return ground potential to the DDCCs via the substrate and castellations of the DDCCs. The first of the two DDCCs 1100 (the one illustrated on the left) includes a package base 1120a, a lower die 1102a, a ground tab 1103a, an upper die 1101a, and a package cap 1110a. The package base 1120a may be fused to the substrate 1060 with solder 1105a. The lower die 1102a may be fused to the package base 1120a with solder 1106a. The ground tab 1103a may be electrically coupled to both the package base 1120a via solder 1123a and the package cap 1110a via solder 1113a to receive ground potential supplied by the castellation 1122a of the base and the castellation 1112a of the cap, respectively. The ground tab 1103a may also be electrically coupled to both the upper die 1101a via solder pad 1132a using solder ball 1134a and the lower die 1102a via solder pad 1142a using solder ball 1144a, or the like.

Similarly, the second of the two DDCCs 1100 (the one illustrated on the right) includes a package base 1120b, a lower die 1102b, a ground tab 1103b, an upper die 1101b, and a package cap 1110b. The package base 1120b may be fused to the substrate 1060 with solder 1105b. The lower die 1102b may be fused to the package base 1120b with solder 1106b. The ground tab 1103b may be electrically coupled to both the package base 1120b via solder 1123b and the package cap 1110b via solder 1113b to receive ground potential supplied by the castellation 1122b of the base and the castellation 1112b of the cap, respectively. The ground tab 1103b may also be electrically coupled to both the upper die 1101b via solder pad 1132b using solder ball 1134b and the lower die 1102b via solder pad 1142b using solder ball 1144b, or the like. It should be understood that although the upper die 1101a, 1101b and the lower die 1102a, 1102b are illustrated as different sizes, in some embodiments, the upper die 1101a, 1101b and the lower die 1102a, 1102b may be the same size.

Figure 11B:
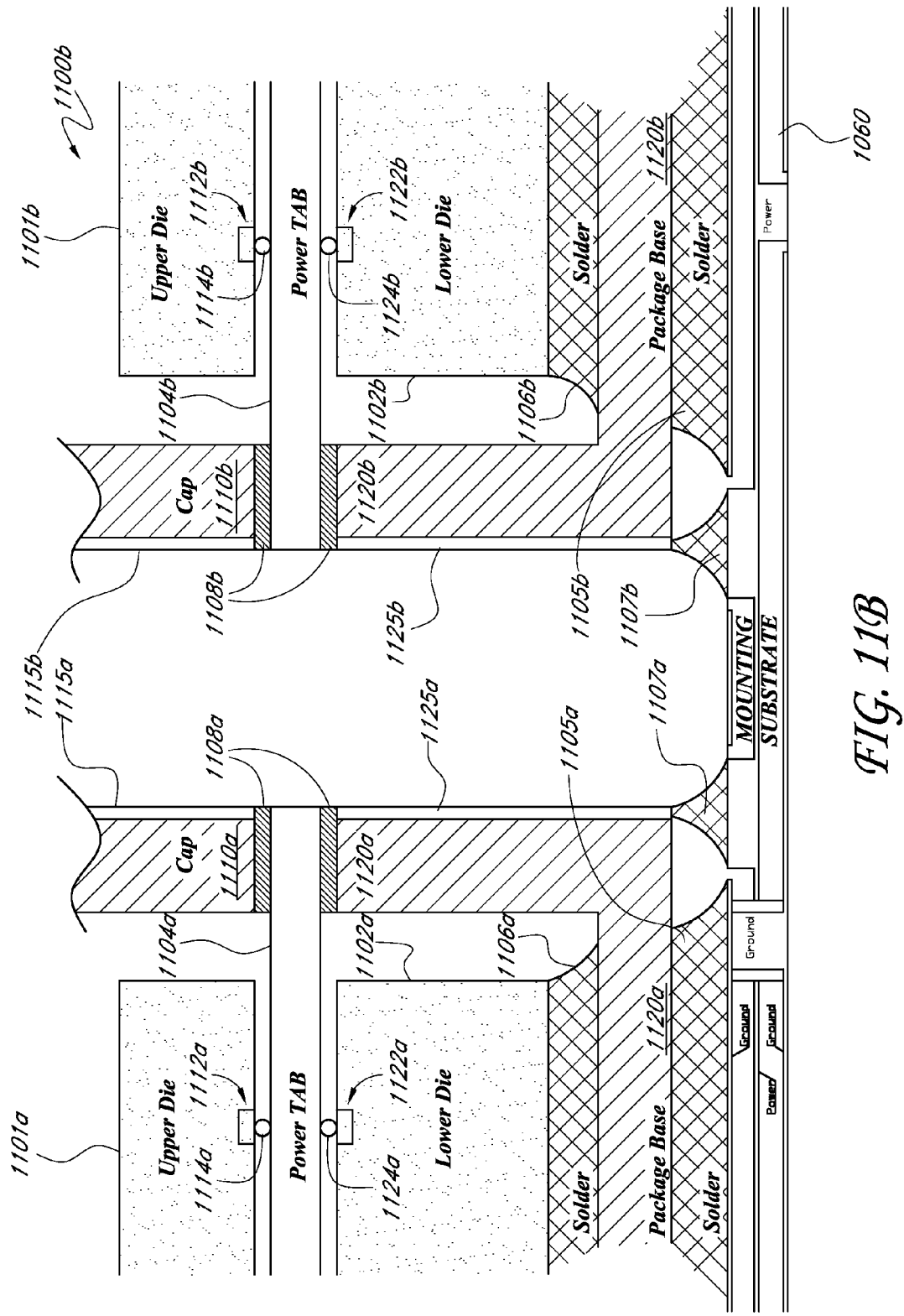
FIG. 11B is a cross sectional view of one embodiment of two DDCCs illustrating power castellations and power connections to the upper and lower die via the TAB conductive tray.

FIG. 11B is a cross sectional view of one embodiment of two DDCCs 1100 mounted on a substrate 1060 to distribute power potential to the DDCC via plated through holes isolated from the ground of the substrate and the ground castellations of the DDCCs. The first of the two DDCC 1100 (the one illustrated on the left) includes a package base 1120a, a lower die 1102a, a power tab 1104a, an upper die 1101a, and a package cap 1110a. The package base 1120a may be fused to the substrate 1060 with solder 1105a. The lower die 1102a may be fused to the package base 1120a with solder 1106a. The power tab 1104a may be electrically coupled to both the package base 1120a with solder 1108a and the package cap 1110a with solder 1108a to receive power potential supplied by the castellation 1125a of the base and to the cap by castellation 1115a. It should be understood that the cross section illustrated in FIG. 11B may be a different cross-section than is illustrated in FIG. 11A. Thus, the electrical connection of the power tab 1104a to the base 1120a and cap 1110a via the solder 1108a may be separate and isolated from the connection to the ground tab 1103a illustrated in FIG. 11A. The power tab 1104a may also be coupled to both the upper die 1101a and the lower die 1102a using solder balls, 1114a and 1124a, respectively, or the like. For example, the power tab 1104a may be coupled to the solder pad 1122a of the lower die 1102a via the solder ball 1124a and coupled to the solder pad 1112a of the upper die 1101a via the solder ball 1114a.

Similarly, the second of the two DDCC 1100 (the one illustrated on the right) includes a package base 1120b, a lower die 1102b, a power tab 1103b, an upper die 1101b, and a package cap 1110b. The package base 1120b may be fused to the substrate 1060 with solder 1105b. The lower die 1102b may be fused to the package base 1120b with solder 1106b. The power tab 1104b may be electrically coupled to both the package base 1120b and the package cap 1110b with solder 1108b to receive power potential supplied by the castellation 1125b of the base and to the cap by castellation 1115b. It should be understood that the cross section illustrated in FIG. 11B may be a different cross-section than is illustrated in FIG. 11A. Thus, the electrical connection of the power tab 1104b to both the package base 1120b and the package cap 1110b via the solder 1108b may be separate and isolated from the connection to the ground tab 1103b illustrated in FIG. 11A. The power tab 1104b may be coupled to the solder pad 1122b of the lower die 1102b via the solder ball 1124b and coupled to the solder pad 1112b of the upper die 1101b via the solder ball 1114b.

With further reference to FIGS. 11A and 11B, one non-limiting method of manufacturing a DDCC 1100 may be as follows. Using the left DDCC 1100 as an example, the method may include first aligning and reflowing the solder 1106a of the lower die 1102a to the cavity formed by the DDCC base 1120a. Second, a TAB sheet (such as the TAB sheet 900) may be positioned over the package base 1120a housing the lower die 1102a. Third, the upper die 1101a may be positioned over the TAB sheet and lower die assembly. Fourth, the method may include applying reflow solder to connect or bind the upper die 1101a to the TAB sheet. Reflow solder may also be used to bind the lower die 1102a and the package base 1120a to the TAB sheet. Fifth, the signal, ground, and power leads or pins of the TAB sheet may be trimmed to adjust the length of the different leads. Further, the signal leads of the TAB conductive tray may be pre-formed for connection to neighboring devices to compensate for thermal expansion and contraction (TCE) due, for example, to temperature variations. The receive signal flying leads ends may be formed to be concave and the send signal flying leads ends may be formed to be convex. Alternatively, the ends of the receive signal flying leads may be convex and the ends of the send signal flying leads may be concave. Sixth, the method may include placing and cementing the package cap 1110a to the assembly, thereby providing a micro strip coaxial transmission path embedded in a dielectric insulator for each signal line. Finally, the method may include soldering the power and ground to the package cap 1110a, package base 1120a and TAB conductive tray.

In one embodiment, the upper die 1101a is not soldered to the DDCC cap 1110a. Those skilled in the art will appreciate that the above describes but one embodiment of manufacturing a stack and that other methods formed by removing, adding, or altering the above steps can be used. Moreover, those skilled in the art will appreciate that specific connections to particular signal pins and connection pads have not been exhaustively described for the sake of brevity.

Figure 12A:
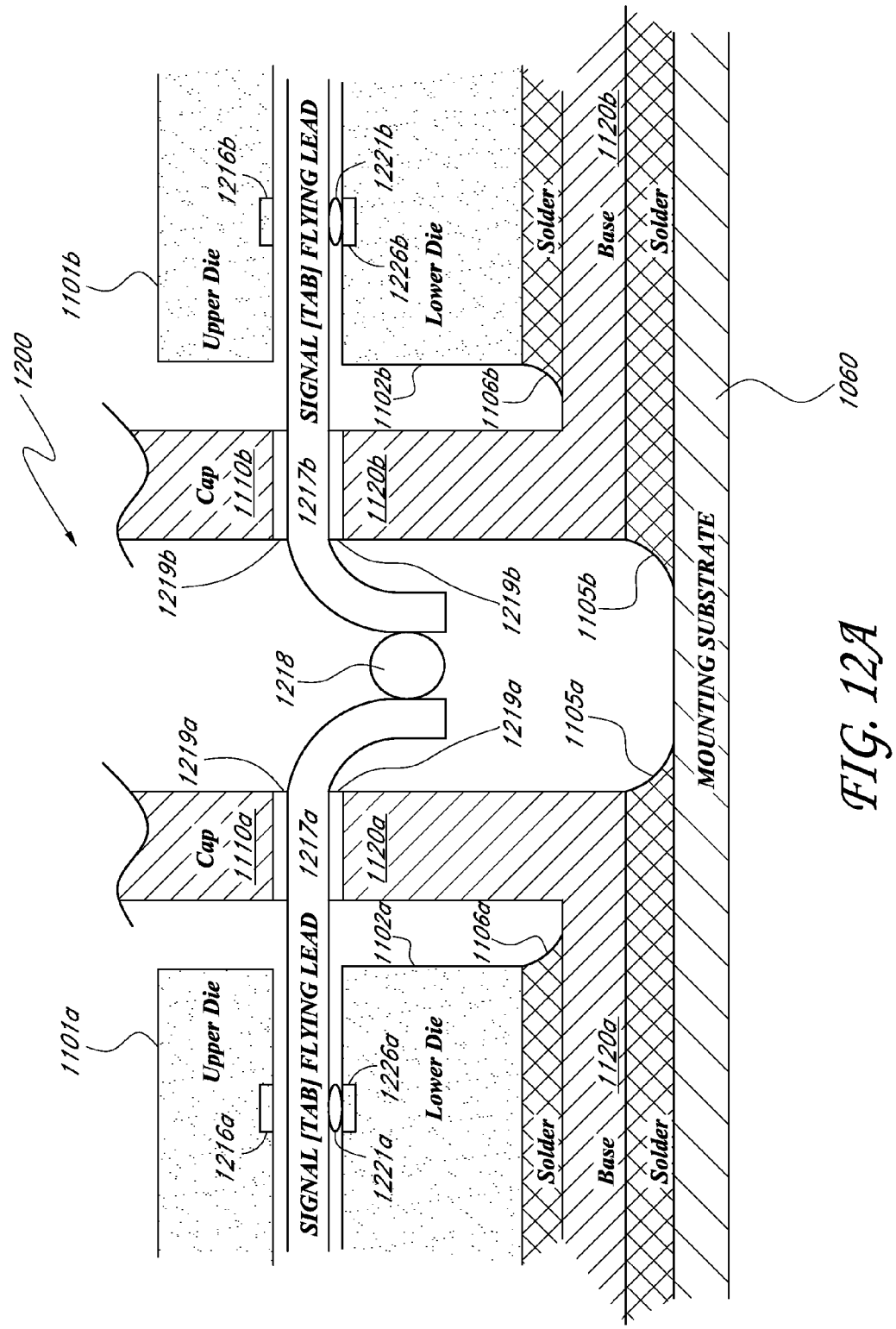
FIG. 12A is another cross sectional view of one embodiment of two DDCCs with a flying lead connection for a signal path between each of the lower dies.

FIG. 12A is another cross sectional view of one embodiment of two DDCCs 1200 with a flying lead connection for a signal path between each of the lower dies 1102a, 1102b. Although not illustrated, flying leads may be used to connect a signal path between each of the upper dies 1101a, 1101b. The two DDCC 1200 are similar to and adapted from the two DDCC 1100 illustrated in FIGS. 11A and 11B. Accordingly, elements common to both DDCC 1100 and 1200 share common reference indicia, and only differences between the two are described herein for the sake of brevity. Specifically, the two DDCCs 1200 include first and second signal tabs 1217a and 1217b in place of the first and second ground tabs 1103a and 1103b illustrated in FIG. 11A and the first and second power tabs 1104a and 1104b illustrated in FIG. 11B. The first signal tab 1217a may be coupled to a connection pad 1226a of the lower die 1102a with a solder ball 1221a and may be electrically shielded from the package base 1120a and package cap 1110a via insulators 1219a. Similarly, the second signal tab 1217b may be coupled to a connection pad 1226b of the lower die 1102b and may be electrically shielded from the package base 1120b and package cap 1110b via insulators 1219b. The first and second signal tabs 1217a and 1217b may be electrically connected via a solder ball 1218, which thereby creates a data path from the lower die 1102a to the lower die 1102b. Moreover, those skilled in the art will appreciate from the present disclosure that any combination of connections can be made between the dies 1101a, 1102a, 1101b, 1102b using signal tabs, and the scope of the claims is in no way limited by the example illustrated in FIG. 12A. The signal tabs 1217a and 1217b may be referred to as "flying leads."

Figure 12B:
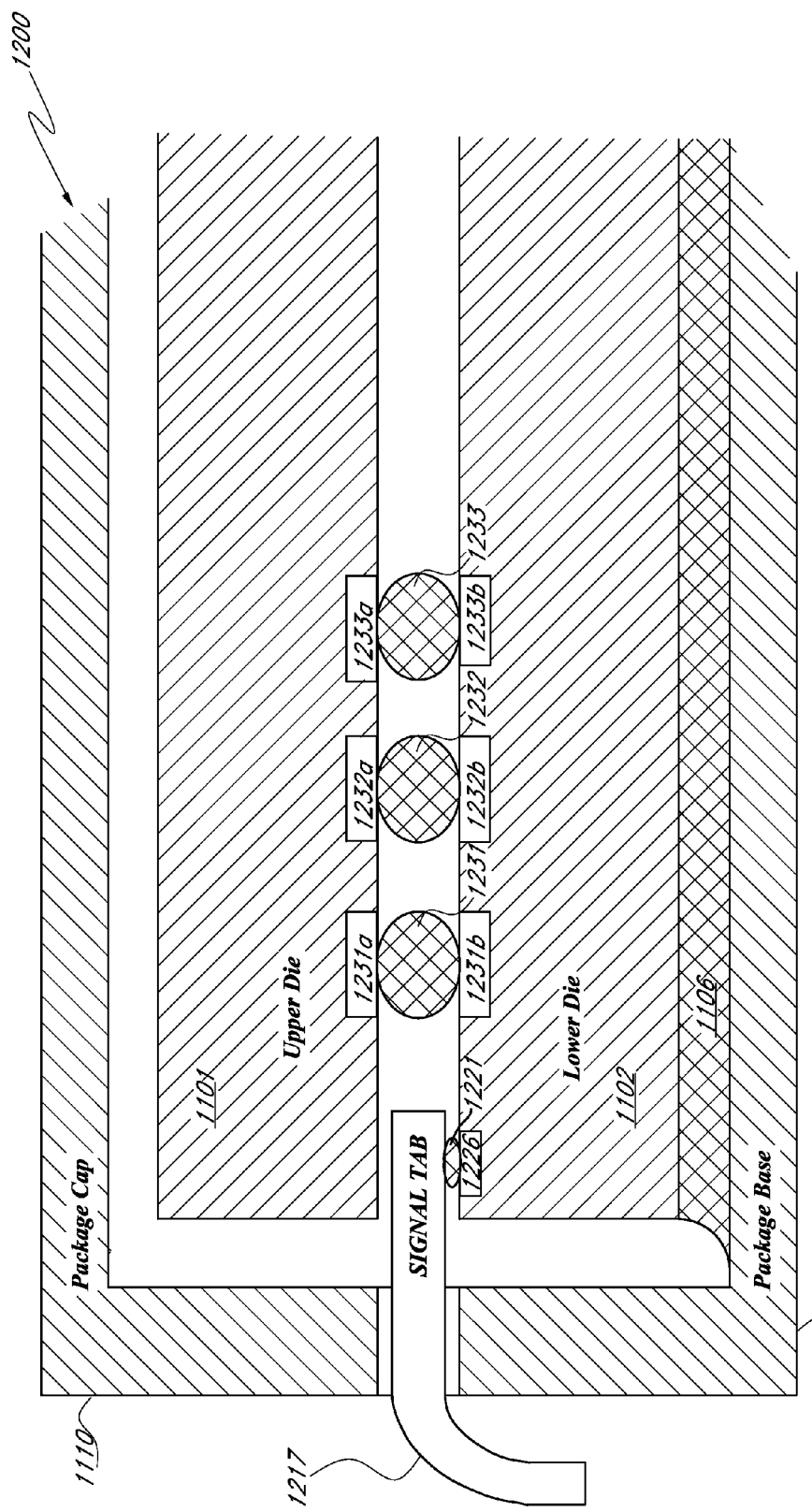
FIG. 12B is another cross sectional view of one embodiment of a DDCC illustrating a parallel bus connection between an upper die and a lower die of the DDCC.

FIG. 12B is another cross sectional view of one embodiment of a single DDCC 1200 showing the parallel bus between the upper die 1101 and the lower die 1102. The DDCC 1200 is similar to and adapted from the two DDCC 1100 illustrated in FIGS. 11A and 11B. Accordingly, elements common to both DDCC 1100 and 1200 share common reference indicia, and only differences between the two are described herein for the sake of brevity. Specifically, the DDCC 1200 includes the signal tab 1217 in place of the first and second signal tabs 1217a and 1217b, signal pad 1226 in place of signal pads 1226a and 1226b and solder ball 1221 in place of solder balls 1221a and 1221b as illustrated in FIG. 12A. As illustrated in FIG. 12B, the upper die 1101 may include three signal pads 1231a, 1232a and 1233a for establishing a parallel signal connection with three signals pads 1231b, 1232b and 1233b of the lower die 1102. The signal pads may be electrically connected via three corresponding solder balls 1231, 1232 and 1233. Moreover, those skilled in the art will appreciate that from the present disclosure that any number and/or combination of connections can be made between the dies 1101 and 1102. The scope of the claims is in no way limited by the example illustrated in FIG. 12B. For example, in some cases, greater or fewer parallel signal connections may be formed between the upper die 1101 and the lower die 1102. For instance, in some cases, there are hundreds or thousands, if not more, of connections between the upper die 1101 and the lower die 1102 and thus, there may be hundreds or thousands of signal pads and solder balls between signal pads of the upper die 1101 and the lower die 1102. In some cases, the signal tab 1217 may be referred to as a "flying lead."

Figure 12C:
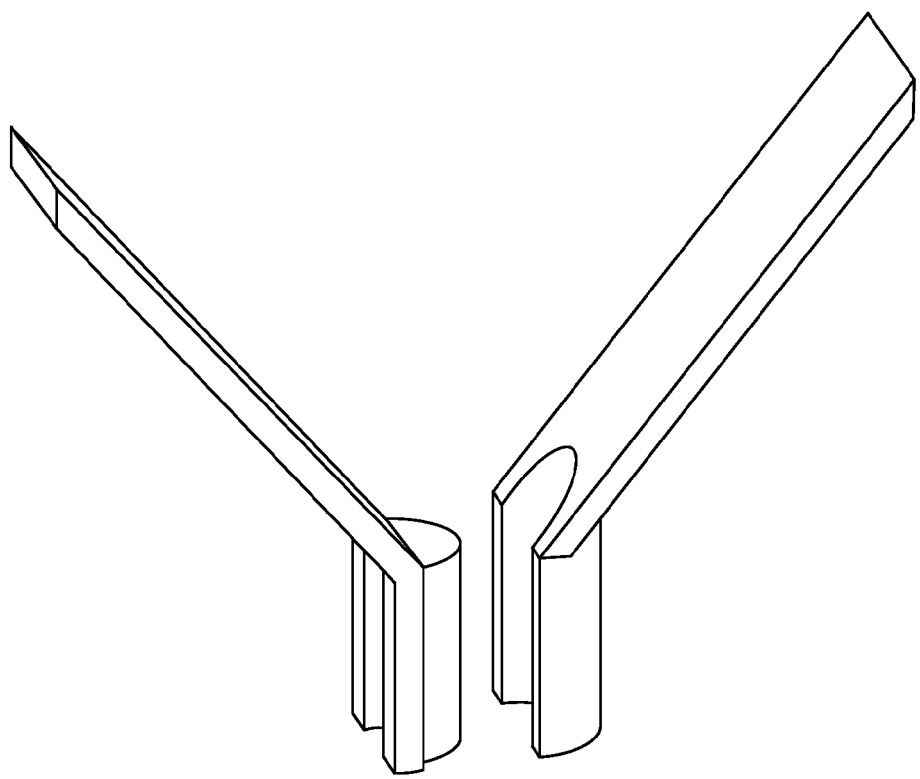
FIG. 12C illustrates an embodiment of a flying lead connection between a concave (receive) lead and a convex (send) lead that provides signal connections between adjacent DDCCs.

FIG. 12C is a perspective view of one embodiment of a pair of flying leads 1217a, 1217b. In some embodiments, the flying lead 1217a may be designated to send signals and the flying leads 1217b may be designated to receive signals. Alternatively, the send and receive designations of the flying leads 1217a, 1217b may be reversed. In yet other embodiments, the flying leads 1217a, 1217b may be configured to both send and receive signals. As illustrated in FIG. 12C, the flying lead 1217a may be configured with a convex end that can be configured to fit with or slot into a concave end of the flying lead 1217b. In some embodiments, each send flying lead is configured with a convex end and each receive flying lead is configured with a concave end. However, in other embodiments, the designation may be reversed. In yet other embodiments, whether the flying lead includes a convex end or a concave end is independent of whether the flying lead can send, receive, or send and receive signals.

Figure 13:
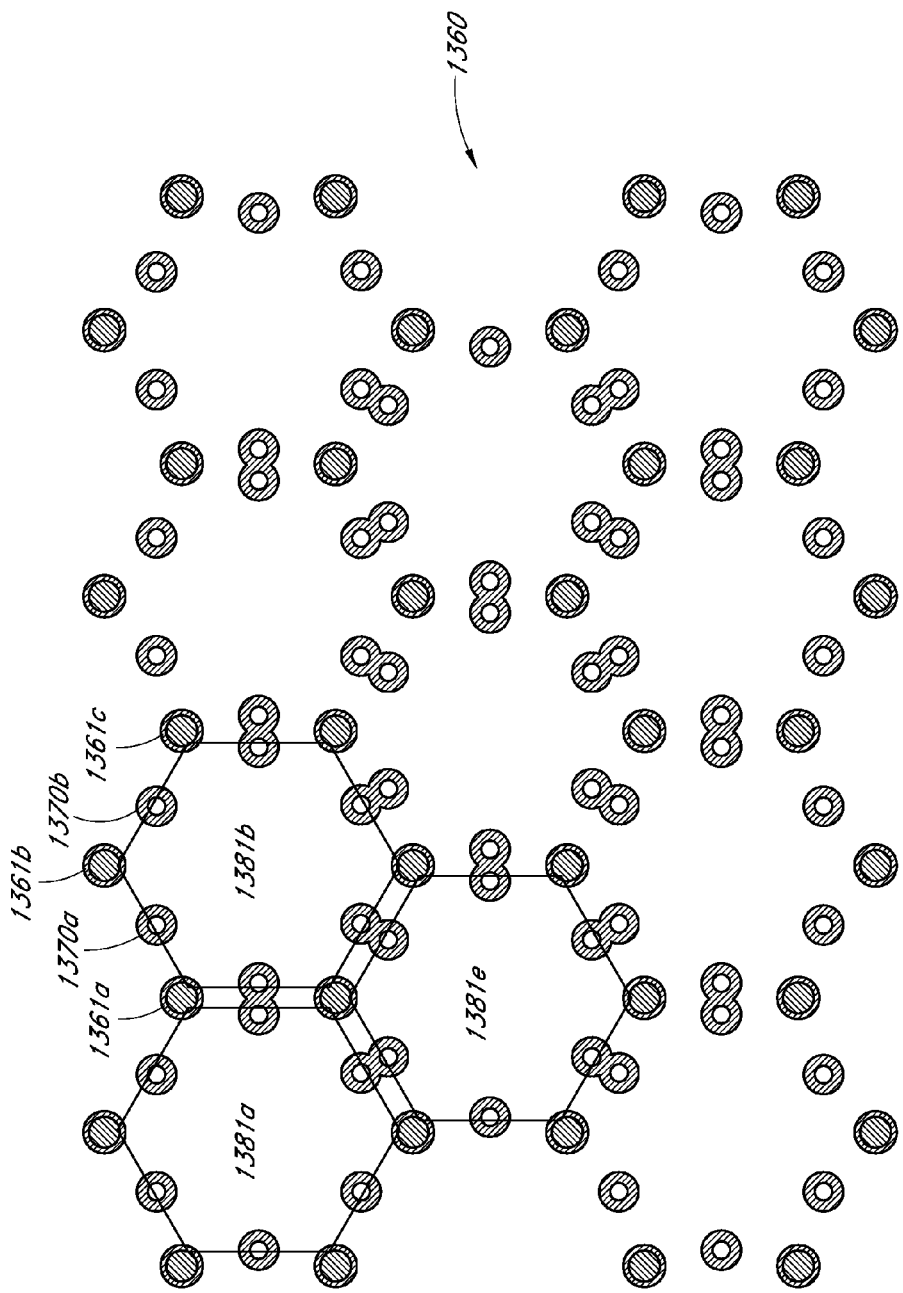
FIG. 13 is a plan view of one embodiment of a substrate including ground and power connections and includes three hexagonal outlines superimposed on the substrate to illustrate how the DDCC may be mounted to the substrate.

FIG. 13 is a plan view of one embodiment of a substrate 1360, which may be used as or may include one or more of the embodiments of the substrate 1060 included in the PME illustrated in FIG. 10A, with three hexagonal outlines 1381a. 138 lb. and 1381e superimposed on the substrate to illustrate how the DDCC may be mounted to the substrate. In one embodiment, the substrate 1360 is conductive and includes a number of voltage connections arranged to provide at least one of power and ground connections to one or more DDCC. For example, in one embodiment, during operation of the PME 1000, the substrate 1360 is at the same potential as electrical ground. The ground potential may be established and maintained by ground vias, such as the ground vias 1370a and 1370b. The ground vias 1370a and 1370*b*, for example, may be electrically coupled to the substrate 1360. In the example illustrated in FIG. 13, the ground vias 1370*a* and 1370*b* are interspersed between the power supply vias, such as the power supply vias 1361*a*, 1361*b*, 1361*c*. The power supply vias may be electrically insulated from the substrate and can be arranged so as to connect to insulated power lines located at the corners of the hexagonal DDCC. Moreover, while the substrate 1360 may be specifically arranged for receiving and supporting hexagonally-shaped DDCC, those skilled in the art will appreciate that in other embodiments, the ground and power vias can be arranged to accommodate other shapes of DDCC, such as rectangular and square chip carriers.

In one embodiment, the substrate is made of three conductive layers. The two outer layers may be at power return ground potential and the center layer may be at the power potential. An insulator material may be used to separate the ground and power layers. The two outer ground layers may be connected using vias, such as the ground vias 1370*a* and 1370*b*. The center power layer may be insulated from the via connecting the power layer to the top layer of 1360, and the power vias 1361*a*, 1361*b* and 1361*c* may be insulated from the top ground layer.

Figures 14A, 14B:
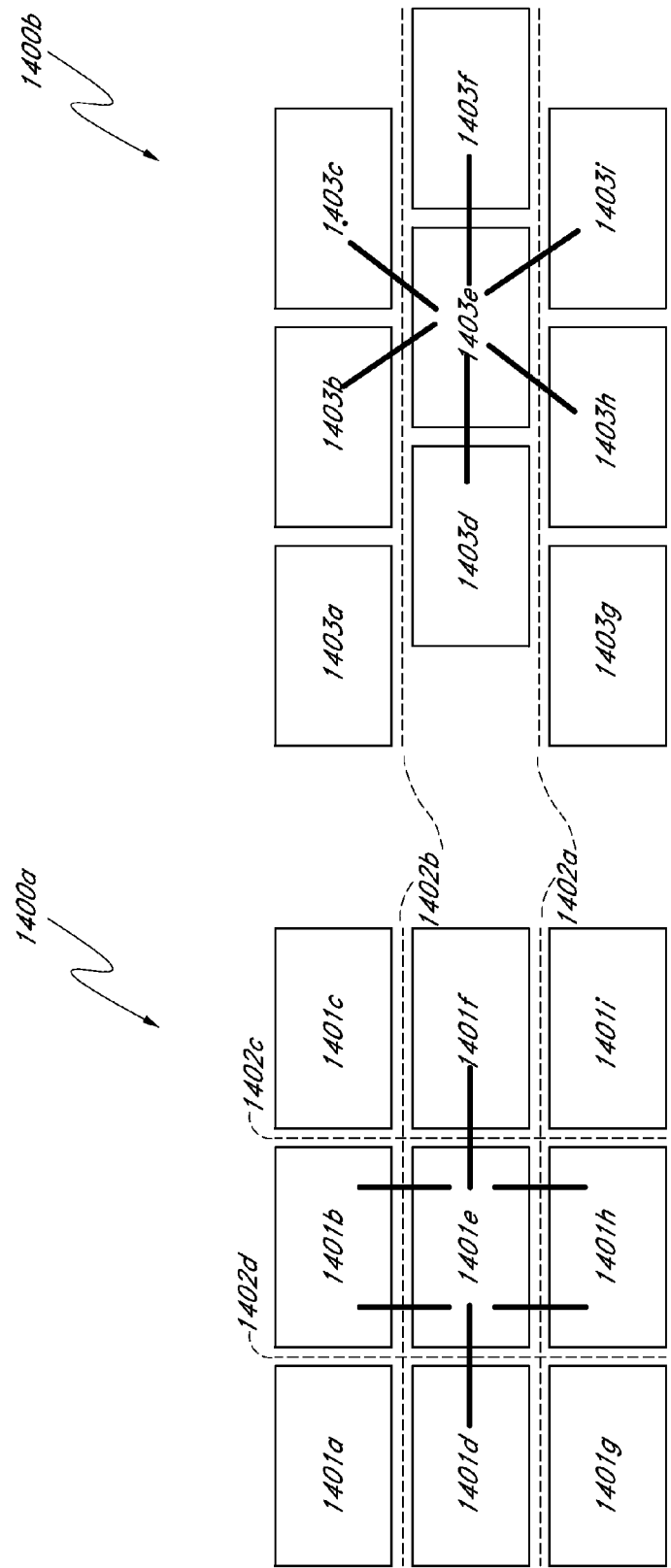
FIG. 14A is a plan view of one embodiment of an arrangement of rectangular DDCCs in a stacked layout and illustrating four stress lines caused by the stacked layout arrangement (dashed lines) as well as the communication signal connections (solid lines) between the DDCCs.
FIG. 14B is another plan view of one embodiment of an arrangement of rectangular DDCCs in a brick layout and illustrating two stress lines caused by the brick layout arrangement (dashed lines) as well as the communication signal connections (solid lines) between the DDCCs.

FIG. 14A is a plan view of one embodiment of an arrangement 1400*a* of rectangular DDCCs 1401*a*-1401*i* arranged in a stacked layout and illustrating four stress lines 1402*a*-1402*d* caused by the stacked layout arrangement (dashed lines) as well as the communication signal connections (solid lines) between the DDCCs 1401*a*-1401*i*. Each DDCC 1401*a*-1401*i* may have up to four neighboring DDCCs with which communication is potentially available shown by the heavy lines from DDCC to neighboring DDCC. Specifically, the arrangement 1400*a* includes nine chip carriers 1401*a*, 1401*b*, 1401*c*, 1401*d*, 1401*e*, 1401*f*, 1401*g*, 1401*h*, 1401*i*. Thus, the DDCC 1401*e* may have four communication connections to neighboring DDCC, while other DDCC may have less. In some embodiments, DDCC on the edges may have communication connections to DDCC in other PMEs. Thus, although not illustrated, the DDCC 1401*c*, for example, may have a communication connection to four DDCC, two within the arrangement 1400*a*, which may be a PME, and two from DDCCs of one or more other PMEs. As illustrated by the dashed lines 1402*a*-1402*d*, the particular arrangement 1400*a* of DDCCs may create four stress lines on the mounting substrate. This stress may cause printed circuit board traces to fail or if the substrate is ceramic may cause the substrate to fail by cracking along the stress line 1402A, 1402*b*, 1402*c* and 1402*d*.

FIG. 14B is a plan view of one embodiment of another arrangement 1400*b* of rectangular DDCCs 1403*a*-1403*i* arranged in a brick layout and illustrating two stress lines 1402*a*, 1402*b* caused by the brick layout arrangement (dashed lines) as well as the communication signal connections (solid lines) between the DDCCs. Specifically, the arrangement 1400*b* includes nine chip carriers 1403*a*, 1403*b*, 1403*c*, 1403*d*, 1403*e*, 1403*f*, 1403*g*, 1403*h*, 1403*i*. The chip carrier 1403*e* is in the center of a ring formed by the chip carriers 1401*b*, 1401*c*, 1401*d*, 1401*f*, 1401*h*, 1401*i* providing six communication connections to six neighboring DDCCs. Moreover, as result of the brick pattern arrangement, each of the chip carriers 1403*b*, 1403*c*, 1403*d*, 1403*f*, 1403*h*, 1403*i* is considered a neighbor to the chip carrier 1403*e*. Accordingly, in one embodiment the chip carrier 1403*e* is able to establish direct communication with each of the chip carriers 1403*b*, 1403*c*, 1403*d*, 1403*f*, 1403*h*, 1403*i* without sending signals through other chip carriers or over a printed circuit board. Further, in some embodiments, at least some of the DDCCs of the arrangement 1400*b* may be in electrical communication with DDCCs of neighboring PMEs. Moreover, the DDCCs of the arrangement 1400*b* may form a PME. As illustrated by the dashed lines 1402*a*, 1402*b*, the particular arrangement 1400*b* of DDCCs may include only two stress lines or points on the mounting substrate thereby reducing the chance of stress failures compared to the arrangement 1400*a*.

Inter-Device Communication Methods

The transfer of data between distributed devices may be achieved by superimposing data on clock signal lines between the devices. In addition to primary and/or secondary clock signal paths between the devices (discussed in greater detail below), the remaining device connections may also be used for communication. These connections may use internal clock signals assigned from the master primary or master secondary input clock signal to pass data between devices and may serve as a output master clock. Two types of communication that may be used in distributed computing systems include (1) communication between two directly connected devices; and (2) communication between remotely, or indirectly, connected devices, which may require communication via intervening devices. Each distributed computing device may have multiple output and input ports. In certain embodiments, each output and input port is configured independently. This may allow device signals to operate in an "open loop" or "closed loop" communication manner. Open loop and closed loop communication are described in detail below.

Closed loop communication may refer to communications in which a message is sent over a transmit connection from an originating device to a physically connected receiving device. The receiving device may then determine the validity of the message and respond by sending an acknowledgement message back to the originating device, thereby closing the communication loop. In closed loop communication, the input and output signals may operate together as a dependent pair. Furthermore, the receiving device's CCP may store the message in memory and check the message's validity before responding to the originating device. In some cases, intermediary devices may exist between the originating device and the receiving device. In certain embodiments, each of the intermediary devices (e.g., DDCCs between a sending and receiving DDCC) may store a copy of the message and may validate the message before forwarding the message to the receiving device, or another intermediary device between it and the receiving device. Such a communication process may be referred to as "store and forward" and may result in reduced system performance due to one or more of the following: (1) increase in time to send each message; (2) involvement of intervening CCPs; (3) store and forward of intervening messages; and (4) required memory storage. Certain embodiments disclosed herein provide greater latitude with the input and output signals because such signals operate independently.

Figure 15A:
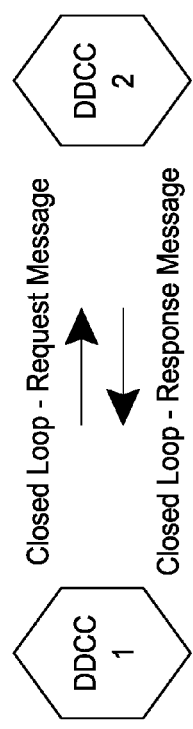
FIGS. 15A-B present two flow diagrams illustrating embodiments of closed loop communication in a distributed computing environment.
Figure 15B:
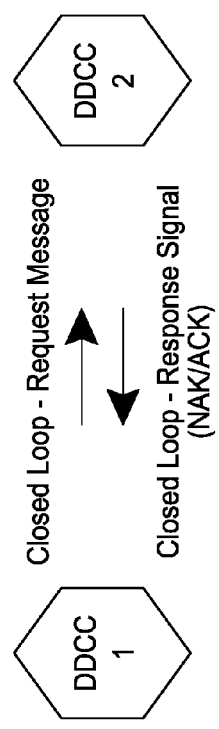

FIGS. 15A and 15B present two flow diagrams illustrating embodiments of closed loop communication in a distributed computing environment. FIG. 15A shows traditional closed loop message communication with a message response communication. The diagram of FIG. 15A illustrates traditional dependent two line closed loop communication with a message sent from an originating sending device DDCC 1 on its transmit line to a receiving device DDCC 2 on its receive line with a return message from the receiving device DDCC 2 on its transmit line back to the originating sending device DDCC 1 on its receive line. Although the transmission is illustrated as between two DDCC, it should be understood that the transmission may occur between two die of the two DDCC. In other words, the communication may be between an upper die of DDCC 1 and an upper die of DDCC 2 or may occur between a lower die of DDCC 1 and a lower die of DDCC 2. FIG. 15B illustrates an alternate to the closed loop communication method of FIG. 15A. FIG. 15B illustrates a message sent from an originating sending device DDCC 1 on its transmit line to a receiving device DDCC 2 on its receive line with a return signal instead of a message from the receiving device DDCC 2 on its transmit line back to the originating sending device DDCC 1 on its receive line. Use of a signal response, rather than a message may serve to reduce the size of the response and therefore allow for better usage of the return path for other purposes. The response signal may be returned upon acceptance and validation of the request message.

Certain embodiments disclosed herein provide "open loop" communication between devices, which may provide a number of benefits. Firstly, the speed of message transmission between remote devices via intervening devices may be increased. For example, message transmission via intervening devices may occur without intervening device processor involvement with the message transmission. Removing intervening process involvement in the communication can eliminate interruption of current processing tasks being performed by the intervening processors. Secondly, open loop communication may provide a reduction in system memory storage requirements because transmitted messages need not be stored to memory and then forwarded. The open loop communication techniques disclosed herein may allow for individual device input and output communication port connections to operate independently of each other for signals and/or messages. Such signals and messages sent in opposite directions may or may not be related to each other.

In certain embodiments, signaling techniques for open loop communication do not require 'direct handshaking' of messages passed from the originating source device to the destination device via intervening devices. However, certain embodiments include transmission of "transmit not acknowledged" (TNAK) and "transmit acknowledged" (TACK) signals (described in greater detail below) to each previous or preceding device on the previous or preceding sending device's transmit line. In certain embodiments, the completion of the open loop message communication may be a form of a closed loop message communication which occurs when the final destination device returns an independent response message back to the originating device via the one or more intervening devices. This response message from the final destination device to the originating device may provide an error status for the received message (for example, 'error free' or 'error indicated'). Intervening devices may pass along the message data to the next intervening device and on to the originating device without performing any separate data validation.

In some cases, certain transmission error conditions may be detected using the open loop communication techniques discussed above. For example, the following conditions may be detected: (1) non-detection of an unconditional TNAK response in the first time period by the originating device; (2) detection of an unconditional TNAK signal in the first time period by the originating device without subsequent detection of a TACK response signal in the second time period; and (3) detection of a TACK signal in the second time period, but by the originating device without having detected a TNAK signal in the first time period. In certain embodiments, a successful TNAK/TACK response to the sending device comprises receipt of an unconditional TNAK signal followed by a conditional concatenated TACK signal in first and second time periods, respectively.

In certain embodiments of distributed computing systems, a receiving device (described in detail below) is configured to send an unconditional TNAK and a conditional TACK status signal back to a sending device upon receipt of an "end of block" (EOB) or "end of transmission" (EOT). In certain embodiments, open loop data transmission functionality utilizes a particular signaling sequence, wherein the transmit connection of the sending device enters a high impedance state for a specific number of finite periods after sending an EOB or EOT signal. For example, the transmit connection may enter a high impedance state for two, three, or more finite periods.

The finite time periods in which the transmit connection enters a high impedance state may allow the receiving device to turnaround its receive connection to send responses back to the sending device during the sending device's high-impedance time periods. In certain embodiments, during a first period, a Transmit-Not-Acknowledge (TNAK) signal may be unconditionally sent back to the sending device. During a second period, a Transmit Acknowledge (TACK) signal may be conditionally sent back to the sending device, if no error condition in the transmission is detected. Such TNAK/TACK response signals sent back to the originating device may not necessarily mean that the overall message was sent without error, but may simply mean that the EOB or EOT was received by the receiving device.

In certain embodiments, to complete an open loop message transaction, the final destination device transmits a response message back to the originating device. Such transmission may be sent over a separate communication path from the destination device to the originating device through intervening devices.

Open loop communication techniques. as described herein. may provide a mechanism for testing communications paths between physically connected devices. For example, the TNAK and the TACK response signals, as described herein, may be used to identify and isolate an error on a transmit connection, or an error on a receive connection. Furthermore, an individual die within a device (e.g., a DDCC) may also be tested with the use of a third device that is physically connected to both the testing device and the tested device. Therefore, a grouping of three devices, which are physically connected, can work together to determine and isolate a port failure using TNAK/TACK time and size response signaling to determine a primary failed input or output connection. In certain embodiments, by involving additional devices, one or more die ports in a DDCC device may be comprehensively tested. In certain embodiments, even if two or more errors exist, using TNAK/TACK signaling, the die port of the DDCC device causing the errors can be identified, isolated, and/or worked around by re-routing message communications paths.

Figure 15C:
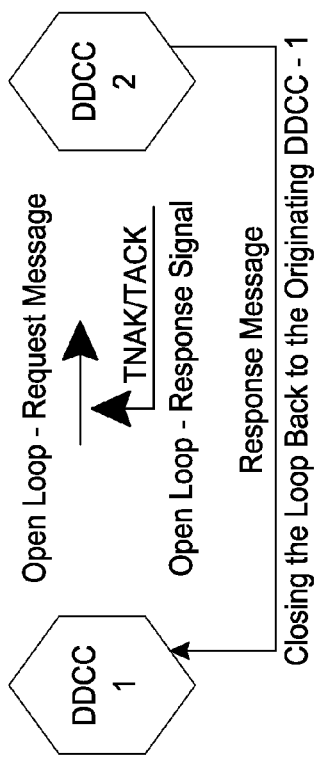
FIGS. 15C-D present two flow diagrams illustrating embodiments of open loop communication in a distributed computing environment.
Figure 15D:
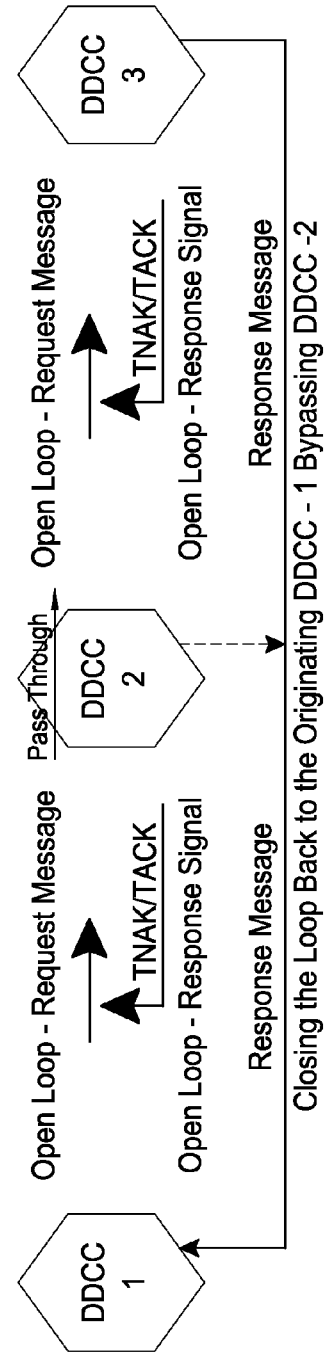

FIG. 15C and FIG. 15D present two flow diagrams illustrating embodiments of open loop communication in a distributed computing environment. FIG. 15C is a flow diagram illustrating an embodiment of an open loop communication between near-neighbor or adjacent devices with a return signal. The near neighbor device returns a TNAK/TACK signal back over the receive connection to the sending device in response to receiving the EOB or EOT of the received message. In certain embodiments, the return signal represents only that the message was received, but not that it was validated. Upon receipt of the EOT, the near neighbor device may or may not send a response status message to the originating device to close the loop. FIG. 15D is a flow diagram illustrating an embodiment of an open loop communication to a remote device, wherein at least one intervening device is involved in the transmission. In certain embodiments, each intervening device, as well as the final destination device, returns a TNAK/TACK signal to its sending device in response to the EOB or EOT of the received message. The TNAK/TACK signals may only represent that the message was received, but not that it was validated. Upon receipt of the EOT message and the performance of error checking, the final device may send a message via various routing paths from the final destination device to the originating DDCC device, which may include a result of the error checking.

As illustrated in FIG. 15C, an independent two wire open loop communication with a message sent from an originating sending device DDCC 1 die on its transmit line to a receiving device DDCC 2 die on its receive line may be performed. In some cases, after the EOB or EOT is sent by the sending device DDCC 1 die, the sending device DDCC 1 die places its transmit line into high impedance for a minimum number of time periods. For example, the transmit line of the DDCC 1 die may be placed into high impedance for at least three or more finite time periods. When the receiving device DDCC 2 die receives an EOB or EOT, it will send an unconditional TNAK signal for a particular time period back to the sending device DDCC 1 die on the transmit line of DDCC 1 die, from the receive line of the receiving device DDCC 2 die. In some embodiments, the unconditional TNAK signal may be sent for less than one time period. For example, the unconditional TNAK signal may be sent for ¾ of one time period. Subsequent to the unconditional TNAK signal, the receiving device DDCC 2 die may send a conditional TACK signal. For example, the conditional TACK signal is sent for more than one finite time period, such as for 1.25 finite time periods. Further, in some cases, the conditional TACK signal is concatenated to the unconditional TNAK signal and the time period of transmission may be such that the total number of time periods is an integer (e.g., two time clock periods). In some embodiments, the conditional TACK signal is concatenated to the unconditional TNAK signal and may end with the start of the third finite time period and the concatenated signal of unconditional TNAK and conditional TACK appears as one signal of two finite time periods. This TNAK/TACK sequence may serve as a primary test of communications that take place between two devices. If a failure occurs, a comprehensive test may be initiated and performed. This comprehensive test is described in more detail below with respect to FIG. 19. After the final receiving device (e.g., DDCC 2 die in the example of FIG. 15C) responds with a TNAK/TACK sequence to the previous device (e.g., DDCC 1 die in the example of FIG. 15C), this final device calculates the validity of the CRCC of the previous message and responds to the originating device DDCC 1 die with a response message via a data tunnel.

In some embodiments, a data tunnel is a communication path capable of providing a response message responsive to a command from a destination DDCC die back to an originating DDCC die that sent the command. In some cases, the response message may include a cumulative error status of the message transfer along the entire message transfer path from the originating DDCC die to the destination DDCC die. The response message can travel back to the originating die through a separate data path (referred to, e.g., as a data tunnel) with the status of the overall message transfer. The open loop TNAK/TACK signal sequence can be performed with the receipt of EOT or EOB communication in the open loop signal sequence. Any intermediary DDCC die can be directed or individually selected to receive (e.g., store while passing through) the DDCC die in any transmission of a message to a final destination DDCC die. Each directed or individually selected DDCC die may, if programmed to do so, return, via a data tunnel, a closed loop message to the originating DDCC die. The final destination DDCC die returns a closed loop message back to the originating DDCC die. The separate data path (e.g., data tunnel) can be independent of the original open loop transfer through DDCCs. The data tunnel response message may occur at the end of the overall message transfer or it may occur when an error is detected during the overall message transfer. There may be cases where a response message may occur only when an error has been detected. No status error message thus assumes that the message has been transferred correctly.

FIG. 15D illustrates a similar open loop communication model as illustrated in FIG. 15C. However, in FIG. 15D, the communication is between DDCC 1 and DDCC 3, which are not in direct electrical communication. Thus, the communication passes through DDCC 2. In this example, DDCC 2 serves as a pass-through DDCC. Although the DDCC 2 can receive a TNAK/TACK signal from DDCC 3 and can send its own TNAK/TACK signal to DDCC 1, the pass through DDCC 2 generally will not process the response message generated by the recipient DDCC 3, but will instead pass the response message along to DDCC 1 without performing any additional processing.

In certain embodiments, an intervening addressed device specified in the original message may also be a recipient of the message. In such a case, the message may be stored for processing by the intervening device. If the intervening device discovers an error during transmission, it can respond with a TNAK signal without the TACK signal response message back to the originating device. This response from the intermediary device may be in addition to a response message from the final destination device. Using one or more intermediary devices addressed in the message to help with error detection may allow for the message to be resent, when an error is detected, from the originating source device sooner than if the final destination DDCC device alone is responsible for error detection. The intervening addressed device may use its Configuration Control Processor (CCP) for generating the return message enabling the device's Functional Intent F(X) to continue performing others tasks without being interrupted to generate the return message.

Open loop communication techniques, as described herein, may provide a mechanism for testing communications paths between physically connected devices. For example, the TNAK and the TACK response signals, as described herein, may be used to identify and isolate an error on a transmit connection, or an error on a receive connection. Furthermore, an individual die within a device (e.g., a DDCC) may also be tested with the use of a third device that is physically connected to both the testing device and the tested device. Therefore, a grouping of three devices, which are physically connected, can work together to determine and isolate a port failure using TNAK/TACK time and size response signaling to determine a primary failed input or output connection. In certain embodiments, by involving additional devices, any die port in a DDCC device may be comprehensively tested. In certain embodiments, even if two or more errors exist, using TNAK/TACK signaling, the die port of the DDCC device causing the errors can be identified, isolated, and/or worked around by re-routing message communications paths.

Figure 16:
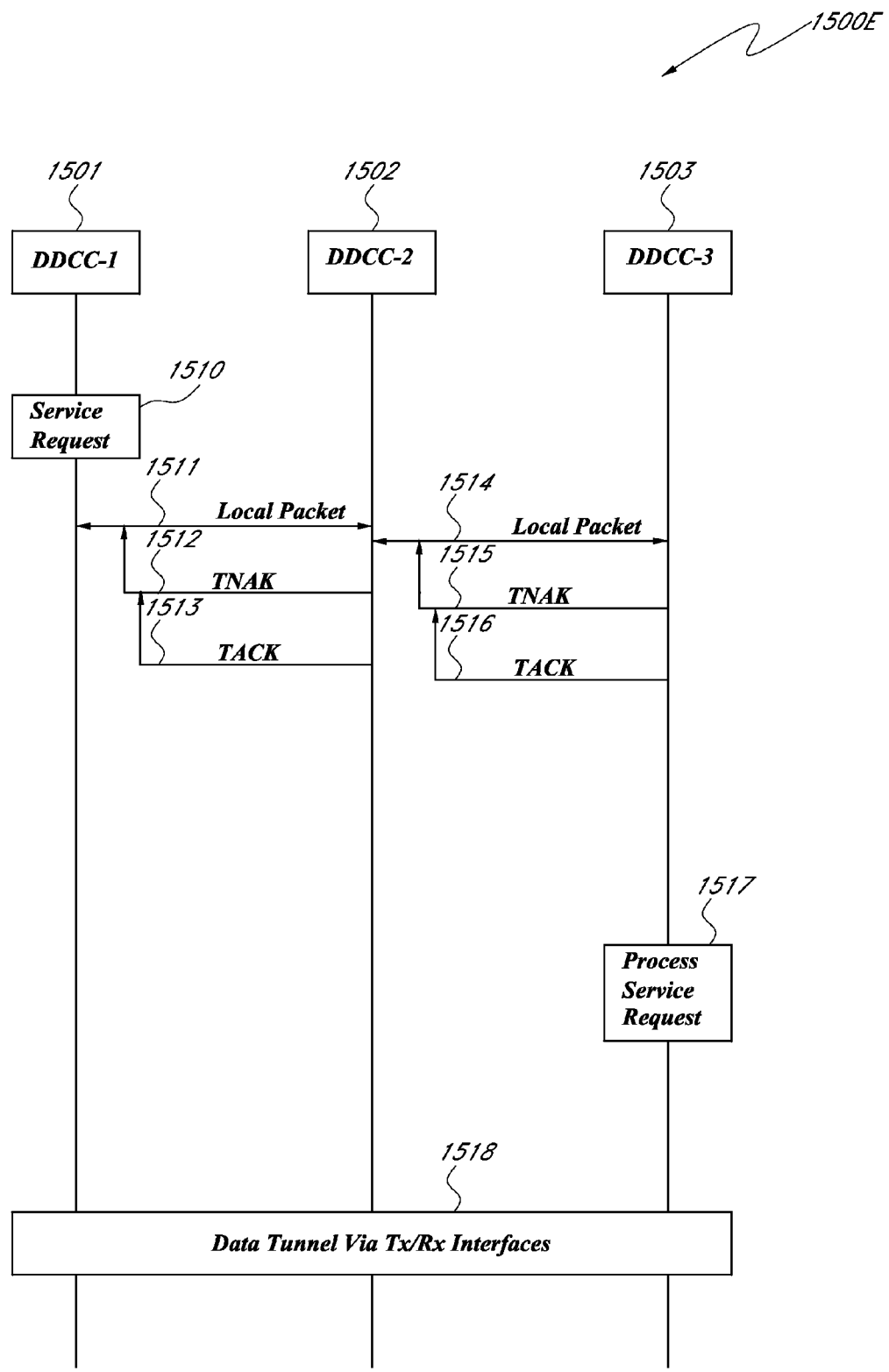
FIG. 16 illustrates a signal flow diagram of one embodiment of open loop signal communication between DDCC-1 and DDCC-2, and between DDCC-2 and DDCC-3.

FIG. 16 illustrates a signal flow diagram of one embodiment of open loop signal communication between DDCC-1 and DDCC-2, and between DDCC-2 and DDCC-3. Open loop communication can provide for the originating DDCC to send an EOT or EOB message to the receiving DDCC and, upon receipt of the EOT or EOB message, the receiving DDCC can respond with a TNAK/TACK signal sequence back to the originating DDCC on its transmit line. The final recipient DDCC can close the communication loop with a closed loop response message back to the originating DDCC. The communication sequence illustrated in FIG. 16 illustrates how open loop and closed loop communications can work together to efficiently provide distributed processing and distributed memory capabilities and to perform a primary test of communication occurring in the system. Three DDCC 1501, 1502, and 1503 are shown in electrical communication and configured to perform a service request 1510 initiated by the DDCC 1501. After DDCC 1501 sends the EOB or EOT indicating that transmission of the message is complete, DDCC 1501 places its transmit line 1511 into a high impedance state for a finite period to accept a TNAK 1512 and/or TACK 1513 sequence from DDCC 1502, which having received an EOB or EOT from DDCC 1501 sends the TNAK 1512 and/or TACK 1513 sequence back to DDCC 1501 on the transmit line of DDCC 1501, which can be the receive line of DDCC 1502. The request of DDCC-1 may be a pass to or a pass through request. If the request is a pass through request, the above TNAK/TACK sequence may be repeated between DDCC 1502 and DDCC 1503. In other words, the message may be passed through along the transmit line 1514 of the DDCC 1502 and a TNAK 1515 and TACK 1516 may be received from the DDCC 1503. When the TNAK 1515 and/or TACK 1516 sequence is complete, the DDCC 1503 may perform the service 1517 corresponding to the service request 1510. When the processing of the service 1517 is complete, the DDCC 1503 may send a message back to the originating DDCC 1501 to complete the transaction via a data tunnel 1518 or pass through communication channel. The data tunnel 1518 represents the passage of a message between intervening DDCC (e.g., the DDCC 1502) by providing the message to the intervening DDCC for forwarding, but without processing by the DDCC 1502, thereby enabling the DDCC 1502 to continue performing any processing tasks it may already be performing without interruption.

As described above, in one embodiment a DDCC includes two integrated circuit die, which may be arranged so that they face each other, or are stacked, and are in direct communication with one another. As such, as described herein, communication with a DDCC may include communication with one or both of the integrated circuit die included therein.

Specifically, FIG. 16 depicts signaling to facilitate the establishment of a data tunnel between two DDCC, which each may include one or more integrated circuit dies. A resulting data tunnel may exist between two adjacent DDCC or between two DDCC that are separated by one or more other DDCCs. While the signal flow diagram 1500E of FIG. 16 includes only three DDCC 1501, 1502, 1503, those skilled in the art will appreciate that FIG. 16 is merely an illustrative example. Those skilled in the art will also understand from the present disclosure that any number of DDCC may be involved with transmitting, processing and responding to a service request and/or transmitting and/or processing data associated with a service request.

As illustrated in FIG. 16 by block 1510, a method of requesting a service from DDCC 1503 by DDCC 1501 may include the DDCC 1501 determining and/or generating a service request for the third DDCC 1503. Given that, in this particular example, the third DDCC 1503 is not an immediate neighbor of the first DDCC 1501, the service request traverses the communication interface of the second DDCC 1502. To that end, as indicated by signal 1511, the method may include the DDCC 1501 transmitting a local packet including the service request to the DDCC 1502. As indicated by signal 1512, the method may include the DDCC 1502 responding to the DDCC 1501 by transmitting an unconditional TNAK signal, which indicates that the local packet may not have been successfully received. As indicated by signal 1513, if the local packet was successfully received, the method may further include the DDCC 1502 transmitting a conditional TACK signal to the DDCC 1501, which negates the automatically transmitted TNAK signal. In one embodiment, the DDCC 1501 is configured wait a period of time for a TACK signal after receiving the TNAK signal before relying on the TNAK signal. In one embodiment, the DDCC receiving a local packet transmits the TNAK and TACK signals back over the same physical connection that the local packet is received on, thereby freeing other signal pins on both DDCC to perform additional or other communication. In other words, the TNAK and TACK signals are received by the DDCC that originally transmitted the local packet on a signal pin normally used for transmission. Further, signal pins on the DDCC that originally transmitted the local packet DDCC that are normally used for receiving signals are also free to receive additional or other communication.

As indicated by signal 1514, the method may include the DDCC 1502 transmitting the local packet to the DDCC 1503. The DDCC 1502 may transmit the local packet during or after the DDCC 1502 transmitting the TNAK signal and/or the TACK signal back to DDCC 1501. Additionally and/or alternatively, the DDCC 1502 may retransmit portions of the local packet as it is received from the DDCC 1501.

As indicated by signal 1515, the method may include the third DDCC 1503 responding to the DDCC 1502 by transmitting a TNAK signal, which indicates that the local packet may not have been successfully received. Further, as indicated by signal 1516, if the local packet was successfully received, the method may include the DDCC 1503 transmitting a TACK message to the DDCC 1502, which negates the automatically transmitted TNAK message. In one embodiment, the DDCC 1502 is configured for a TACK signal after first receiving a TNAK signal before relying on the TNAK signal. In some cases, the TACK signal may be concatenated to the TNAK signal for at least a portion of the receive time.

As indicated by block 1517, the method may include the DDCC 1503 processing the service request originally sent by the originating DDCC 1501. As indicated by block 1518, the method may include the originating DDCC, DDCC 1501, and the final destination DDCC, DDCC 1503, establishing a data tunnel through the DDCC 1502. In one embodiment, in instances where the resulting data tunnel includes a path that includes one or more intermediary DDCC (e.g., the DDCC 1502) between the two DDCC that established the data tunnel (e.g., the DDCC 1501 and 1503), the data tunnel may be established using the respective communication interfaces of the intermediary DDCC without interfering with the primary function of the integrated circuits included in those intermediary or middle DDCC. In other words, each respective communication interface may substantially route data around the primary functional units and/or may by pass the primary functional units on the respective integrated dies that do not originate a service request and/or process the service request. As such, only the DDCC at which a service request originates and the DDCC in which the service request is processed substantially request, process, access, create and/or consider data traversing the data tunnel. In the example illustrated in FIG. 16, the communication interface of one or more of the die included in the DDCC 1502 may route data around the primary functional units and/or may bypass included in the one or more of the die, so that the computing operations of those functional units is substantially unaffected.

Figures 17A, 17B:
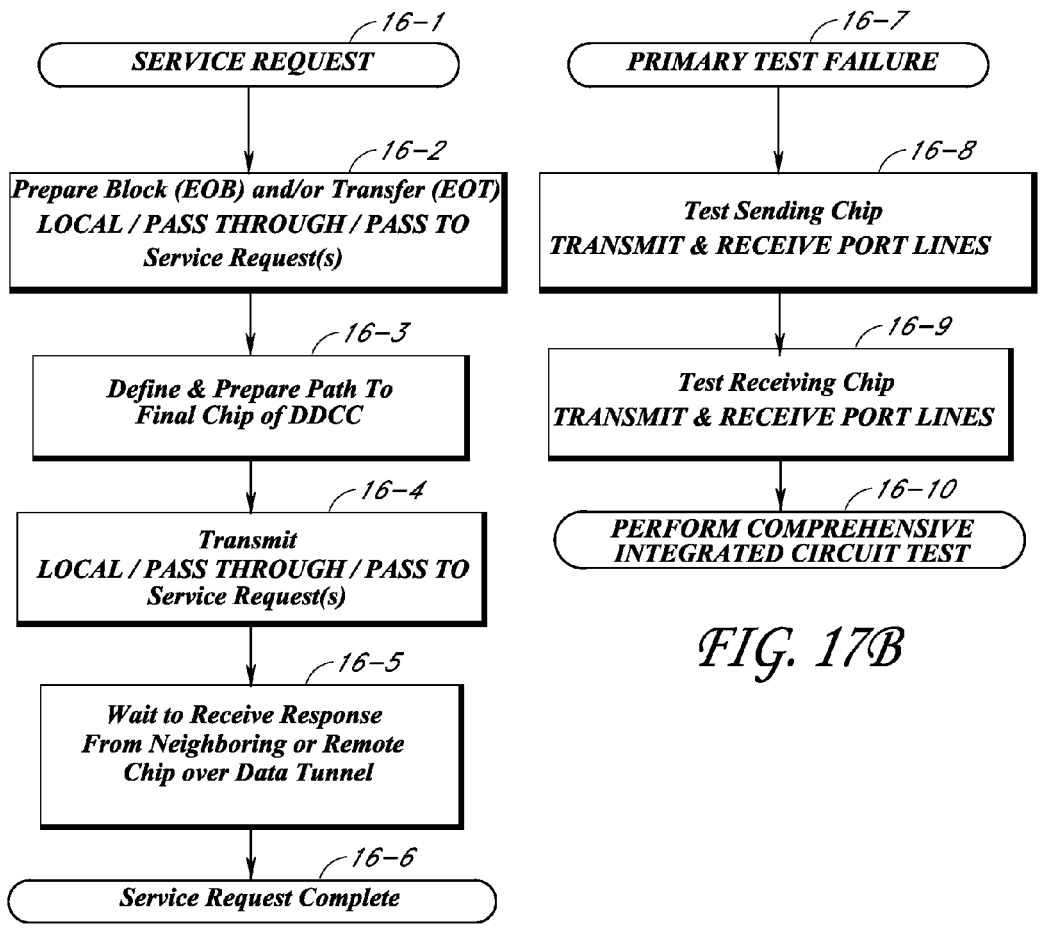
FIG. 17A is a flowchart illustrating one embodiment of a method of preparing and sending a service request.
FIG. 17B is a flowchart illustrating one embodiment of a method of performing an error check process in response to an error during the service request process of FIG. 17A.

FIG. 17A is a flowchart illustrating one embodiment of preparing and sending a service request using an open-loop method of communication. The illustrated method can be modified in a variety of ways. For example, in another embodiment, various portions of the illustrated method can be combined, can be rearranged in an alternative sequence, removed, or the like. Specifically, FIG. 17 illustrates an overview of the method of requesting remote processing of a service request. For example, with further reference to the signal flow diagram 1500E of FIG. 16, the flowchart of FIG. 17 illustrates one method that the DDCC 1501 may follow to establish a data tunnel with another DDCC 1503. To that end, as represented by 16-1, the DDCC 1501 defines a service request to be processed by the remote DDCC 1503. In block 16-2, DDCC 1501 prepares a processing command request to be transferred to the remote DDCC 1503. In some cases, the block 16-2 may include determining whether the respective service request is to be 'passed through' an intermediate DDCC 1502 or whether the service request is to be 'passed to' the DDCC 1502 for processing. Based on this determination, the service or command request may be designated for either pass through or pass to processing. In certain embodiments, a command request designated as 'pass through' means that the service request is routed across one or more intervening or intermediary DDCC without the intervening DDCC performing any processing related to the command request. Although the intermediary DDCC may not process a pass through designated command request, in certain embodiments, the intermediary DDCC may perform some processing relating to routing the command request. In contrast, in certain embodiments, a command request designated as 'pass to' means that in addition to routing the command request across the intervening DDCC, the intervening DDCC will process at least a portion of the command request. The command or service request transmission may contain multiple data blocks in order to complete the service request.

A data tunnel path is defined and initialized for communication in block 16-3 from the DDCC that initiates a command request (e.g., the DDCC 1501) to the destination DDCC (e.g., the DDCC 1503), which may include one or more intervening DDCC, such as the DDCC 1502. In certain embodiments, the data tunnel enables message communication, such as a command response, to be communicated between an originating or initiating DDCC that initiates a command request, and a processing or recipient DDCC that processes the command request. At Block 16-4 the service request is transmitted from the originating DDCC 1501 to the target or final recipient DDCC 1503 with, in some cases, an indication of whether the request is 'pass through', 'pass to', or 'local' to determine where the service request is actually to be processed. In certain embodiments, 'local' indicates that the DDCC receiving the service request will process the service request. Thus, in some cases, when the DDCC that is to process the request is adjacent to the originating DDCC, the identification of the service request as local may be applied by the originating DDCC. In some cases, when the DDCC that is to process the request is non-adjacent, the identification of the service request as local may be applied to the service request by an intermediary DDCC that is adjacent to the target DDCC that is to perform the service or command.

After the last data or command block associated with a service request has been transmitted, an EOB and/or EOT block is transmitted to indicate that the service request transmission has completed and that remote processing may be performed or commence. In some embodiments, processing of the command associated with a service request may commence prior to receipt of the EOB and/or EOT block. For example, a DDCC may begin executing multipart commands and/or commands associated with a preliminary processing step prior to receiving the entire command.

The originating DDCC die 1501 waits to receive a response from the remote DDCC die 1503 in block 16-5. In some embodiments, the response may be received over a separate response data tunnel. If the received response indicates that the processing has been performed without errors, then the service request completes in block 16-6.

In some embodiments, the service request packets may include information relating to the transmission of the service request. Further, the service request packets may include TNAK and/or TACK signaling information. Moreover, the process illustrated in FIG. 17B may include performing the error check process described with respect to FIG. 31 below in response to detecting an error during the service request of FIG. 17A.

When sending a service request, sometimes an error in the transmission may occur. The occurrence of an error may indicate a primary test failure as represented by block 16-7. The primary test failure may result in additional testing of both the sending DDCC and the receiving DDCC to determine the primary failure. At block 16-8, the sending DDCC die is tested to check the transmit and receive port lines of the sending chip. The receiving DDCC die is tested in block 16-9 to check the transmit and receive port lines of the receiving DDCC die. After the primary testing is completed, a comprehensive integrated circuit test will be performed by block 16-10. In some embodiments, one or more of the blocks 16-8 and 16-9 may be intermediary DDCCs rather than original sender or final recipient DDCCs. Thus, the testing process can be used to test the DDCC that originated a service request, a DDCC that is to perform the service request, and/or an intermediary DDCC.

Figure 18:
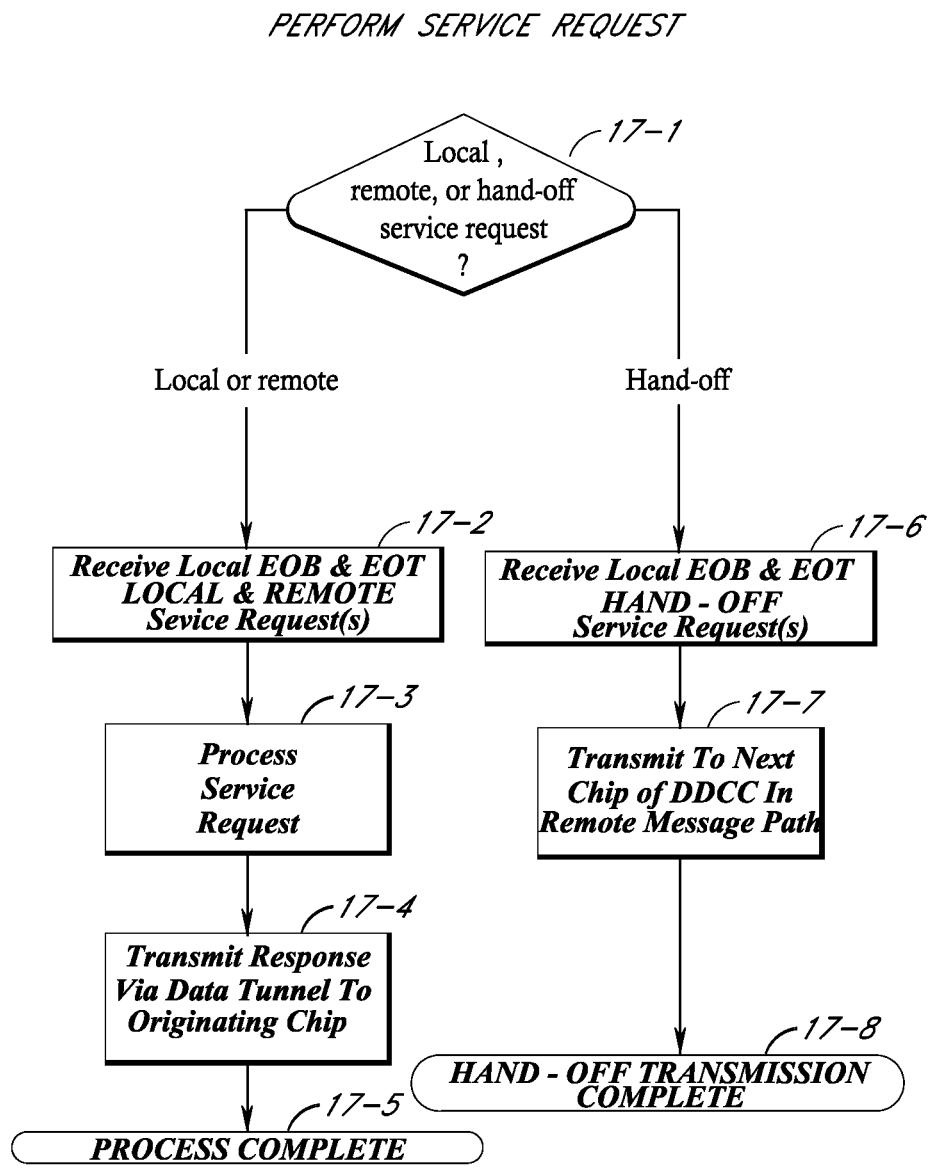
FIG. 18 is a flowchart illustrating one embodiment of a method of performing a service request.

FIG. 18 is a flowchart illustrating one embodiment of performing a service request. The illustrated method can be modified in a variety of ways. For example, in another embodiment, as with each of the processes described herein, various portions of the illustrated method can be combined, rearranged in an alternate sequence, removed, or the like. As previously described, FIG. 17 illustrates an overview of one embodiment of requesting remote processing of a service request. The method of FIG. 18 illustrates one embodiment of performing or processing the service request. To that end, as represented by 17-1, the method includes receiving a local, remote, or hand-off service request from another DDCC die. In one case, as represented by 17-2, the service request may be a "local service request" or a "remote service request." A local service request has an indicator to process the service request locally, and a remote service request has an indicator of the final destination DDCC die to process the service request. The local or remote service request is then processed as represented by block 17-3. At the completion of processing of the local or remote service request, a response associated with processing the service request at block 17-3 is transmitted via a data tunnel back to the originating DDCC chip at block 17-4. This completes the local and remote service request processing as indicated by 17-5.

If the service request is not a 'Local' or 'Remote', but is a 'Pass Through' to another DDCC, then the service request can include an indicator that identifies the service request as a Hand-Off type to another DDCC as shown in block 17-6. At block 17-7, the DDCC processing the service request transmits the service request to the next DDCC chip in the remote message path. In some cases, the next DDCC chip that receives the service request in the remote message path may be in a different PME. The Hand-Off transmission completes at block 17-8.

In some embodiments, testing can occur whenever communications occur between devices, or DDCC. When a communication to a device is not acknowledged (e.g., when TACK is not received within an acknowledgement window or clock cycle), the system can be configured to test and dynamically reconfigure the distributed computing system such that a different communications link and/or device is used. For example, after a failed communication from a first device to a second device, the system can perform a method of determining whether other devices neighboring the second device can successfully communicate with the second device.

Figure 19:
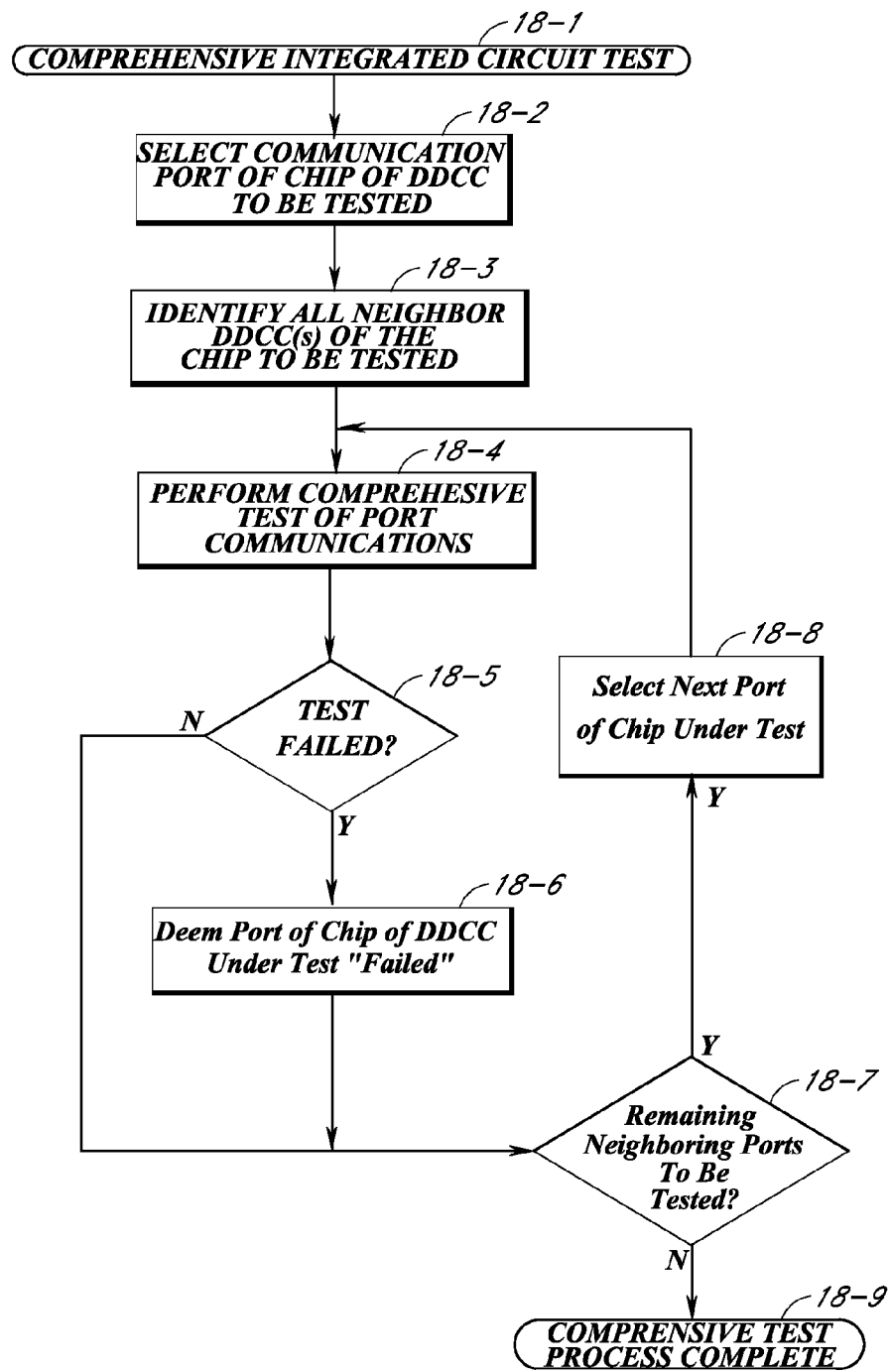
FIG. 19 is a flowchart illustrating one embodiment of a method of performing a comprehensive integrated circuit test.

FIG. 19 is a flowchart illustrating one embodiment of performing a comprehensive integrated circuit test 18-1. The illustrated method, as with each of the processes described herein, can be modified in a variety of ways. For example, in another embodiment, various portions of the illustrated method can be combined, can be rearranged in an alternate sequence, removed, or the like.

The process begins at block 18-2 where a communication port of a chip or die within the DDCC under test is selected for testing. At block 18-3, the process identifies all neighboring DDCC(s) of the chip to be tested. Subsequent to the identification of the neighboring, or adjacent, DDCCs, a comprehensive test of the port communications of the chip under test is performed with the aid of one or more identified neighboring DDCCs at block 18-4. In some embodiments, the comprehensive test includes checking input and/or output communications capabilities of the port that has the error to determine what portion of the port (e.g., input and/or output) has failed. A determination of the test passing or failing is checked in block 18-5. If the port test fails, then the port of the chip of the DDCC is deemed 'Failed' in block 18-6 and the testing continues for neighboring ports. A port identified as having a failure will be bypassed for future communications. Thus, in such cases, a communication path may be altered to avoid using a port that has been marked as having a fault. Further, in some cases, an error message may be output for display to a user informing the user of the faulty port. Otherwise, if the port 'Passes' then the testing continues for neighboring ports without marking the port as having an error or a fault. In such cases, the port remains available for communications. If a fault is detected in a communication path, but the port under test passes comprehensive testing, then it may be determined that another port of a DDCC may include the fault. For example, if a receive port of a receiving DDCC is determined to pass the comprehensive test, then the send port of the sending DDCC may be tested for a fault. If there are remaining ports to be tested as noted in block 18-7, then the next port of the chip under test is selected at block 18-8. If there are no remaining ports to be tested, then the Comprehensive Test Process completes at block 18-9.

Figure 20:
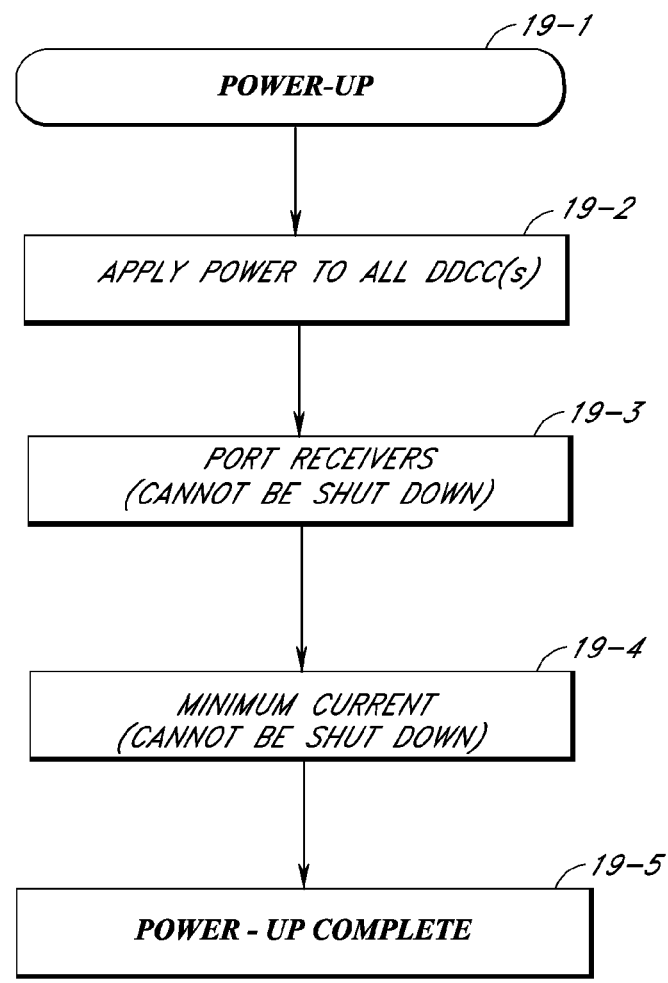
FIG. 20 is a flowchart illustrating one embodiment of a method of applying system power.

FIG. 20 is a flowchart illustrating one embodiment of a method 19-1 of applying system power to the DDCCs. The illustrated method, as with each of the processes described herein, can be modified in a variety of ways. For example, in another embodiment, various portions of the illustrated method can be combined, can be rearranged in an alternate sequence, removed, or the like.

The process begins at block 19-2 where power is applied to at least some DDCCs of a PME. In some cases, the block 19-2 includes applying power to all the DDCCs of a PME. Further, in some implementations, the block 19-2 includes applying power to all DDCCs of a plurality of interconnected PMEs. In certain embodiments, as indicated by the block 19-3, the DDCC port receivers remain powered during operation of the PME that includes the DDCC. Advantageously, in certain embodiments, maintaining power to the port receivers enables a DDCC operating in sleep-mode to receive a command to wake-up from the sleep mode. Further, in certain embodiments, as indicated by the block 19-4, a minimum current is supplied to the DDCC at all times enabling DDCC configuration settings, status information, and, in some cases, portions of the internal function F(x), such as memory, within a DDCC to remain available even when the DDCC enters or is in sleep mode. The System Power-Up Application completes at block 19-5.

Sleep Mode Management

Figure 21:
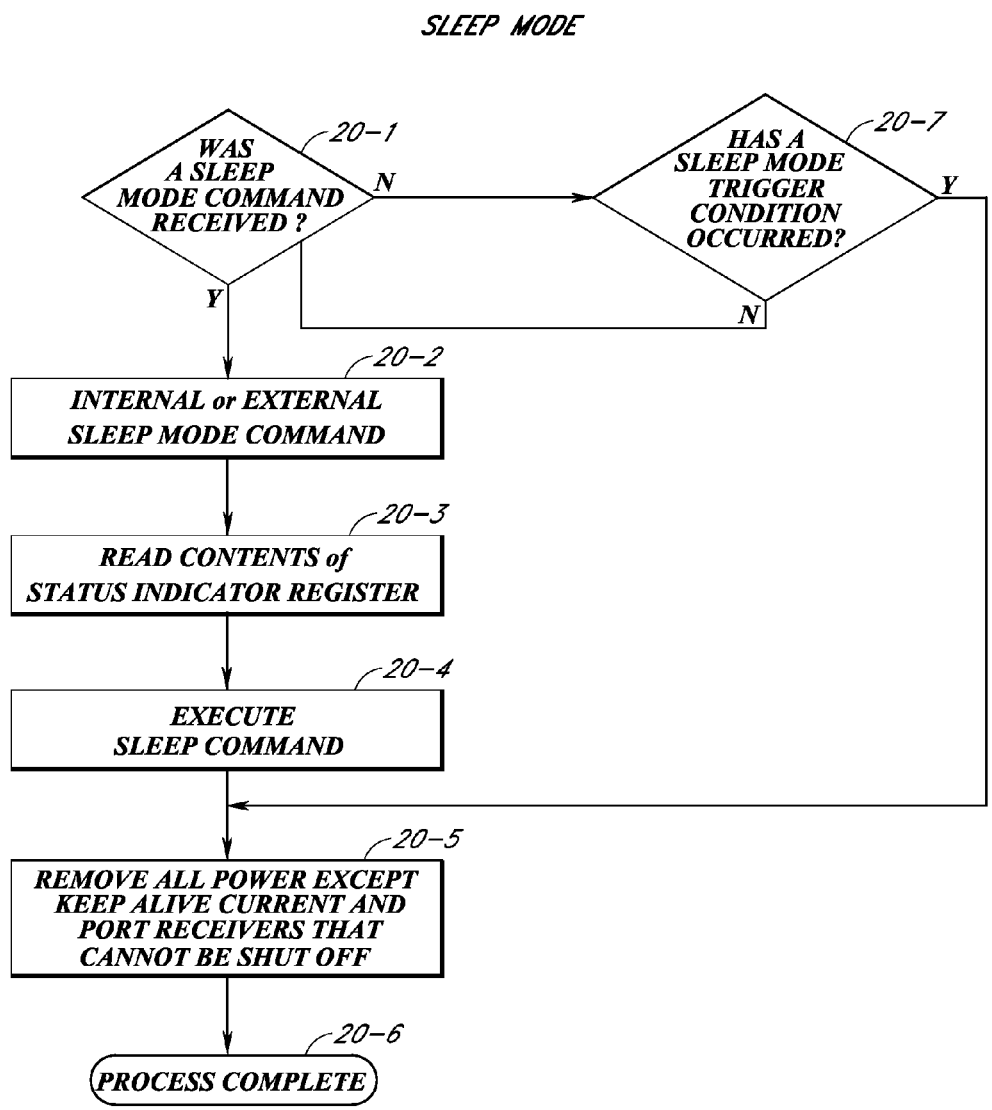
FIG. 21 is a flowchart illustrating one embodiment of a method of shifting to a sleep mode of operation in a distributed computing system with a sleep mode command or an unconditional operation.

FIG. 21 is a flowchart illustrating one embodiment of a method of shifting to a sleep mode of operation in a distributed computing system with a sleep mode command or an unconditional operation. At decision block 20-1, it is determined whether a command to enter sleep mode has been received. If so, the process proceeds to block 20-2. As indicated by the block 20-2, the sleep mode command may be issued internally by an application executing in the DDCC chip or received from an external source, such as from another DDCC package. The DDCC package receiving the sleep command reads the contents of the status indicator register at block 20-3 and begins to execute the sleep mode command at block 20-4. At block 20-5, the steps to cause the DDCC to enter a sleep mode state are performed. These steps can include removing all power from the DDCC except for a minimum operating current, and power for maintaining the operation of the receiver ports. As previously stated, the power supplied to the receiver ports can enable the capability to wake-up from sleep mode at a later time. The sleep mode process may complete at block 20-6.

If a sleep mode command was not received, it is determined at the block 20-7 whether an unconditional sleep mode trigger has occurred. The unconditional sleep mode trigger may include one or more conditions that cause a DDCC to enter sleep mode regardless of the lack of receipt of a sleep mode command. In some cases, the sleep mode trigger can include the DDCC being idle for a threshold period of time. In other cases, the sleep mode trigger may include the loss of one or more clock signals received by the DDCC. In certain embodiments, the sleep mode is triggered when all clock signals received by the DDCC are lost or cease to be received by the DDCC. When an unconditional sleep mode occurs, the process proceeds to block 20-5 and the sequence to remove power to the DDCC may be performed similarly to the case when a sleep mode command is received.

Figure 22:
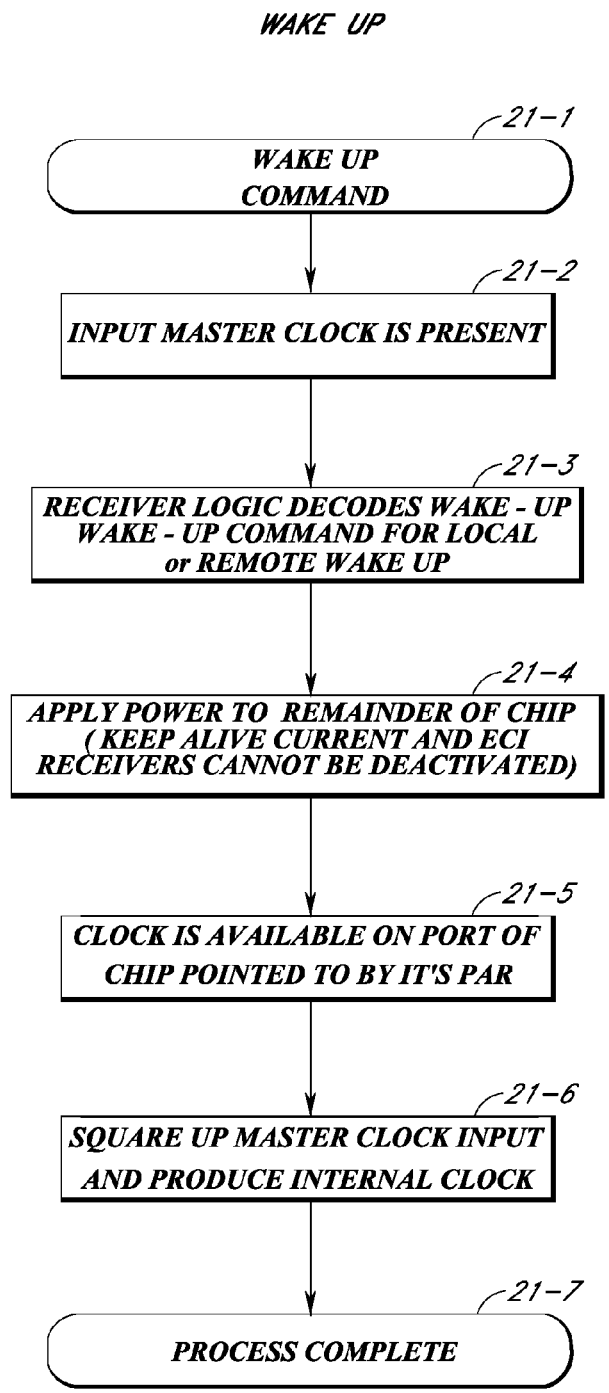
FIG. 22 is a flowchart illustrating one embodiment of a method of reactivating an integrated circuit, in response to a wake-up command, from a sleep mode of operation in a distributed computing system.

FIG. 22 is a flowchart illustrating one embodiment of a method of reactivating an integrated circuit, in response to a wake-up command, from a sleep mode of operation in a distributed computing system. The wake up command is received at block 21-1. At block 21-2 a master clock signal is received at the DDCC. At block 21-3 receiver logic within the DDCC receives and decodes the wake-up command at the block 21-1 from a local or remote DDCC. The process of waking up the remainder of the DDCC chip occurs in block 21-4, which includes applying power to the DDCC. Note that, in some cases, the DDCC will already be receiving a minimum current, and the external communications interface port receivers are generally already active as described with respect to the sleep mode processes above. The wake-up sequence may utilize a clock that is available at a receive port of the chip and which is directed to the DDCC by a port address register (PAR) at block 21-5. The clock that is received by the DDCC chip may be a master clock signal, which may be assigned as an internal clock at block 21-6. In some cases, the clock signal may be processed or reshaped to restore or ensure that the clock signal maintains its square wave shape. For example, in some cases, noise, interference, and/or length of a communication path can result in distortions in the clock signal. In some cases, the clock signal may be filtered or reshaped to remove these distortions. In some embodiments, the DDCC is configured to filter or reshape the master clock square wave to create a cleaned clock wave form. The cleaned clock wave form can be assigned to be used at the internal clock of a DDCC die. The wake up sequence completes in block 21-7.

Figure 23:
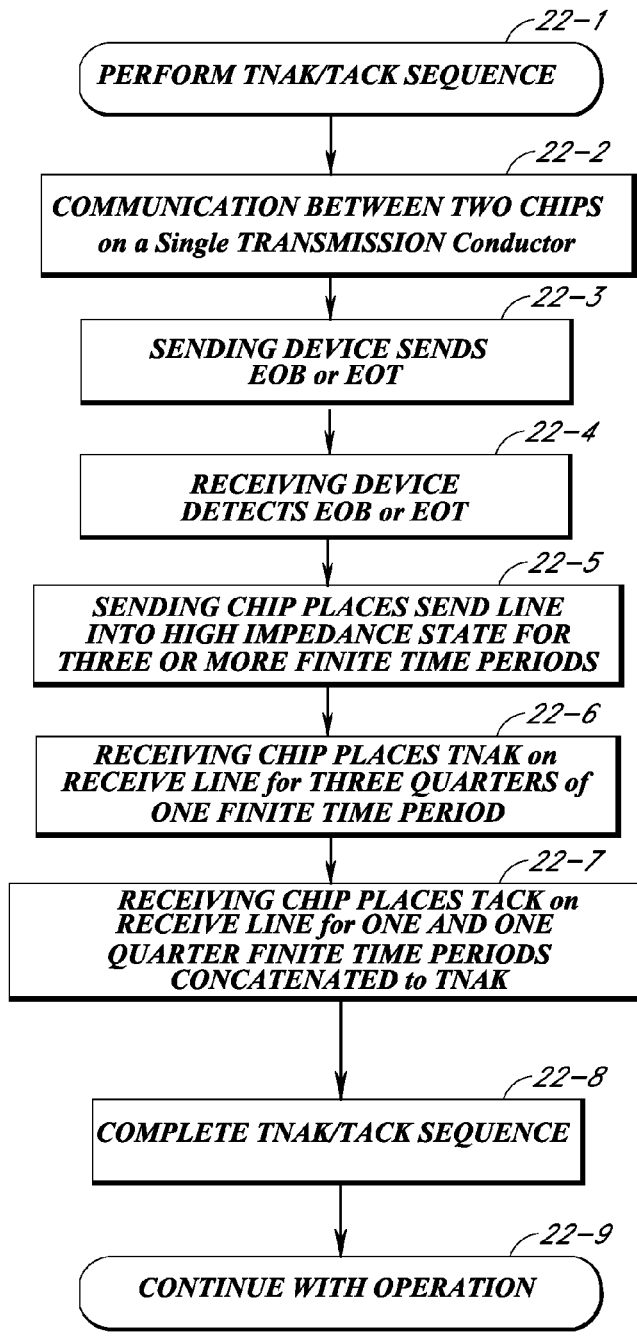
FIG. 23 is a flowchart illustrating one embodiment of an operation sequence in a distributed computing system utilizing open-loop communication using a TNAK/TACK test.

FIG. 23 is a flowchart illustrating one embodiment of an operation sequence 22-1 in a distributed computing system utilizing open-loop communication using a TNAK/TACK sequence. The process begins at block 22-2 with communication between two DDCC chips on a single transmission communication line with one DDCC transmitting a message to another DDCC. The sending DDCC package sends data with an end of block (EOB) or an end of transmission (EOT) indicator as shown in block 22-3. The receiving DDCC detects the EOB or EOT at block 22-4. A handshaking sequence then occurs over the communication line. At block 22-5, the sending chip places the send line into a high impedance state for a number of time periods. For example, the send line may be set at high impedance for three or more time periods. When in the high impedance state, the sending DDCC awaits a response from the receiving DDCC. When communication occurs between DDCC, the communication is between die included in the DDCC. For example, a lower die of one DDCC may communicate with a lower die of another DDCC or the upper die of one DDCC may communicate with the upper die of another DDCC. Typically, the DDCC itself does not include communication systems or logic. Each die within the DDCC may include communication logic to facilitate routing messages. The receiving DDCC die then places a TNAK signal on its receive line, which is communicated to the sending DDCC die along the high impedance state send line completing a handshake with the sending DDCC die. Two or more time periods can be defined for signaling between the sending die and the receiving die on the receiving die's receive line. In some cases, the TNAK signal duration is less than one time period. For instance, the TNAK signal duration may be three quarters of a first time period as indicated at block 22-6. The TNAK signal should be received before the end of the first time period; otherwise, the sending die may assume that a communications failure has occurred. Subsequent to providing the TNAK signal, the receiving DDCC die provides the sending DDCC die with a concatenated TACK response at block 22-7. The concatenated TACK response should be received before the end of a second time period; otherwise, the sending die will assume that a communications failure has occurred. In some embodiments, the concatenated TACK response can be received during the first time period, during the second time period, or during a combination of the first time period and the second time period.

Typically, the first and second time periods are longer than one clock period and are selected such that the period of communication of the TNAK and the concatenated TNAK/TACK adds up to an integer number of clock periods. Thus, for example, the concatenated TNAK/TACK signal may be provided for 1.25 time periods if the TNAK was previously provided for 0.75 time periods. The TNAK/TACK sequence may complete at block 22-8. Subsequent to completion of the TNAK/TACK sequence, a process of transferring data blocks may continue at block 22-9. In some embodiments, an error check process may occur during the handshake process as described in more detail below with respect to FIG. 31.

System Clock Distribution

In multichip distributed computing environments, communication distances and chip interconnections can present complications with respect to clock signal distribution within the distributed system. However, distribution of a synchronous global clock signal throughout the distributed environment, or at least a portion thereof, may be desirable, or necessary, to enable a sufficiently high speed performance, as described herein. Furthermore, synchronous global clock distribution may reduce system complexity. Certain embodiments disclosed herein provide systems and/or methods of distributing a single-frequency clock signal throughout at least a portion of a distributed computing system, such as via communication messages and digital signals. Within a distributed system, data may be superimposed on a single-frequency clock for messaging and/or signaling throughout the system. For example, the system may utilize amplitude modulation, pulse-width modulation, or other modulation scheme for encoding data in the system clock signal. In certain embodiments, data is not transmitted between distributed devices in the absence of a clock signal. Therefore, clock signal distribution may be based at least in part on communication requirements of the distributed system, and may mirror the communication fabric of the system. As described above, distributed computing devices through which system clock signals are propagated may comprise flying leads, which may not suffer from impedance matching issues potentially associated with other connection mechanisms.

Synchronous clock distribution may provide the fabric of a distributed system of reconfigurable processing and/or distributed memory devices, which may use distributed clock signals. In certain embodiments, devices of a distributed system include dynamically-reconfigurable clock input receiving connections, wherein clock signals may selectively be received on one or more of a plurality of input connections. For example, an integrated circuit that is part of a distributed computing system may or may not have a dedicated clock input port and may instead comprise a plurality of configurable input ports, any of which may be designated as a clock input port according to a system clock distribution scheme. Configurable and/or reconfigurable clock input and/or output ports may provide increased flexibility in distributed system design. Furthermore, as described in greater detail below, synchronous clock distribution may allow for the configuration of computing devices within a distributed system into clusters, nodes, or other groupings.

Distributed systems may include Dual Die Chip Carriers (DDCCs) comprising two integrated circuit (IC) dies as described above, wherein the DDCCs may receive system clock signals over configurable clock input ports. Although the DDCC are generally described as including two IC dies, in some cases, a DDCC may include more or less ICs. References herein to chips, devices, chip carriers, packages, and the like may refer to DDCC, or any other packages that may contain or include one or more integrated circuit dies. Furthermore, such references may refer to components of a package or die, such as one or more of a group of devices contained within a single electronic die or package.

Figure 24:
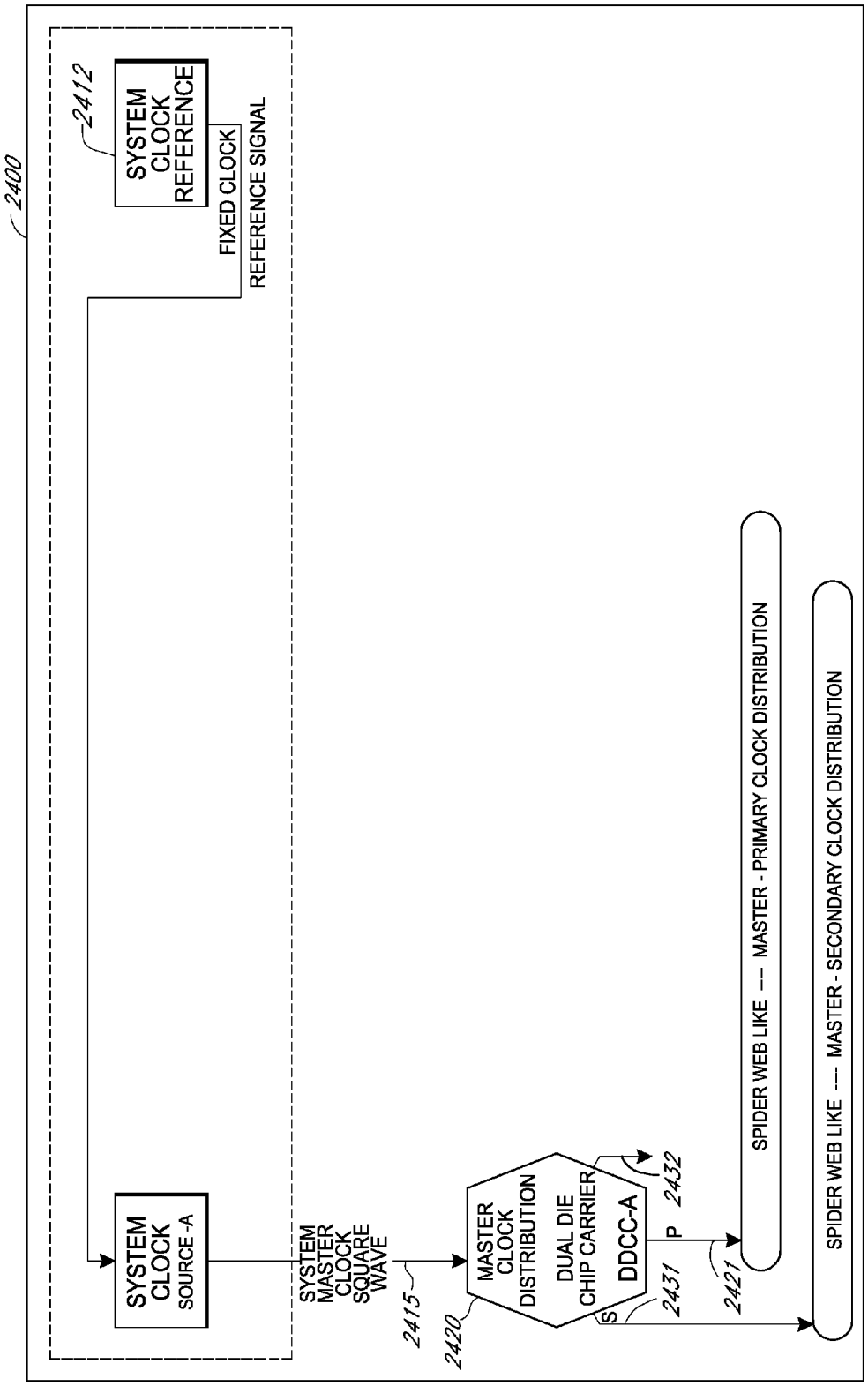
FIG. 24 is a diagram of a single clock source distribution for the clock signal output of a DDCC.

FIG. 24 is a diagram of a single clock distribution system 2400 for reconfiguration of the clock signal output of a DDCC 2420. In certain embodiments, at least a portion of the distributed computing devices of the system 2400 comprise a hexagonal-shaped package. The system 2400 may include a number of DDCCs assembled into a package, such as one or more PME modules, with interconnections to enable clock and data distribution between DDCCs and/or between packages of DDCCs, such as between PMEs. As described above, hexagonal packaging may allow for both orthogonal and non-orthogonal communication, whereas square and rectangle packages may only allow for orthogonal communication. Non-orthogonal communication paths may provide greater configuration flexibility, as well as a faster, more direct communication path through intervening devices between originating and the final destination devices. In certain embodiments, such features may provide significant benefits with respect to message communication among configured clusters, nodes, nodes-of-nodes, or supernodes of distributed computing devices that are remotely positioned from one another.

In certain embodiments, two or more hexagonally-shaped integrated circuit dies are disposed within each device or DDCC. Such integrated circuit dies may be referred to herein as "upper" or "lower" dies. However, such terms are used for convenience only, and may or may not refer to relative physical position or configuration. Therefore, discussion herein relating to an upper die may be applicable to a lower die, and vice versa.

Dual-die DDCCs, as shown in the system 2400 of FIG. 24, may comprise a "dual interface," which can include an external interface and an internal interface. This dual interface may be substantially identical for both upper and lower dies. In certain embodiments, an identical dual interface of the upper die may be flipped over and mated to a lower die using, for example, ball grid solder bumps, or other electrical connection mechanisms, to provide parallel signal connections between the two die. This connection may be made between the internal function interface (IFI) of the lower die and the upper die of a DDCC. In addition to the parallel signal connections, six or more serial bus connections may be provided between the two circuit dies of a DDCC. The six individual independent communication pairs may be connected between the external communications interface (ECI) of the lower die and the upper die of the DDCC. The dual interface may comprise one or more of the following logic modules: (a) External Communication Interface (ECI); (b) Cross-Point Switch (CPS); (c) Local Private Memory (LPM); (d) Configuration Control Processor (CCP); and (e) Internal Function Interface (IFI), as shown in FIG. 6 and FIG. 7 the functionalities of which are described herein.

The ECI module 520 may provide an interface to other external devices and interface compliant devices. Further, the ECI 520 may contain one or more fixed high impedance digital signal and linear external inputs and outputs, input and output shift and hold registers, and associated combinatorial control logic. In certain embodiments, the ECI 520 connects to the CPS 530, LPM 550, and/or CCP 540. The ECI 520 may be configured to direct a received clock signal on an assigned input port and pass it through to a different output port of the device to extend the clock string and to pass a signal or message data to another die in the DDCC or to another DDCC. In certain embodiments, substantially all data communication between interconnected devices is accomplished by super-imposing data on distributed clock signals.

The CPS 530 may provide digital and linear signal routing between the ECI 520 and the IFI 510 (from the ECI 520 to the IFI 510 or vice versa) and/or between the ECI 520 input and the ECI 520 output. The LPM 550 may contain local memory to support the CCP 540, such as Read Only Memory (ROM), Random Access Memory (RAM), Write Once Read Many (WORM), or Electrically-Erasable Programmable Read Only Memory (EEPROM). In some cases, the CCP 540 may be a Reduced Instruction Set Computer (RISC). In certain embodiments, the CCP 540 is used to configure and/or re-configure one or more of the ECI 520, CPS 530, and/or IFI 510. Such CCP 540 functionality may be used to remove the interface burden of performing such tasks on the internal function module (F(X)) 501 of the device.

The Internal Function Interface (IFI) 510 of the dual interface may pass linear signals to/from the internal function F(X) module 501. The IFI 510 may contain input and output shift and holding registers configured to provide data and configuration control interface signals to the internal function F(X) module 501. The IFI 510 may also contain parallel transfer and holding registers that operate the parallel path between the internal function F(X) 501 of the upper and lower circuit dies. In certain embodiments, each of the upper die and the lower die may include its own ECI 520, CPS 530, CCP 540, LPM 550, and IFI 510. Thus, in some cases, the IFI 510 of each upper and lower die may match to the IFI 510 of the other DDCC die to form a parallel path between the lower die's internal function F(X) module 501 and the upper die's internal function F(X) module 501. In certain embodiments, the registers may be 128 bit registers. In other embodiments, the registers may be a different size.

The internal function module F(X) 501 of each circuit die may be incorporated, at the layout stage of the die, into the design of the die and may interface with the Internal Function Interface (IFI) 510. The internal function F(X) module 501 may be a processor, a memory, a Field Programmable Gate Array (FPGA), or other functional unit, and/or may embody or implement one or more logical functions. In certain embodiments, the internal function F(X) 501 is not limited to digital functions, and may incorporate mixed signal functionality. For example, the dual interface may provide a mixed signal interface connection to other devices.

In certain embodiments, collections of chips or dies have clock signals configured at each of the associated chips within the collections. Clock signal inputs and outputs may provide portions of the system distribution fabric (e.g., a pattern of clock distribution across the system) of the clock signal at each chip, as well as a mechanism for data transfer messaging between chips, such as through super-imposing data messages on such clock signals. In certain embodiments, the chip port the clock is received on can be configured in at least one of two ways: 1) the first clock signal received at the chip may cause a representation of the port address over which the clock was received to be entered into the port address register (PAR) or 2) a received command to change the content of the PAR. In certain embodiments, the first clock received automatically defines the initial clock assignment for the PAR. Variations of the distribution fabric of clock signals may allow for the configuration of clusters, nodes, or other groupings of chips, as described herein, as well as the configuration of data messaging paths from device to device, which may include remote communications through intervening devices. In certain embodiments, the distribution fabric of the clock signals may be reconfigured to reform the device groupings and message routing paths of the processing clusters and/or nodes. In some embodiments, clock signal distribution is used to configure clusters, nodes and super nodes. After the clock signal distribution has been performed, additional data paths may be defined within the clusters, nodes and super-nodes in order to pass data between portions of the clusters, nodes and super-nodes according to processing requirements. These additional data paths can use the clock signal distribution as the source for the clocking used for these data paths.

In certain embodiments, distributed computing devices include an input clock used to input data into the External Communication Interface (ECI) 520 serial input registers for each of the multiple communications ports. Normal clock operation of the individual input port data/clock signals between distributed devices may rely on the device's internal clock. In certain embodiments, the device's input clock is set to an 'off' state when the device is configured for mixed signal input to the Internal Function F(X) 501.

Distributed computing devices may further include an output clock used to output data from the device's External Communication Interface (ECI) 520 serial output registers for each of multiple communications ports. Similar to the input port, normal clock operation of the individual output port data/clock signals between distributed devices may rely on the device's internal clock. In certain embodiments, the device's output clock is set to an 'off' state when the device is configured for mixed signal output from the Internal Function F(X) 501.

In certain embodiments, for a device in a pass-through configuration, the output clock may utilize the input port clock to pass data from the input port to the output port through the External Communications Interface (ECI) 520. In addition, for certain external devices, such as a periphery or other device manufactured to be compatible or capable of communicating with a DDCC die, the DDCC output clock may utilize the input port clock provided by the external device (which may be referred to as a "compliant device") to pass data from the input port to the output port through the (ECI) 520. Typically, although not necessarily, the complaint device may have a slower clock frequency than the DDCC. Thus, in some cases, by utilizing the clock signal of the compliant device, the DDCC can be configured to communicate with the compliant device. When data is received on an input port, the data may be passed through the device to the specified one or more output ports without requiring the data to be stored into memory in order to forward. Preferably, the compliant device does not have a higher clock frequency than the DDCC.

With further reference to FIG. 24, the system 2400 includes a system master clock square wave 2415 that may serve as a system clock signal to one or more distributed devices, such as dual-die chip carriers DDCC 2420. The master clock square wave 2415 may be generated by an oscillator 2412 or clock generator (not shown). In some cases, the system 2400 may include a system clock source that includes a buffered version of the clock signal generated by the oscillator 2412. The clock generator may be part of a PME and may, in some cases, be separate from the one or more DDCC of the PME. The diagram of FIG. 24, as well as FIGS. 25-33 below, may be useful in illustrating system flexibility associated with initial distribution, and subsequent reconfiguration, of clock signals using derived clocks for one or more operational modes.

The system master clock square wave 2415 may be configured as a single-frequency system clock signal that serves as a source for other clock signals in the system 2400. It may be desirable for the system master clock square wave to have high stability. For example, in certain embodiments, the system clock signal varies in frequency by less than half a cycle over a period of one second. Additionally, in certain embodiments, the system master clock is continuous and contains no spurious signal artifacts or other changes in frequency. In some cases, the system master clock may be a sine wave input to the first DDCC. In such cases, the DDCC can be configured to interpret the sine wave and/or can include a waveform converter that is configured to convert the sine wave into a square wave suitable for driving a logic device.

In embodiments in which data is superimposed on the clock signal, such data transmission advantageously may not perturb or alter the clock signal substantially, or in any detrimental way. Although not limited as such, the system master clock square wave 2415 may be configured to operate at frequencies of 1 GHz or higher. In some cases, the system master clock square wave 2415 may be configured to operate at a minimum frequency of approximately 8 GHz. In certain embodiments, the master clock square wave operates at a frequency of 25-30 GHz or higher. In order to achieve system requirements, in some cases, the system clock signal reference 2412 may operate in a thermally-controlled environment. For example, the system clock reference 2412 may comprise an oven-controlled crystal oscillator, or the like.

A first device that provides a master clock signal to a second device may be considered the parent of the second device. The second device's internal clock may be derived from the distributed master clock received from the first device. In certain embodiments, the device's internal clock is used to configure and control certain device functions, such as, for example, 'External Communications Interface' (ECI) 520; 'Configuration Control Processor' (CCP) 540; 'Cross Point Switch' (CPS) 530; 'Local Private Memory' (LPM) 550; 'Internal Function Interface' (IFI) 510; or communication with the companion corresponding circuit die of the DDCC device, or other function. The internal clock may further provide operational timing to the Internal Function F(X) 501 of the device. In certain embodiments, the internal clock signal may be provided to the Internal Function F(X) 501 whether or not the Internal Function F(X) 501 is in use, or active, or configured in an off state.

In some cases, a device's internal clock signal may be configured as an input clock signal or an output clock signal on one or more data communications ports of the External Communications Interface (ECI) 520. In certain embodiments, at a given point in time, each distributed computing device chip die may have access to more than one clock source, only one of which may be assigned or designated as the device's master clock. In some embodiments, the master clock source selection may change from time to time consistent with system and application requirements and the re-configuration of clock signal routing.

In some embodiments, an internal clock is used as a clock source rather than a master primary or master secondary clock for devices using an open loop communications path for superimposed data transmission. The internal clock can be generated by a die along the communications path. TNAK/TACK response signaling uses the sending connection to enter a high impedance state for multiple time periods. The high impedance state interrupts the continuous clock signal. Thus, in certain embodiments, the master primary and master secondary clocks are not used as the clock source for superimposed data transmission during open loop communications in order to avoid interruption in the master clock signals.

In certain embodiments, the frequency of clock signals propagating through the distributed environment is substantially identical, and may be defined by or based on the system clock reference 2412. The phase front of each clock source may differ to some degree from other clock signals propagating in the system. In certain embodiments in which the frequency of each clock signal is substantially identical, Phase Locked Loop (PLL) synchronization is not required for inter-device communications. Rather, synchronization of clock signals may be achieved using a single Flip-Flop circuit as part of each device's External Communications Interface 520 (ECI) input port circuitry. In certain embodiments, external devices that are compliant with the distributed computing system interface may also use the system master clock square wave signal 2415 to connect to the distributed system, or sections or portions thereof. In some embodiments, the frequency of the master primary clock signal and the frequency of the master secondary clock signal are the same. In certain embodiments, the DDCC that receives the master primary clock signal from the clock source remains active during operation of the distributed computing system. The DDCC that receives a master secondary clock signal need not remain active during operation of the distributed computing system.

The DDCC 2420 of the system 2400 accepts the system master clock 2415 as the input clock. Adjacent DDCC in communication with the DDCC 2420, may receive a copy of the system master clock from the DDCC 2420, which may in turn be output to other DDCC that are adjacent to the adjacent DDCC or the DDCC 2420, and so forth In cases where the input clock is not an exact square wave, due for example to distortions during transmission, the input clock may be reshaped to remove or reduce distortions from the square wave and to restore it to substantially match its originally generated form. The output square wave may then be assigned as the internal clock signal for the DDCC and may be used for propagating the internal clock signal as a master primary clock signal or a master secondary clock signal to other DDCC and for synchronization purposes across the DDCC of a PME.

Unlike certain traditional input/output communications pairing, in which input and output lines are dependent on each other, each port signal line connection can operate as independent input and output signal lines. The system clock signal may be routed from the primary distribution device 2420 as a primary clock signal 2421 to specified downstream devices of the system or portion thereof. The distribution of the system clock signal may fan out to downstream devices in a pattern as specified by application specific communication or processing requirements for a particular application or a particular problem being solved or processed by the system. In some cases, the distribution of the system clock signal may resemble a spider web. Root device secondary clock signals 2431 may also be routed to specified downstream devices in a similar manner.

In certain embodiments, a DDCC that propagates its received primary clock signals 2421 and/or secondary clock signals 2431 to one or more downstream devices may be considered a root device of the one or more downstream devices. While, in certain embodiments, the primary distribution device 2420 may be configured to prevent the primary clock signal from being shut off or deactivated, downstream devices may be able to stop propagation of the primary clock signal at various points in the clock path.

In some implementations, the primary distribution device 2420 may output more than one primary clock signals 2421, or a combination of primary clock signals 2421 and secondary clock signals 2431, 2432. Secondary clock signals 2431, 2432 emanating from the primary distribution device 2420 may be root device signals to downstream devices, and may be permitted to be shut off at the primary distribution device 2420. Primary and/or secondary clock signals may also be received from downstream devices, wherein the downstream devices are root devices for yet further downstream devices and may be configured to pass-on clock signals on the clock signal path to the further downstream devices. Such root devices may be further configured to shut off clock signals for the yet further downstream devices.

FIG. 24 shows three connections leaving the primary distribution device 2420. Although three outputs are shown, devices in the system 2400 may comprise any suitable or desirable number of input and/or output connections. The three connection lines may represent three independently-configured output lines and three independently configured input lines. The designation 'P' associated with the line 2421 indicates a primary clock signal line. However, in certain embodiments, each line is configurable to be a primary (P) or secondary (S), clock distribution connection. In certain embodiments, at least one of the connections leading from the primary distribution device 2420 is a primary (P) clock line 2421, wherein the primary or master DDCC 2420 is configured to maintain a clock signal on the primary line 2421 at the output of the primary distribution device 2420. In other words, in certain embodiments, the primary distribution device 2420 is configured to not cease outputting the primary clock signal on the primary line 2421. In some cases, secondary (S) or clock distribution connections 2431, 2432 of a primary distribution device 2420 may be individually configurable to an off state under program control.

Figure 25:
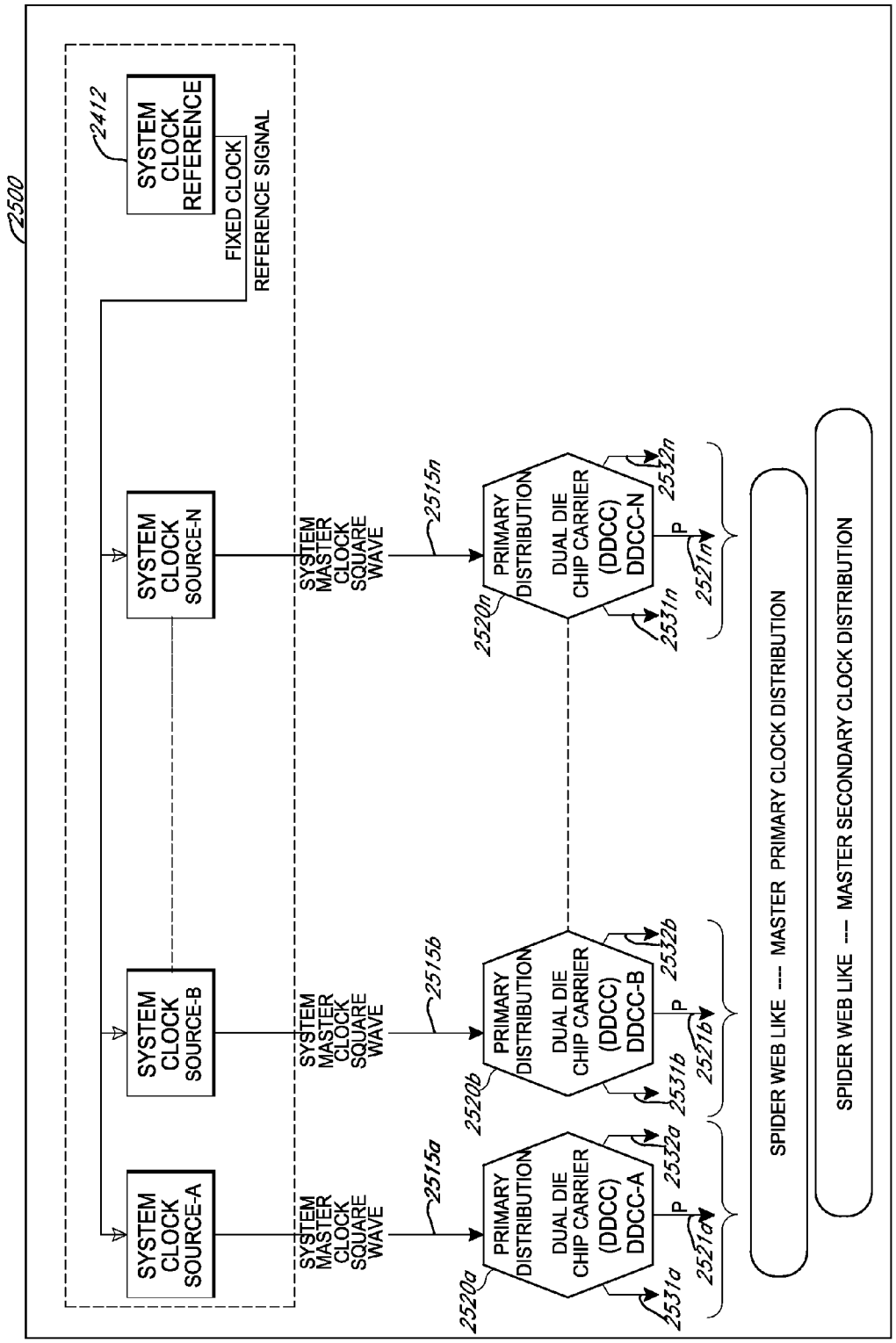
FIG. 25 is a diagram illustrating the use of multiple clock distribution sources for configuration of the clock signal output of multiple DDCCs.

FIG. 25 is a diagram illustrating the use of multiple clock distribution sources for reconfiguration of multiple DDCCs 2520a, 2520b-2520n (herein collectively referred to as DDCC 2520) of a distributed computing system 2500, wherein the device(s) include multiple source clock inputs, which may each produce a master clock square wave 2515a, 2515b-2515n (herein collectively referred to as master clock square wave 2515). As with FIG. 24, the devices 2520 may represent a plurality of interconnected DDCC chip packages, as described herein.

In certain embodiments, communications between interconnected devices 2520 is accomplished at least in part by superimposing data on clock signal lines distributed between devices. In addition to primary clock signal paths 2521a, 2521b-2521n (herein collectively referred to as primary clock signal paths 2521), secondary clock signal paths 2531a, 2531b-2531n (herein collectively referred to as secondary clock signal paths 2531) and secondary clock signal paths 2532a, 2532b-2532n (herein collectively referred to as secondary clock signal paths 2532) may also be used for communication and to pass data between devices.

As previously stated, the system 2500 may include multiple system master clock square waves 2515. These system master clock square waves 2515 may be generated by a corresponding plurality of system clock sources that each use a fixed clock reference signal provided by the system clock reference 2412. In some embodiments, the system master clock square waves 2515 may be substantially similar to or the same as the system master clock square wave 2415 of FIG. 24. The signal quality of the system master clock square waves 2515 may slightly differ due to distortion, phase differences, or otherwise; however, the master clock square waves 2515 share a common frequency. The system configuration of FIG. 25 may serve to accommodate distributed systems over a range of complexity and/or scale. For example, the system clock may be configured to service a single stand-alone computing device, small systems comprising multiple computing devices, large systems comprising hundreds of computing devices, or substantially large systems comprising up to thousands of devices, or tens of thousands or more. For example, a distributed computing system designed for applications to simulate human brain function may comprise thousands of devices, and may therefore require multiple system clock sources for distribution of the clock throughout the system. The system 2500 may include one or more primary distribution devices 2520 positioned and configured to receive the system master clock square wave clock signal 2515.

The system clock signal 2515 may be distributed from the primary distribution devices 2520 to one or more additional DDCC as a primary and/or secondary clock signal. As used herein, primary and secondary clock signals are identical or substantially identical clock signal signals that vary with how that are distributed and controlled within system 2500. Further, a master primary clock signal and a master secondary clock signal as distributed throughout the system 2500 may be a copy of the continuous system clock 2515 input that is passed through the primary distribution device 2520. In certain embodiments, other than being designated as a primary distribution device and receiving the system master clock square wave 2515 from system clock source, the primary distribution devices 2520 may be similar or the same to other DDCC in the system 2500. The system 2500 may be configured such that primary clock outputs from the primary distribution device 2520 may remain active or may not be deactivated during system operation.

A secondary clock signal may be a copy of the continuous system clock input, but unlike a primary clock signal, it may be individually configurable to be activated or deactivated at the primary distribution device. In certain embodiments, multiple secondary clock signals may be spawned from primary or secondary clock signals at various configurable points throughout the system.

In some implementations, It is beneficial for system devices to identify a single input as the devices' master clock input. In certain embodiments, each primary distribution device 2520 is configured to identify the source port on which it receives its first system clock signal 2515 as its master clock input. Each individual downstream device may be configured to identify a source port on which it receives the system clock from a preceding clock-source device as its master clock. In certain embodiments, the master clock is assigned to a primary clock signal. However, the master clock input may be a primary clock or a secondary clock.

The use of multiple clock sources represented by system clock sources A, B-N may provide for improved reliability in certain implementations. For example, in environments in which clock signal dependability is critical or desirable, redundant clock sources may provide added security in case of failure of one or more clock sources. Without multiple clock sources, failure of the single system clock source may result in the entire system shutting down. Therefore, to protect against such failures, multiple system clocks may be made available, as shown in FIG. 25. In certain embodiments, one or more of the system master square wave clock sources provides a square wave signal. In certain embodiments, automatic, or semi-automatic, switching from one system clock source to another is performed by the system 2500 if the initially-selected clock source fails. For example, system hardware and/or software may be designed to accommodate such changeover from one clock source to an alternate backup clock source.

The system 2500 may comprise a distributed network of computing devices 2520, wherein the devices may form separately-clocked sections or groupings of DDCC, which may help guard against the failure of larger sections of the system, or the entire system. For example, each section may utilize one or more primary distribution devices (2520A, 2520B, 2520N) to distribute clock signals, wherein if one section of the system 2500 experiences a clock failure, other independent sections may continue to operate.

While the illustrated system 2500 shows three primary distribution devices 2520A, 2520B, 2520N, the system 2500 may comprise any suitable or desirable number of primary distribution devices. In certain embodiments, at least one of the clock signals output by each primary distribution device 2500 is a master primary clock signal. Further, in some implementations, one or more of the clock signals output by the primary distribution device 2520 is a secondary clock signal. The system 2500 may be configured such that primary clock signals may not be shut off at the primary distribution device level. In certain embodiments, the primary clock output signal(s) are physically routed to a next-in-line, or adjacent, device for distribution to downstream connected computing devices.

Figure 26:
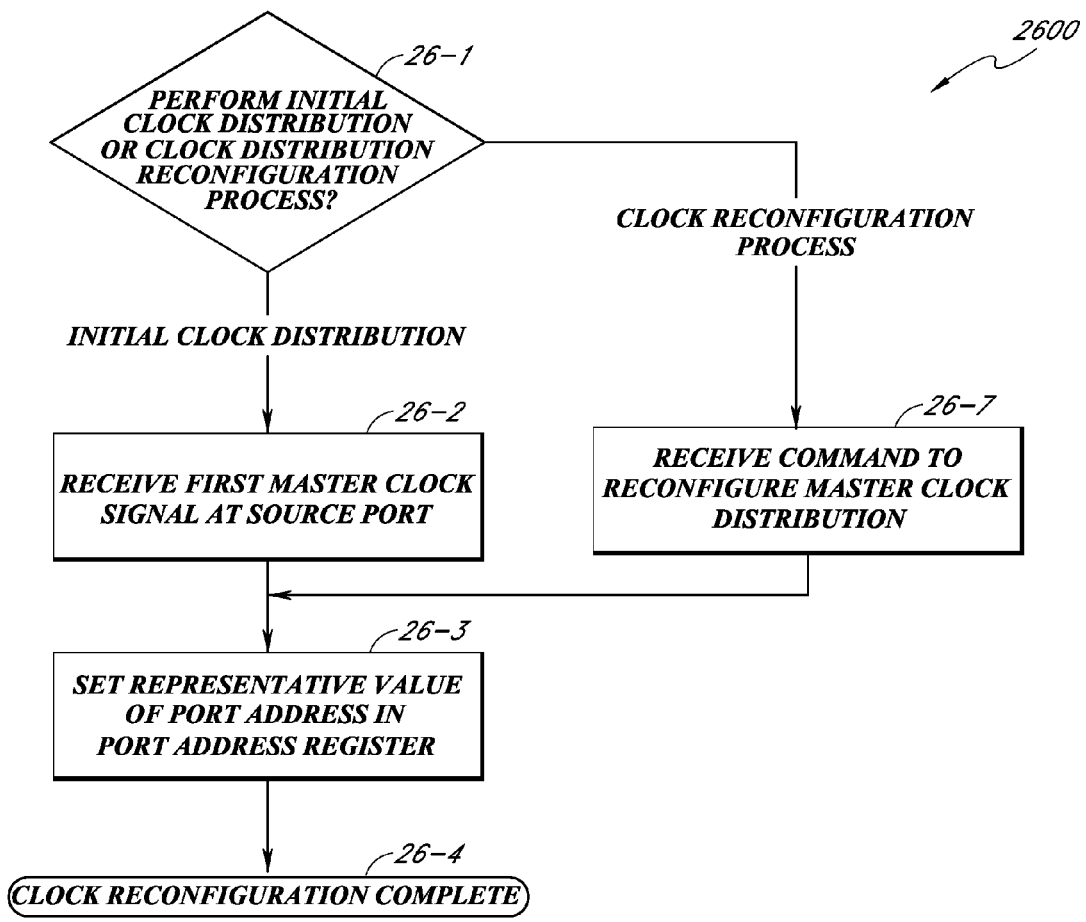
FIG. 26 is a flowchart illustrating an embodiment of a method of clock distribution and clock reconfiguration.

FIG. 26 illustrates one embodiment of a clock distribution and reconfiguration process 2600 for the master clock for each DDCC. The process 2600 may begin with the determination of whether to perform an initial clock distribution sequence or to perform a clock distribution reconfiguration sequence at decision block 26-1. If it is determined that the process is to perform an initial clock distribution sequence, the initial port assignments are defined according to communication and processing requirements of an application configured to use the execution resources of the distributed computing system. The initial port assignments can be tailored to the specific communication and processing requirements of the application. At block 26-2, a DDCC receives and detects a master clock signal at a source port and begins the initial setup of the port address register (PAR) of the DDCC using the port address of the corresponding port that receives the master clock. The representative value of the port address of the initial received port, or the reassigned master clock port in some cases, is set in the PAR at block 26-3. This may complete the initial configuration of the clock distribution at block 26-4. However, in some cases, the clock distribution may be subsequently reconfigured after the clock distribution has been defined. If it is determined at the block 26-1 that a clock distribution reconfiguration sequence is to be performed, a command to reconfigure the master clock distribution may be received at block 26-7. The reconfiguration continues with a shared initial sequence where port address values and PAR modifications change the master clock source port. As illustrated in FIG. 26, after the block 26-7, the process 2600 may include repeating the operations associated with the blocks 26-3 and 26-4 to reconfigure the clock distribution.

Figure 27:
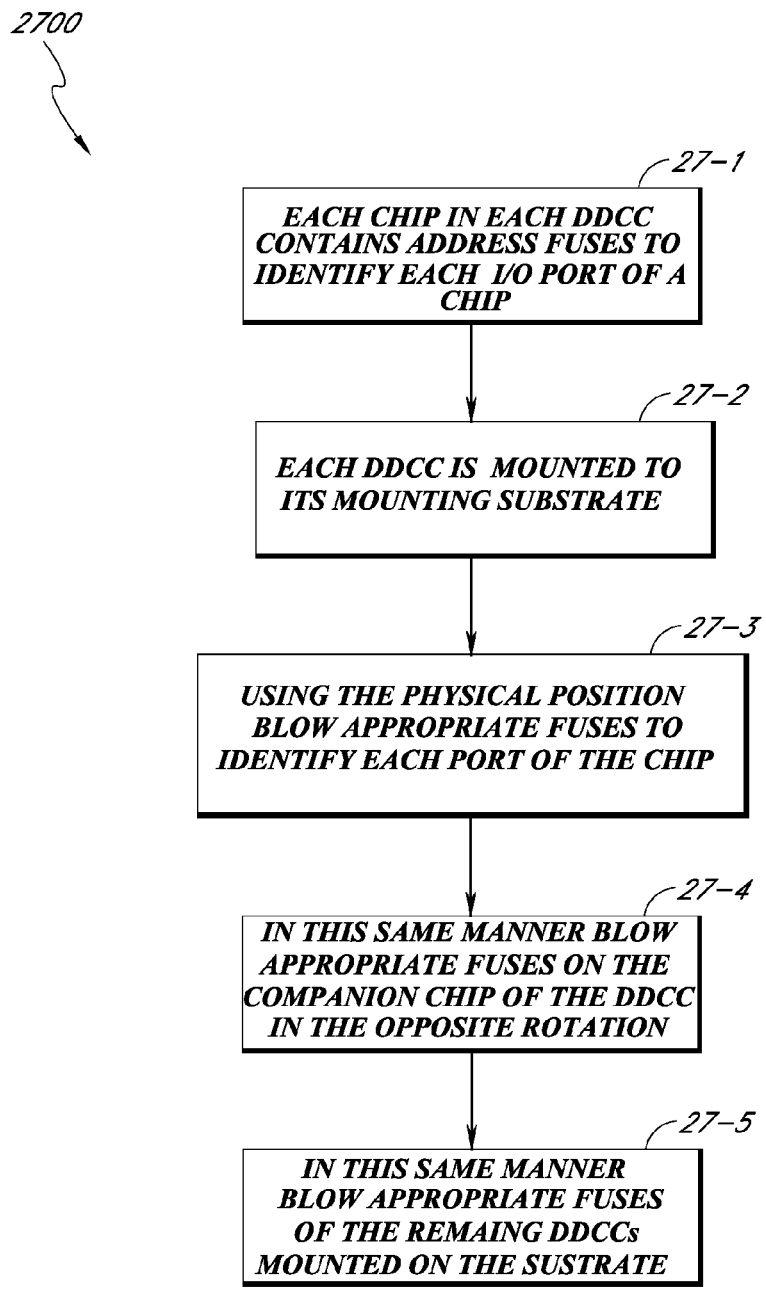
FIG. 27 is a flowchart illustrating an embodiment of a method of defining the port orientation for each DDCC.

FIG. 27 is a flowchart illustrating an embodiment of a method 2700 of defining the port orientation for each die included in a DDCC. The process 2700 may occur during manufacturing and thus, in some cases, may occur only once for each DDCC or PME to define the port numbers of the lower die and the upper die within each DDCC with respect to the DDCC placement and rotation on the substrate of the PME. In some embodiments, each DDCC is oriented such that a particular port (e.g., port 1) is oriented in the same direction on the substrate. Each transmit and receive pair of flying leads of the upper die and the lower die of a DDCC may be referenced by the same port numbers. Thus, in some cases, the port number may correspond to the side of the DDCC.

As indicated by block 27-1, each chip includes address fuses for each side that when blown provide an address value corresponding to each port of a DDCC. It should be understood that, generally, each port of a DDCC may be assigned a unique port number. The port number configuration may be unique to a group of DDCCs, such as within a PME. At block 27-2 each DDCC is mounted to a mounting substrate of a PME. The mounting substrate layout defines the unique port address of each side of the upper and lower DDCC die of a DDCC after it is assembled to the substrate. The unique port address is one time programmed for each die of the DDCC after it's been mounted to the substrate. This eliminates the need to keep track of ports due to the rotation of each die of the DDCC prior to assembly to the substrate. Using the physical position of each DDCC on the mounting substrate and the rotational orientation of each DDCC, appropriate address fuses are blown to permanently define the port numbering for a die on each side of the DDCC at block 27-1. The fuses and ports may be selected based on the sides of the DDCC that face an adjacent DDCC. Similarly, at block 27-3, address fuses for the companion die, or the second die, of the DDCC are blown to define the port number for each side of the DDCC. To make the numbering of the sides consistent for the initial die and the companion die, the companion die is numbered in the opposite rotational direction at block 27-4. As indicated at block 27-5, the process 2700 may be repeated for additional DDCCs mounted on the substrate of the PME.

Figure 28:
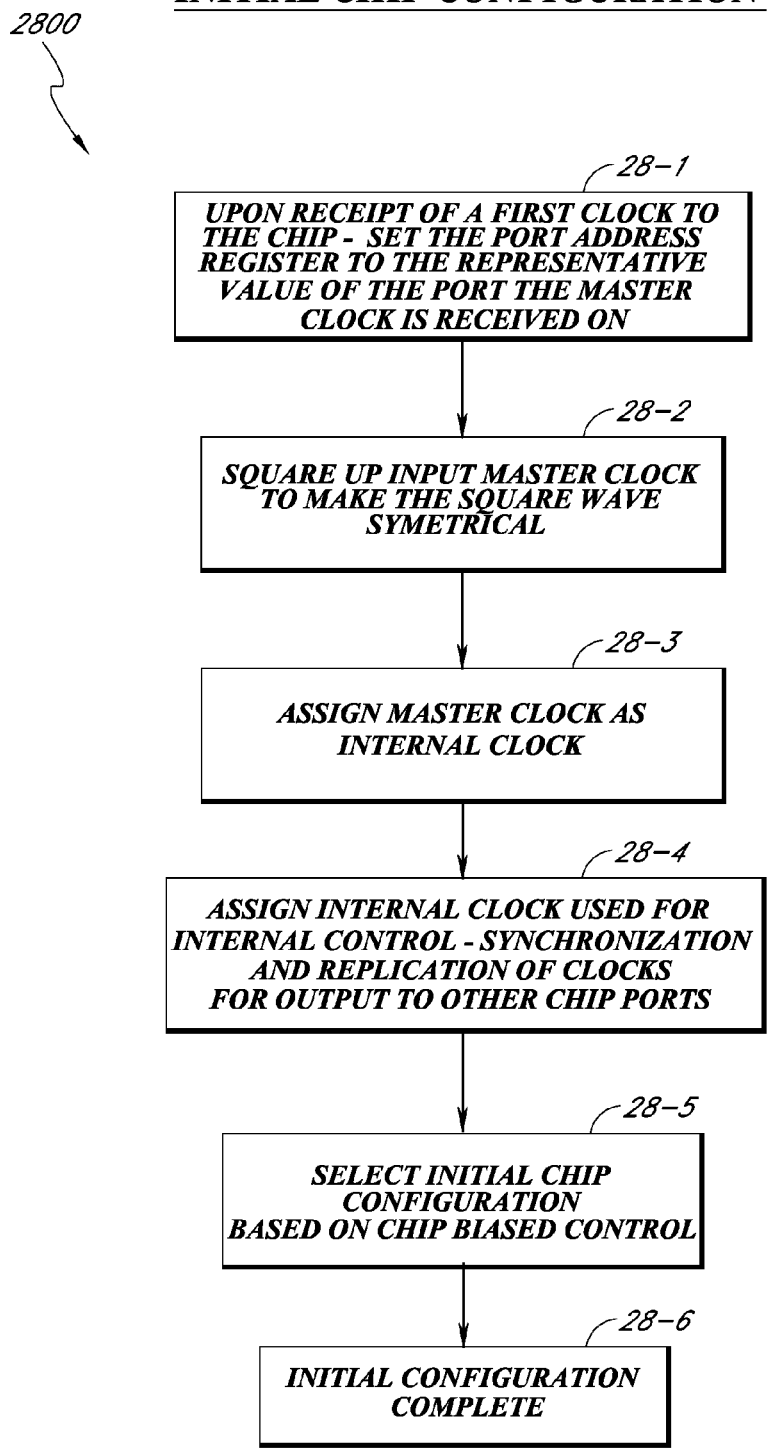
FIG. 28 is a flowchart illustrating an embodiment of an initial DDCC die configuration process.

FIG. 28 is a flowchart illustrating an embodiment of an initial DDCC die configuration process 2800. While the process 2700 may be performed once during manufacture, the process 2800 may be repeated as necessary. For example, the process 2800 may occur each time a PME is turned on, activated, or otherwise powered on. The distribution of master clock signals may use the physical port identification definitions for assigning values to the port address register of each die within each DDCC that receives the first clock signal.

The configuration begins at block 28-1 where the receipt of a first clock to a die of the DDCC sets the Port Address Register (PAR) to a representative value of the port that receives master clock signal. At block 28-2, the master clock signal is reshaped such that the square wave is symmetrical. Typically, with a symmetrical square wave, the signal is set to a low voltage or logic value for the same amount of time that the signal is set to a high voltage or logic value.—The master clock signal is assigned to the internal clock of the chip at block 28-3. Thus, the master clock signal may serve as the internal clock signal for a die of the DDCC and may provide clocking for the internal components of the die including, for example, the CCP and the internal function unit F(X). Once the internal clock has been assigned, it is used for internal control synchronization and for replication of clock signals for output on one or more ports of the die at block 28-4. Subsequent to configuring the internal clock, combinatorial logic on the die that is configured to handle the external and internal I/O interface is initialized. The combinatorial logic is configured to initialize the electrical components of the external interface and the internal interface of each die. The initialization of the combinatorial logic may be based on a hardware biased chip control at block 28-5. The initial configuration process 2800 completes at block 28-6.

FIGS. 29A-F illustrate embodiments of clock signal distribution configurations in a distributed computing system. For ease of illustration, the clock signal distributions are illustrated as being between DDCCs in FIGS. 29A-F. However, the present disclosure is not limited as such, and it should be understood that the clock signal distributions may be on a die-by-die or chip-by-chip basis. In other words, in some cases, the clock distribution between lower die may differ from the clock distribution between upper die in the network of DDCCs. Further, it is possible for a first clock distribution pattern to be made up of some upper die and some lower die in a set of DDCCs and for a second clock distribution pattern to be made up of some upper die and some lower die that were not included in the first clock distribution pattern. In some cases, clock distribution may occur vertically within a DDCC. Thus, in one example, a clock signal may be passed from an upper die of a first DDCC to a lower die of a second DDCC, which may pass the clock signal to an upper die of the second DDCC, which may then pass the clock signal to an upper die of a third DDCC, and so forth.

The example configurations of FIGS. 29A-F provide alternate configurations and possible reconfiguration examples for the distribution of master primary and/or master secondary clock signals in a distributed computing environment. In the diagrams of FIGS. 29A-F, the two types of clock connections (primary and secondary) are represented by lines of different widths. The lines with the thicker widths represent the primary master clock distribution paths and the lines with the thinner widths represent the secondary master clock distribution paths. The circles represent primary clock connections, which are also identified with the letter (P). The squares or rectangles represent secondary clock connections, which are also identified with the letter (S).

Each of FIGS. 29A-F show a network of hexagonal chip packages arranged in an example physical arrangement, such as within one or more PMEs. While shown as three rows of DDCC packages alternating between four and three hexagonal DDCCs in length, the present disclosure is not limited to such a configuration and may be applicable to other device arrangements and/or devices of other shapes or sizes. Furthermore, it should be understood that the illustrated arrangements are not necessarily drawn to scale.

FIG. 29A serves as a legend for reference and convenience in describing the distributions and configurations shown in the FIGS. 29B-29F. The layout illustrated in FIG. 29A depicts eleven DDCC, with each DDCC assigned a letter code to describe the position of the DDCC within the layout In FIG. 29A, the DDCC are identified with one of the labels 'A' through 'L' with the letter 'H' being omitted and with the individual hexagons represent individual DDCC packages.

FIGS. 29B-F illustrates possible master primary clock and master secondary clock signal routings. FIG. 29B shows a master primary clock signal being provided as an input to DDCC-A. In certain embodiments, the signal may be received from a parent or root DDCC As illustrated in FIG. 29B, copies of the master primary clock signal may be propagated to one or more DDCCs in electrical communication with the DDCC-A, such as DDCC-E, DDCC-B, DDCC-F, DDCC-C, DDCC-G, and DDCC-D. Further, the master primary clock signal may be propagated to another cluster or group of DDCC, which may be located in a separate PME (illustrated in FIG. 29C) that is in electrical communication with a PME that includes the DDCCs of FIG. 29B.

Moreover, a master secondary clock signal may be provided as an input to DDCC-I in FIG. 29B and copies of the master secondary clock signal may be propagated to one or more DDCCs in electrical communication with the DDCC-I, such as DDCC-J, DDCC-K, and DDCC-L. Further, the master secondary clock signal may be propagated to another cluster or group of DDCC, which may be located in a separate PME (illustrated in FIG. 29C) that is in electrical communication with a PME that includes the DDCCs of FIG. 29B. In certain embodiments, DDCC-A of FIG. 29B can deactivate or cease the distribution of the master primary clock signal to each of the DDCCs of FIG. 29B. Further, the DDCC-A of FIG. 29B may deactivate or cease the distribution of the master primary clock signal to DDCCs in other PMEs in electrical communication with a PME of FIG. 29B and which receives the master primary clock signal directly or indirectly from the DDCC-A of FIG. 29B. Thus, in some implementations, one DDCC (e.g., DDCC-A) can control a clock signal of downstream DDCCs in electrical communication with the one DDCC. In some cases, the DDCC-A can deactivate or cease provided the master primary clock signal from one DDCC, such as DDCC-E, while continuing to the provide the clock signal to other DDCCs, such as DDCC-B.

Generally, the master primary clocks and the master secondary clocks are identical and a DDCC cannot identify or distinguish a master primary clock signal from a master secondary clock signal. However, in certain embodiments, software or firmware executed by the DDCC may define the distribution of the master primary clock signal and/or the master secondary clock signal. The number of master secondary clocks that may be used in the system may, in some implementations, depend on the software or firmware tracking the clock signals.

The layout of the DDCCs of FIG. 29C may be the same as in FIG. 29B, and accordingly the same identification is used for the DDCCs of FIG. 29C. However, in FIG. 29C, the master primary clock signal may be received from the DDCCs of FIG. 29B, which may be located in a different PME than the DDCCs of FIG. 29C. Further, the master primary clock signal may be received at the DDCC-E of FIG. 29C and a copy of the master primary clock signal may be propagated to DDCC-F, DDCC-K, DDCC-G and DDCC-L. In addition, a copy of the master primary clock signal may be propagated to DDCC-A, DDCC-B, DDCC-C and DDCC-D of FIG. 29C. Moreover, a copy of the master secondary clock signal may be received from the DDCC-L of FIG. 29B and propagated to the DDCCs-I and J of FIG. 29C. Further, as described above with respect to FIG. 29B, a DDCC of FIG. 29C may deactivate or cease providing the copy of the clock signal to an adjacent or downstream DDCC.

In some embodiments, the master secondary clock signal may be received before the master primary clock signal. This may occur, for example, because the master secondary clock signal may, in some cases, be provided to less intermediary DDCCs than the master primary clock signal. In cases where the master secondary clock signal is received by a DDCC prior to the master primary clock signal, the DDCC may use the master secondary clock signal as the internal clock signal of the die within the DDCC. In other embodiments, the master primary clock signal may be used as the internal clock signal of a die within the DDCC regardless of which clock signal is received first.

FIGS. 29D and E illustrate another embodiment of a distribution of clock signals among DDCC of a pair of DDCC groupings. In FIG. 29D, a master primary clock signal is received at the DDCC-A and a copy is propagated to DDCC-B, DDCC-C and DDCC-D, which propagates a copy of the signal to the cluster of DDCCs of FIG. 29E. A master secondary clock signal may be provided to DDCC-I of FIG. 29D, which may propagate a copy of the signal to DDCC-E, DDCC-F, DDCC-G, DDCC-J, DDCC-K, and DDCC-L.

As illustrated in FIG. 29E, a master primary clock signal may be received from the DDCC-D of FIG. 29D at DDCC-A of FIG. 29E, which may provide one copy of the signal to DDCC-E and one copy to DDCC-B of FIG. 29E. Further, DDCC-B of FIG. 29E may provide a copy of the master primary clock signal to DDCC-F and a copy to DDCC-C. Likewise, DDCC-C of FIG. 29F may provide a copy of the signal DDCC-D and to DDCC-G, which may then propagate a copy of the master primary clock signal to DDCC-K of FIG. 29E. DDCC-K may provide a copy of the master primary clock signal to DDCC-L. Although described as a copy of the signal, in some cases, the master primary clock signal that is distributed to the one or more DDCCs is the initially generated or received signal rather than a copy of the signal. In other embodiments, a DDCC may spawn or generate copies of the signal from the internal clock signal, which is based on the received master primary clock signal.

In some embodiments, a DDCC may generate a master secondary clock based on a master primary clock. For example, as illustrated in FIG. 29E, the DDCC-K may generate a master secondary clock, which it may then propagate to the DDCC-J and the DDCC-I. In other embodiments (not shown), a DDCC other than the first DDCC may generate a master primary clock signal based on a master secondary clock. The determination to generate either the master primary clock or master secondary clock can be based on criteria specified in the software and/or firmware controlling the generation of the clock.

FIG. 29F illustrates another embodiment of a distribution of clock signals among a group of DDCC, which may be within a PME or a cluster of DDCCs. In the embodiment of FIG. 29F, a master primary clock signal is received from a clock generator or from another DDCC of another grouping of DDCCs or from another PME at the DDCC-A. DDCC-A may provide the master primary clock signal, or a copy thereof, to DDCC-B. Further, the DDCC-A may generate a master secondary clock signal based on the master primary clock signal and provide the generated master secondary clock signal to the DDCC-E. Secondary clock signals may be generated from primary clock signals. At any point after the initial system clock distribution from the first DDCC die in FIG. 24 and FIG. 25 both the primary and secondary clock signals may deactivate and cause all die in the downstream path to deactivate. In some embodiments, separate clock signal paths are used to distribute clock signals to the lower die and the upper die within a DDCC. Similarly, DDCC-B may provide a copy of the master primary clock signal to DDCC-C and generate a master secondary clock signal based on the master primary clock signal, which the DDCC-B may provide to the DDCC-F. DDCC-F may distribute or propagate the master secondary clock signal to DDCC-K. DDCC-C may provide a copy of the master primary clock signal to DDCC-D and to DDCC-G, which propagates the clock signal to DDCC-L. DDCC-L may propagate the master primary clock signal to DDCC-J and DDCC-I. As illustrated in FIG. 29F, the master primary clock signal may be propagated to DDCC-J without being provided to the DDCC-K. In certain embodiments, the master primary clock signal is provided to the DDCC-K for propagation to the DDCC-J, but is not used by the DDCC-K. In other words, the DDCC-K may serve as a pass-through DDCC for the master primary clock signal. In some implementations, the master primary clock signal may be used to configure one or more ports of the DDCC-K regardless of whether the master primary clock signal is used as an internal clock signal for the DDCC_K.

In certain embodiments, the master secondary clock signal arrives at the DDCC-K prior to the master primary clock signal. In some such embodiments, the DDCC-K may configure the port address register based on the master secondary clock signal. However, if the master secondary clock signal is not the first to arrive at DDCC-K, when the configuration should be using the master secondary clock signal then the port address register is set to the port receiving the master secondary clock signal. The port address register may be changed by external command over any clock signal into the DDCC or by changing the port address register by the DDCC itself if the DDCC has software resident that can change the port address register In some embodiments, any first master primary clock signal or first master secondary clock signal received at a die of a DDCC (other than the first DDCC die) is assigned as the master clock signal and sets the PAR to a value that represents the port the clock is received on (1 to 6). The clock received is set as the internal clock and is made symmetrical for all internal use and distribution of the DDCC die. After the internal clock is set, the master clock PAR value may be commanded to be changed to a new master clock port. If the first clock signal that arrives is the primary clock and is assigned to the DDCC die, but it is desired that the secondary clock signal is used to set the internal clock, then a command can received by the primary clock signal (e.g., from another DDCC) to change the port assignment to the secondary clock signal by changing the PAR.

The ports of a DDCC die (e.g., where each port corresponds to a flying lead) can be numbered from 1 through 6 for purposes of the port address register. The values of 0 and 7 can have other meanings for the port address register. The internal serial connections between the lower die and the upper die are numbered from 9 through 14 with respect to each die. In certain example embodiments described herein, ports 8 and 15 are unused.

Figure 30:
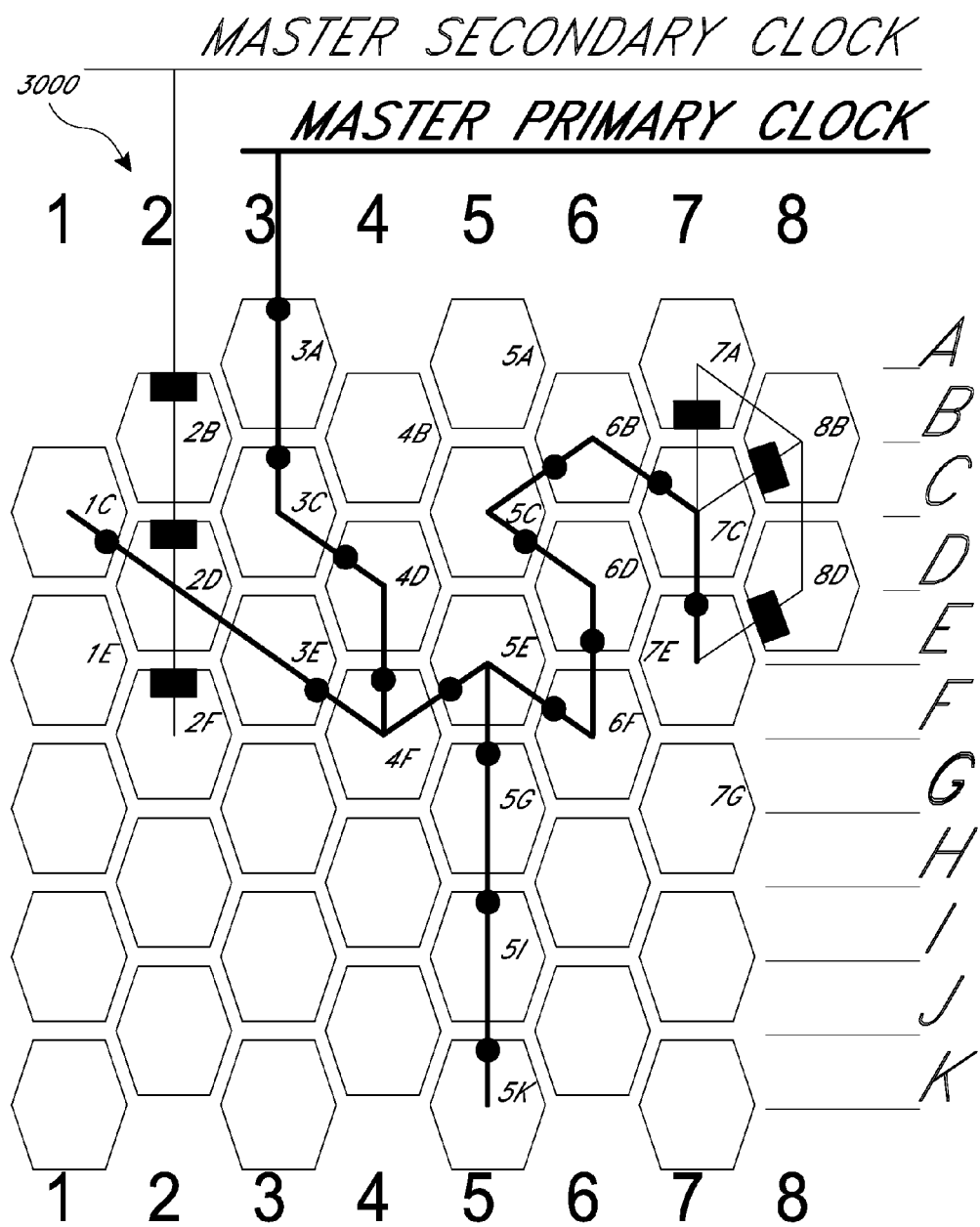
FIG. 30 illustrates another example diagram of master primary clock and master secondary clock signal distribution and reconfiguration.

FIG. 30 illustrates another example diagram of master primary clock and master secondary clock signal distribution and reconfiguration within a cluster 3000 of DDCCs. The cluster 3000 of DDCCs may be within one PME or within a plurality of PMEs. In some embodiments, the cluster or PME may include additional DDCC that are not illustrated in FIG. 30.

In the illustrated embodiment of FIG. 30, a master primary clock signal is received at the DDCC 3A. The signal may be received from another DDCC within another cluster or PME, or may be received from a clock signal generator. Receipt of the master primary clock signal may cause automatic storing of the port address of the port receiving the clock into the "clock port address register" of the DDCC 3A. Similar to the DDCC 3A, other DDCC that receive the master primary clock signal directly or indirectly from the DDCC 3A may store the port address of the port that receives the signal for each respective DDCC. Thus, for example, if the port at the top of each DDCC in FIG. 30 is associated with a port address 1, with each successive port in a clockwise manner having a port address incremented by 1, then the DDCC 3A would store port address 1 as the port that receives the master primary clock signal. Similarly, DDCC 3C would also store port address 1 while DDCC 4D would store port address 6 and DDCC 3E would store port address 3.

At DDCC 4F a dual tributary is spawned to both DDCCs 3E and 5E to enable further spidering of the master primary clock signal. In other words, the DDCC 4F may propagate the master primary clock signal, or a copy thereof, to DDCC 3E and to DDCC 5E. DDCC 3E would then store the identity of port 3 and DDCC 5E would store the identity of port 5 as the respective ports that received the master primary clock signal.

In some embodiments, a master secondary clock signal may be received at the DDCC 2B. This master secondary clock signal may be received from a DDCC of another cluster or PME, or may be received from a clock generator. As illustrated in FIG. 30, the master secondary clock signal may be propagated to other DDCC, such as DDCC 2D and DDCC 2F. In some embodiments, the master secondary clock signal may be generated by a DDCC. In some implementations, the cluster 3000 may include multiple master secondary clock signals. Thus, for example, the DDCC 7C may generate a master secondary clock signal, which may be propagated to DDCC 7A and DDCC 8B. Further, one or more of the DDCC 8B or 7E may propagate a copy of the master secondary clock signal to the DDCC 8D.

In certain embodiments, the clock signal used internally by a DDCC may depend on which clock signal is first received by the DDCC. Generally, the first clock signal received on a port causes the receiving port to be set in the PAR as the port that receives the clock signal for the die. Further, this received clock signal is used as the internal clock for the die in the DDCC. In the illustrated embodiment of FIG. 30, the master secondary clock signal is received at the DDCC 2D from the DDCC 2B prior to receipt of the master primary clock signal is received at the DDCC 2D from the DDCC 3E. Thus, the DDCC 2D uses the master secondary clock signal as its internal clock as indicated by the use of the rectangle marker on the port 1 of the DDCC 2D. However, if the master primary clock signal were received at port 3 prior to the master secondary clock signal, the master primary clock signal may be used by the DDCC 2D for its local internal clock signal. In such a case, the port address register may store the identity of port 3 instead of port 1. In certain embodiments, the DDCC 2D may be configured to use a particular clock signal for its internal clock signal regardless of which clock signal is received first.

Typically, the master primary clock signal and the master secondary clock signal have identical or similar waveforms and differ only in name and how the signals are controlled. In the embodiments described herein, the master primary clock and master secondary clock waveforms are identical because the master secondary clock signal is a copy of the master primary clock signal. In certain embodiments, there may be a slight phase difference between the master primary clock and the master secondary clock while traversing through multiple DDCC die.

In some embodiments, the computing system is made up of different types of DDCCs. For example, the system can be made of two different sections. A first section of the system operates at a first higher frequency, and a second section operates at a second lower frequency. The lower frequency clock DDCC and the higher frequency clock DDCC can communicate in the same manner as the slower speed communications as described above as a client device. In such embodiments, the higher frequency clock is sufficiently faster than the lower frequency clock as to be able to operate in the same manner as a client device. A sufficiently lower frequency clock can be, for example, less than half the frequency of the higher frequency.

In certain implementations, upon activation from a powered off state to a powered on state, a clock port address register for a DDCC die may be configured with a null address. In some such cases, the first clock signal that is received at a port of the DDCC die causes the address of the port that receives the clock signal to be entered in the clock port address register. Moreover, the first received clock signal may be used as an internal clock signal for the DDCC die. In some embodiments, a die does not wait for a particular clock before assigning the port. Instead, the DDCC die sets an internal clock and updates the port address register when the first master clock signal is received on any port.

The propagation of the master primary clock signal and master secondary clock signal is typically from DDCC to DDCC. Further, typically, any DDCC in a string or set of DDCCs may cease the propagation of the master primary clock signal to subsequent DDCCs in the string or set of DDCCs. In some cases, any DDCC in the string or set of DDCCs may cease generation or propagation of a master secondary clock signal generated from a master primary clock signal.

In some embodiments, the master secondary clock signal may be selectively deactivated or activated by a single broadcast command. When deactivated, the master secondary clock signal may retain a current address in a saved register of the clock port address register if it is determined that the port receiving the master secondary clock signal may be reactivated or may receive a clock signal at a subsequent time. On the other hand, if it is determined that the master secondary clock signal will not be reactivated or received at a later time, a null address may be stored at the clock port address register. In some cases, when a null address is recorded in the clock port address register, the next clock signal received by the DDCC is treated as a first clock signal, and the identity of the port that receives the clock signal is stored at the clock port address register. When deactivating one or more DDCC die with a broadcast command, the current master secondary clock signal may be deactivated. When this happens, the current PAR value is stored so that, if the master secondary clock is reactivated by a broadcast, the saved PAR value is restored.

The circles in the hexagonal shaped DDCCs of FIG. 30 identify ports where a master primary clock signal is received and the rectangles identify ports where a master secondary clock signal is received. As described above, generally a DDCC can cease propagating a master primary signal to subsequent DDCCs in a chain of DDCCs. In such cases, a DDCC that previously received a clock signal may cease receiving the clock signal. However, during operation, the DDCC 3A will typically continue to receive the master primary clock signal from the external source, such as a clock generator. The DDCC 3A will typically automatically update its PAR with the identity of the port receiving the master primary clock signal. However, in some cases, a received command may change the port that receives the clock signal or may set the port register to a default or null address.

In some embodiments, a mounting substrate layout defines the unique port address of each side of the upper and lower die of a DDCC after the DDCC is assembled to the substrate. The one time programming of the unique port address of each side of each DDCC upper die and lower die, for example, may be programmed with sequential port addresses 1 through 6. In certain embodiments, each flying lead transmit and receive pair of a side of a DDCC die may be referenced based on the port address corresponding to the side of the DDCC die. Further, internal connections between the lower die and the upper die may be referenced with respect to the other die with sequential port addresses 9 through 14 that correspond to sides 1 through 6. Table A provides example Port Address Register (PAR) values of a DDCC die:

TABLE A

| Port address | Die | Port address value | Interpretation |
| --- | --- | --- | --- |
| 0 | 0 | 000 | Current die first clock has not yet been received |
| 1 | 0 | 001 | Current die PORT 1 |
| 2 | 0 | 010 | Current die PORT 2 |
| 3 | 0 | 011 | Current die PORT 3 |
| 4 | 0 | 100 | Current die PORT 4 |
| 5 | 0 | 101 | Current die PORT 5 |
| 6 | 0 | 110 | Current die PORT 6 |
| 7 | 0 | 111 | Last clock has been lost |
| 8 | 1 | 000 | N/A |
| 9 | 1 | 001 | Other die PORT 1 |
| 10 | 1 | 010 | Other die PORT 2 |
| 11 | 1 | 011 | Other die PORT 3 |
| 12 | 1 | 100 | Other die PORT 4 |
| 13 | 1 | 101 | Other die PORT 5 |
| 14 | 1 | 110 | Other die PORT 6 |
| 15 | 1 | 111 | N/A |

The internal port connections of the DDCC enable the master primary clock signal or the master secondary clock signal to be distributed vertically between the lower die and the upper die within a DDCC, or vice versa. In some embodiments, using the ports between the upper and lower die for clock distribution management enables the flying lead ports of a die within the DDCC to be configured to transfer data without reserving a flying lead port to be used for the master primary clock signal or the master secondary clock signal. Moreover, the use of the internal ports to transfer clock and/or data between dies in a DDCC enable interconnection configurations between dies and between DDCCs that support the processing and transfer of data in a three dimensional (3D) topology. Advantageously, in certain embodiments, the ability to process data in a 3D topology enables calculations to be performed that take place in a 3D environment without converting the environment to a 2D simulation or abstraction. Thus, more complex calculations can be performed more efficiently compared to systems limited with a 2D topology.

Example Error Checking Process

Figure 31:
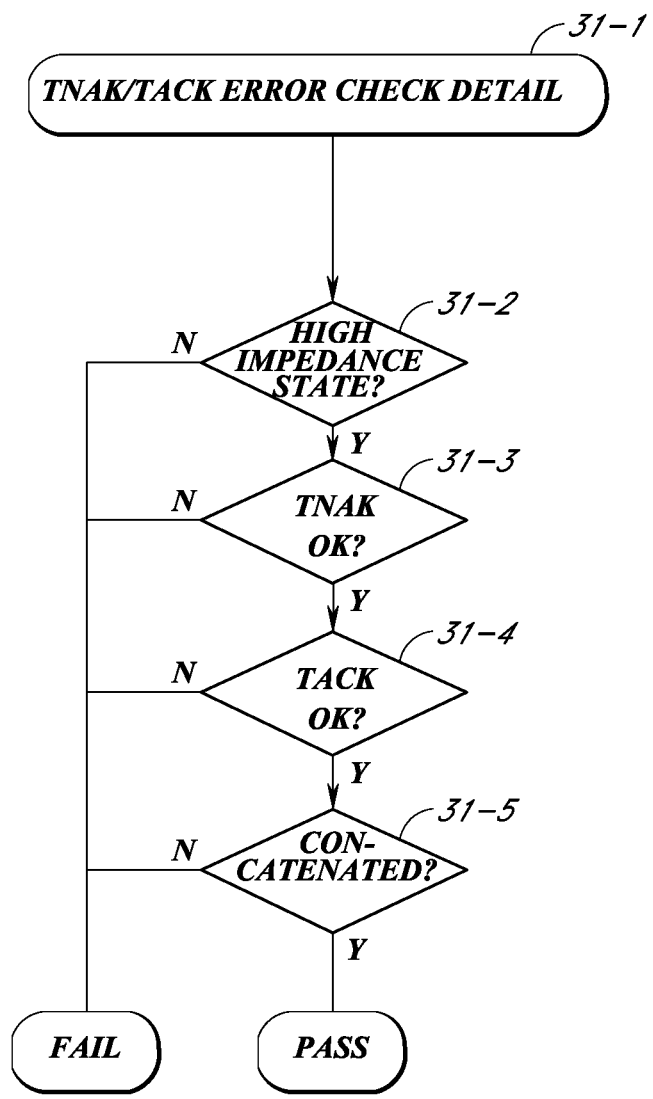
FIG. 31 is a flow chart illustrating the error check operation details of a TNAK/TACK sequence.

FIG. 31 is a flow chart illustrating the operation details of a TNAK/TACK error checking process 31-1 for the TNAK/TACK handshake response. Each of the decision blocks of the process 31-1 performs a check of the sequence of operations of the TNAK/TACK handshake response. If each operation within the process is completed successfully, then the entire TNAK/TACK error checking process is considered to be successfully completed. If any of the operations fail, then the TNAK/TACK handshake response sequence is considered to have failed. In certain embodiments, the occurrence of a failure in the TNAK/TACK sequence may trigger additional processes to locate the point of failure and to compensate for the failure. The additional processes may relate to performing more comprehensive tests to determine what triggered the TNAK/TACK failure. This testing may include testing both the DDCC receiving die and the DDCC sending die with the coordination s of both DDCC dies to test port connections for a high impedance state, a transmit state, and a receive state. In addition, a DDCC die port connection may be set to a loopback state to test both the transmit and receive portions of a port with data provided by the DDCC die itself. In some embodiments, compensating for the failure may include deactivating a particular DDCC and utilizing another DDCC, or routing around a particular DDCC. The error check detail testing can match the order of operations for the complete TNAK/TACK sequence. If any check fails, the TNAK/TACK sequence fails.

At the decision block 31-2, the sending device determines via, for example, combinatorial logic included in the ECI 520 of the sending device, whether the send line for a sending DDCC that is sending a request remains in a high impedance state for at least a particular number of time periods. For example, it is determined whether the send line remains in the high impedance state for at least three time periods. This high impedance state may be caused by the sending of an EOB or EOT signal. Similarly, the receiving device may determine via, for example, combinatorial logic included in the ECI 520 of the receiving device, whether the receive line for a receiving DDCC that is receiving the request remains in the high impedance state for at least the particular number of time periods.

At the decision block 31-3, it is determined whether a TNAK signal is received on the high impedance send line from the recipient DDCC within a first particular time period. Typically, the first particular time period for receiving the TNAK signal is less than the time period, or number of time periods, in which the send line of the sending DDCC is in the high impedance state. In certain embodiments, the first particular time period for receiving the TNAK signal is a fraction of a time period (e.g., 0.75 time period), or includes a fraction of a time period (e.g., 1.5 time periods).

At the decision block 31-4, it is determined whether a TACK signal is received within a second time particular time period. Typically, the second particular time period for receiving the TACK signal is less than the time period, or number of time periods, in which the send line of the sending DDCC is in the high impedance state. In certain embodiments, the second particular time period for receiving the TACK signal is a fraction of a time period (e.g., 0.25 time period), or includes a fraction of a time period (e.g., 1.5 time periods). In some embodiments, the first particular time period and the second particular time period are selected such that the summation of the two time periods does not include a fraction of a time period, but includes an integer number of time periods, such as 3 time periods. Moreover, in certain embodiments, the summation of the first particular time period and the second particular time period is less than the number of time periods that the send line is in a high-impedance state. For example, if the send line of a DDCC that transmits a request is in a high-impedance state for four clock periods after sending an EOB, the summation of the first particular time period and the second particular time period may be three clock periods.

At the decision block 31-5, it is determined whether the TACK signal is concatenated to the TNAK signal. In certain embodiments, the block 31-5 includes determining whether the concatenated TNAK and TACK signal are transmitted as one signal sequence that includes the TNAK and TACK signal. The receipt of the TNAK signal indicates that a response to a request is occurring and the receipt of the TACK signal indicates that the transfer of the request was received by the recipient without error.

As stated above, if a result of one or more of the decision blocks is no, the error check process fails. In other words, an error may be identified in the communication process between two or more DDCC. If the result of each of the decision blocks of the process 31-1 is yes, it is determined that communication of a request between DDCC was successful.

Clock Signal Frequency Adaption

In certain embodiments, normal clock operation of individual input port data/clock signals between distributed computing devices uses the device's internal clock signal. However, when communicating with a device, such as an external device, operating at a lower clock frequency than the internal clock signal, it may be necessary to reconcile the different clock signals in order to effect communication between the devices. In some embodiments, for a device to communicate with a DDCC die that is at a different frequency, the device may be required to be compatible with the communications system of the DDCC. Further, in some cases where the external device operates at a different clock frequency than the DDCC, the device should be capable of providing its clock signal to the DDCC thereby enabling the DDCC to modify its clock frequency to match that of the external device. Advantageously, the ability of a DDCC to alter its clock frequency enables the DDCC to operate with various external devices that are designed with a different clock frequency. Further, in some embodiments, the DDCC continues to operate with its clock frequency, but uses the clock frequency of the external device to receive data from or send data to the external device. Once the data is received, it may be processed within the DDCC with the DDCC utilizing its internal clock frequency, which may be faster than the clock frequency of the external device.

Figure 32:
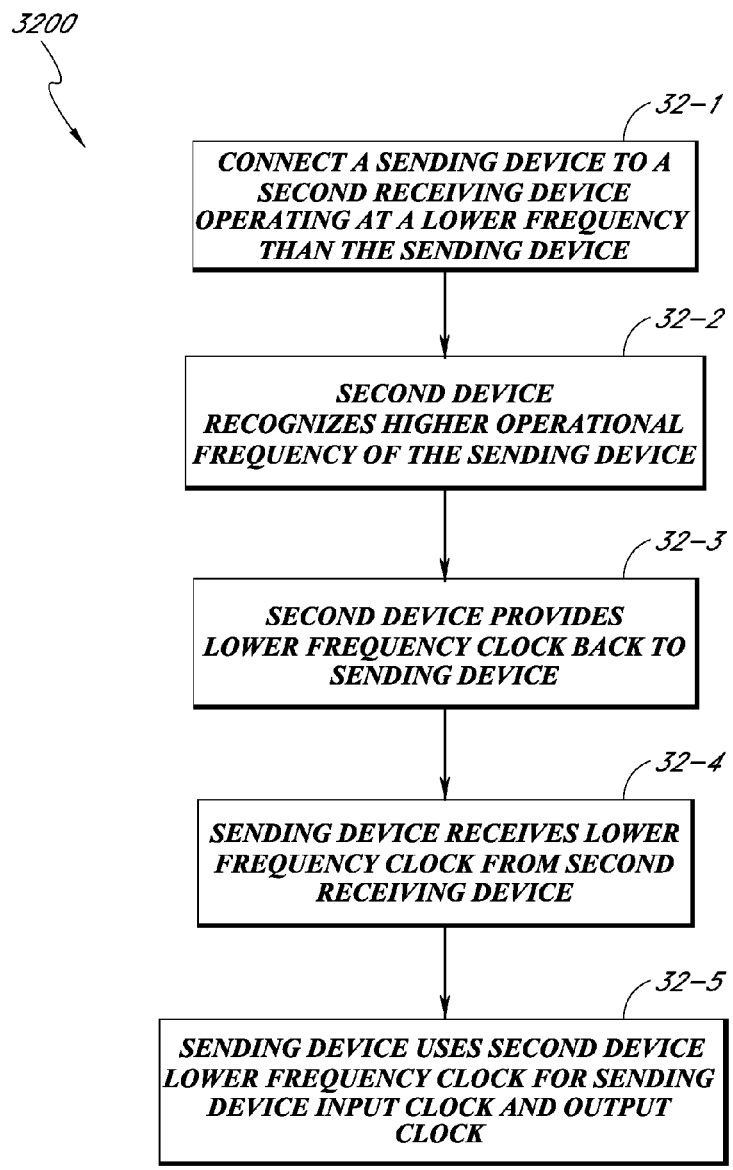
FIG. 32 is a flow chart illustrating the adaptation sequence of communication between devices operating at different frequencies.

FIG. 32 is a flow chart illustrating a process 3200 for the adaptation sequence of communication between devices operating at different frequencies. The process 3200 begins at block 32-1 where a sending device (e.g., a sending DDCC) is connected to a receiving device (e.g., a receiving DDCC) that is operating at a lower clock frequency than the sending device. The receiving device determines that the sending device is operating at a higher clock frequency at block 32-2. In response to the determination that the sending device is operating at a higher clock frequency, the receiving device provides the lower frequency clock signal to the sending device at block 32-3. The sending device receives the lower frequency clock signal from the receiving device at block 32-4. In response to receiving the lower frequency clock signal, the sending device uses the received lower frequency clock signal as its input and output clock signal when communicating with the receiving device at block 32-5. This input and output clock signal is used for transferring data to and from the external device, which may operate at a different frequency from the DDCC. However, the DDCC may internally continue to operate at its internal clock frequency, which may be based on the master primary clock signal or master secondary clock signal. Thus, in some cases, the input of the DDCC may operate as a shift register with the external device providing data to the shift register. Once received, the DDCC may process the data at is clock rate. A similar process may occur for outputting date to the external device.

Figure 33A:
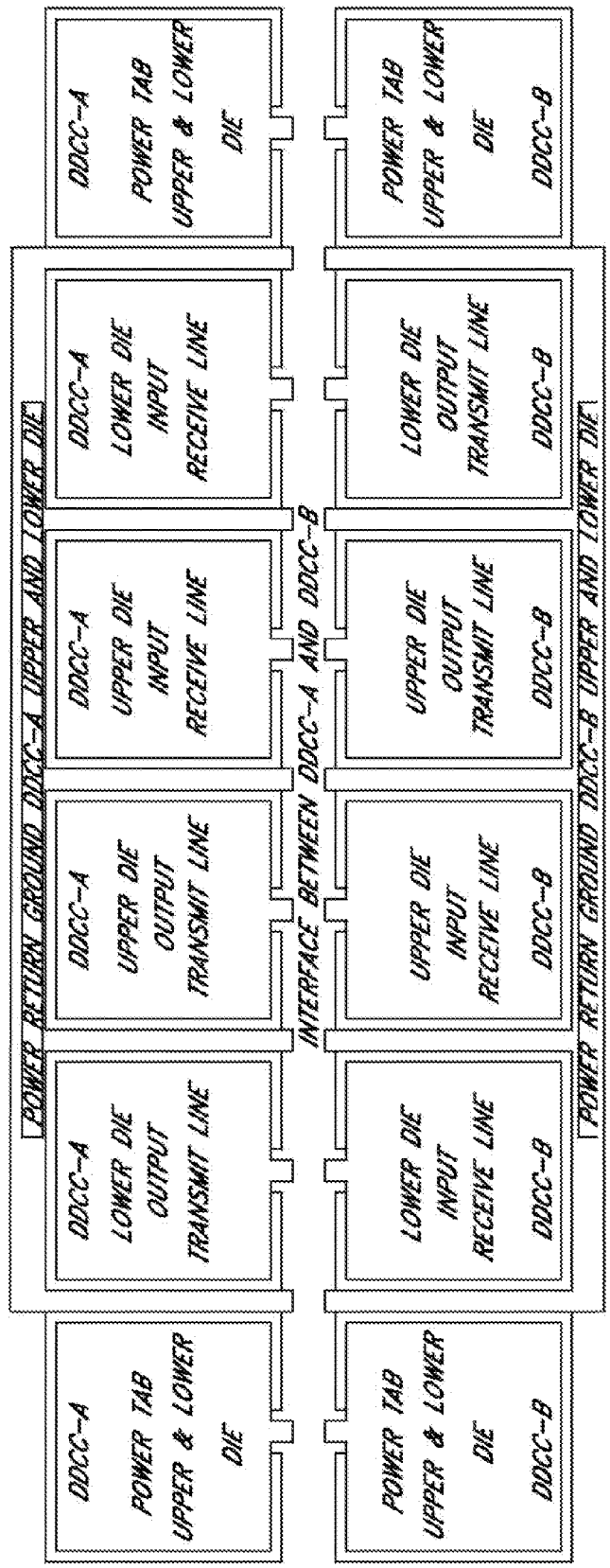
FIG. 33A is a diagram of one embodiment of a physical chip interface layout for the interface between two adjacent DDCCs.

FIG. 33A is a diagram of one embodiment of a physical chip interface layout for the interface between two adjacent DDCCs (DDCC-A and DDCC-B). More specifically, FIG. 33A illustrates the side of DDCC-A that faces DDCC-B, and vice versa. The upper die of DDCC-A may communicate with the upper die of DDCC-B using an output transmit line through a DDCC flying lead connection that can create a physical and/or electrical connection with a DDCC flying lead connection of a receive line of the upper die of DDCC-B. Similarly, the lower die of DDCC-A may communicate with the lower die of DDCC-B using an output transmit line through a DDCC flying lead connection that can create a physical and/or electrical connection with a DDCC flying lead connection of a receive line of the lower die of DDCC-B. In a similar manner, DDCC-B can communicate with DDCC-A using transmit and receive lines and associated flying lead connections. Thus, in certain embodiments, each pair of adjacent DDCC may have four flying lead connections for the communication of data and/or clock signals.

Further, each side of each DDCC may have a power tab connection to the mounting substrate where power is supplied from the mounting substrate to the DDCC for distribution to the DDCC upper and lower dies at the end or corner of each side of the DDCC. Although the power tab connections of the DDCC-A face the power tab connections of the DDCC-B, it should be understood that, unlike with the previously described output transmit and receive lines, there is generally no direct connection between the power tab connections of the DDCCs. However, the power connections of each of the DDCC may, in some implementations, be electrically connected via the substrate. In other implementations, at least some of the power connections for at least some of the DDCCs are isolated between the DDCCs.

Moreover, five power return and ground connections may exist for on each side for each DDCC. As with the power tab connections, the power return and ground connections may be physically and/or electrically connected to the mounting substrate. The connections to the mounting substrate may be located between each of the DDCC transmit and receive lines and on either side of the outer transmit and receive lines for a total of five connections. Further, as with the power tab connections, although the power return and ground connections of the DDCC-A face the power return and ground connections of the DDCC-B, it should be understood that there is generally no direct connection between the power return and ground connections of the DDCCs. However, the power return and ground connections of each of the DDCC may, in some implementations, be electrically connected via the substrate. In other implementations, at least some of the power return and ground connections for at least some of the DDCCs are isolated between the DDCCs.

Figure 33B:
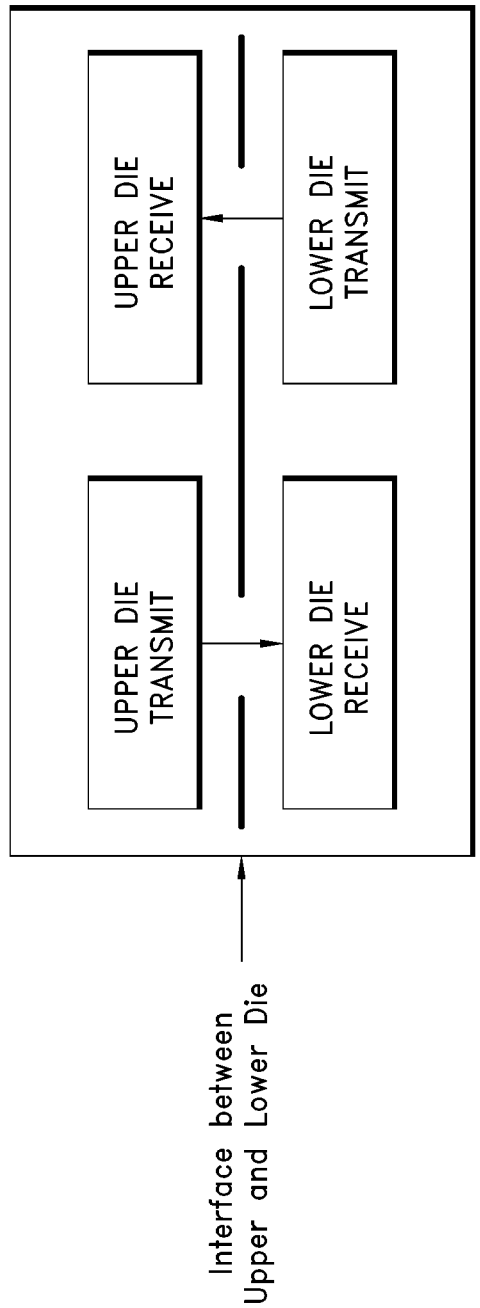
FIG. 33B is a diagram of one embodiment of a physical chip interface layout for the upper and lower die of a DDCC.

FIG. 33B is a diagram of one embodiment of a physical chip interface layout for the upper and lower die of a DDCC (e.g., the DDCC-A of FIG. 33A). More specifically, FIG. 33B illustrates one the side of a DDCC. It should be understood that each side of the DDCC may have the same or similar connections between the upper die and lower die of the DDCC. In some implementations, the upper die and the lower die are connected face to face. In other words, the top of the lower die may correspond to the bottom of the upper die. Each of the upper die and lower die may have transmit and receive connections for each side of the dies. In some implementations, the transmit connection or port of one die may mate or be electrically connected to the receive connection or port of the other die within the DDCC and vice versa.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

Various aspects of embodiments within the scope of the appended claims have been described above. It should be apparent that the aspects described herein may be embodied in a wide variety of forms and that any specific structure and/or action described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

For example, a skilled artisan will recognize from the present disclosure that various methods of manufacture, design, and materials can be used to make the various components described herein. Additionally, other combinations, omissions, substitutions and modifications will be apparent to the skilled artisan in view of the disclosure herein. It is contemplated that various aspects and features of the invention described can be practiced separately, combined together, or substituted for one another, and that a variety of combination and sub-combinations of the features and aspects can be made and still fall within the scope of the invention. Furthermore, the systems described above need not include all of the modules and functions described in the preferred embodiments. Accordingly, the present invention is not intended to be limited by the recitation of the preferred embodiments, but is to be defined by reference to the appended claims.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Conditional language used herein, such as, among others, "can," "could," "might," "may," "e.g.," and the like, unless specifically stated otherwise, or otherwise understood within the context as used, is intended in its ordinary sense and is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous, are used in their ordinary sense, and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is understood with the context as used in general to convey that an item, term, element, etc. may be either X, Y or Z. Thus, such conjunctive language is not generally intended to imply that certain embodiments require at least one of X, at least one of Y and at least one of Z to each be present.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present disclosure.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The invention claimed is:

1. A method of distributing a system clock signal within a distributed computing system, the method comprising:
   receiving a system clock signal of a first frequency from a clock source;
   providing the system clock signal to a first die of a plurality of interconnected die via a first input port of the first die;
   providing a copy of the system clock signal from the first die to a second die of the plurality of die via a first input port of the second die;
   sending a first signal comprising data from the first die to the second die over a send line of the first die, the send line of the first die configured to send data without receiving data; and
   receiving an acknowledgement signal at the first die, the acknowledgement signal received from the second die over the send line of the first die,
   wherein at least some of the plurality of interconnected die receive a master primary clock signal of the first frequency, wherein the master primary clock signal is based on the system clock signal, and wherein the master primary clock signal is distributed to the at least some of the plurality of interconnected die according to a system clock distribution network, and
   wherein at least one of the first die or the second die comprises a hardware processor.

2. The method of claim 1, further comprising reconfiguring the system clock distribution network to distribute the master primary clock signal to at least one die other than the first die, wherein the at least one die is different from the at least some of the plurality of interconnected die.

3. The method of claim 1, wherein at least some of the plurality of interconnected die receive a master secondary clock signal of the first frequency, wherein the master secondary clock signal is based on the system clock signal, and wherein the system clock distribution network comprises a master primary clock distribution path and one or more master secondary clock signal paths.

4. The method of claim 3, further comprising superimposing a data signal on the copy of the system clock signal, the master primary clock signal, or the master secondary clock signal.

5. The method of claim 3, further comprising providing the master primary clock signal or the master secondary clock signal to a third die of the plurality of interconnected die, wherein at least the second die is interposed between the third die and the first die.

6. The method of claim 1, further comprising grouping the plurality of die into die clusters.

7. The method of claim 6, further comprising reconfiguring at least one of the die clusters to create a new cluster capable of performing a specific function according to processing demands placed on the distributed computing system.

8. The method of claim 1, wherein the system clock signal has a frequency of between approximately 8 GHz and 40 GHz.

9. A method of distributing a system clock signal within a distributed computing system, the method comprising:
   receiving a system clock signal of a first frequency from a clock source;

providing the system clock signal to a first die of a plurality of interconnected die via a first input port of the first die;

superimposing a data signal on a copy of the system clock signal; and providing the copy of the system clock signal with the superimposed data signal from the first die to a second die of the plurality of die via a first input port of the second die, wherein at least some of the plurality of interconnected die receive a master primary clock signal of the first frequency, wherein the master primary clock signal is based on the system clock signal, and wherein the master primary clock signal is distributed to the at least some of the plurality of interconnected die according to a system clock distribution network, and wherein at least one of the first die or the second die comprise a memory chip.

10. The method of claim 9, wherein superimposing the data signal on the copy of the system clock signal comprises applying amplitude modulation to the copy of the system clock signal.

11. The method of claim 9, wherein superimposing the data signal on the copy of the system clock signal comprises applying pulse-width modulation to the copy of the system clock signal.

12. The method of claim 9, wherein the copy of the system clock signal comprises a single frequency clock signal.

13. The method of claim 9, wherein superimposing the data signal on the copy of the system clock signal occurs while maintaining the copy of the system clock signal as a clock signal.

14. A computing system comprising:
a system clock reception port configured to receive a system clock signal and provide the system clock signal over a first input line to at least one die of a dual die chip carrier (DDCC); and
a plurality of interconnected DDCCs comprising:
a first DDCC die having a plurality of input ports and a plurality of output ports, at least one input port from the plurality of input ports configured to receive a copy of the system clock from the system clock generator, wherein at least some of the plurality of input ports are independently configurable, wherein at least some of the plurality of output ports are independently configurable, and wherein at least one of the plurality of output ports is configured to output a master primary clock signal or a master secondary clock signal based on the copy of the system clock signal; and
a second DDCC die having a plurality of input ports and a plurality of output ports, the second DDCC die being configured to receive the master primary clock signal or the master secondary clock signal at one of the input ports of the plurality of input ports of the second DDCC die,
wherein the master primary clock signal of the first DDCC die remains active during system operation.

15. The system of claim 14, wherein the plurality of interconnected DDCCs comprises more than two DDCCs.

16. The system of claim 14, wherein the first DDCC die is configured to not deactivate the master primary clock signal during operation of the distributed computing system.

17. The system of claim 14, wherein a port address register of the second DDCC die is automatically configured with an identity of a port of the second DDCC die that receives the master primary clock signal or the master secondary clock signal.

18. The system of claim 17, wherein the second DDCC die reshapes one of the master primary clock signal or the master secondary clock signal to obtain an internal clock signal.

19. The system of claim 17, wherein, upon ceasing to receive the master primary clock signal or the master secondary clock signal, the second DDCC die automatically updates the port address register with a default value.

20. The system of claim 19, wherein the identity of the port is stored in a temporary register, and wherein the identity of the port is restored to the port address register upon restoration of the master primary clock signal or the master secondary clock signal.

21. The system of claim 14, wherein a port address register of the second DDCC die is automatically configured with an identity of a port specified in a command received at the second DDCC die.

22. The system of claim 14, wherein the system clock signal comprises a substantially square-wave signal.

23. The system of claim 22, wherein the system clock signal is symmetrical, and wherein a frequency of the system clock varies less than one quarter of a clock cycle per half second.

24. The system of claim 14, wherein the at least some of the plurality of interconnected DDCCs are substantially hexagonally-shaped and accommodate non-orthogonal inter-device communication and three dimensional processing.

25. The system of claim 14, wherein the at least some of the plurality of interconnected DDCCs comprise a first die and a second die disposed above the first die.

26. The system of claim 25, wherein at least one of the master primary clock signal or the master secondary clock signal within a DDCC is distributed between an output port of the first die and a corresponding input port of the second die.

27. The system of claim 14, wherein each of the plurality of interconnected DDCCs comprises a first die and a second die, the first die including a first port address register and the second die including a second port address register.

28. The system of claim 27, wherein the first port address register and the second port address register are automatically configured to identify a port address for the at least one input port that receives the copy of the system clock.

29. The system of claim 14, wherein the plurality of interconnected DDCCs are grouped into two or more clusters, wherein a cluster comprises three or more interconnected DDCCs, and wherein each DDCC within the cluster is in direct communication with another DDCC within the cluster.

30. The system of claim 14, wherein at least one output port from the plurality of output ports of the first DDCC die is configured to output the master secondary clock signal, and wherein the first DDCC die is configured to deactivate the master secondary clock signal during system operation.

* * * * *